United States Patent [19]

Ishida et al.

[11] Patent Number: 5,023,646
[45] Date of Patent: * Jun. 11, 1991

[54] AUTOMATIC FOCUS DETECTION SYSTEM

[75] Inventors: Tokuji Ishida; Masataka Hamada; Kenji Ishibashi; Nobuyuki Taniguchi; Hiroshi Ootsuka; Toshio Norita; Toshihiko Karasaki, all of Osaka, Japan

[73] Assignee: Minolta Camera Kabushiki Kaisha, Osaka, Japan

[*] Notice: The portion of the term of this patent subsequent to May 16, 2006 has been disclaimed.

[21] Appl. No.: 351,176

[22] Filed: May 12, 1989

Related U.S. Application Data

[63] Continuation-in-part of Ser. No. 51,138, May 15, 1987, Pat. No. 4,831,403, which is a continuation-in-part of Ser. No. 946,578, Dec. 22, 1986, abandoned.

[30] Foreign Application Priority Data

Dec. 27, 1985 [JP] Japan ............................. 60-298035
Dec. 27, 1985 [JP] Japan ............................. 60-298036
May 16, 1986 [JP] Japan ............................. 61-113315

[51] Int. Cl.⁵ .................... G03B 13/36; G02B 7/28
[52] U.S. Cl. .................................. 354/402; 250/201.2
[58] Field of Search ............... 354/402, 403, 432, 406, 354/407, 408, 409, 430, 173.1; 250/201 R, 201 PF, 204, 201.2–201.8

[56] References Cited

U.S. PATENT DOCUMENTS

| | | | |
|---|---|---|---|
| 4,492,449 | 1/1985 | Oinoue et al. | 354/407 |
| 4,523,829 | 6/1985 | Eguchi et al. | 354/406 |
| 4,561,749 | 12/1985 | Utagawa | 354/406 |
| 4,562,346 | 12/1985 | Hayashi et al. | 354/406 X |
| 4,573,784 | 3/1986 | Suzuki | 354/406 |
| 4,633,073 | 12/1986 | Horikawa | 354/406 X |
| 4,636,624 | 1/1987 | Ishida et al. | 354/406 X |
| 4,734,571 | 3/1988 | Hamada et al. | 354/406 X |

FOREIGN PATENT DOCUMENTS 60-4913 1/1985 Japan .

Primary Examiner—W. B. Perkey
Attorney, Agent, or Firm—Price, Gess & Ubell

[57] ABSTRACT

A camera with an automatic focusing device has an objective lens mounted on a camera. An image formed by the objective lens is divided into a plurality of zones. In each zone, a brightness distribution is obtained so as to detect a rough focusing condition in each zone, thereby producing a plurality of rough focusing condition data. Based on the result of the rough focusing condition data, one zone is selected. Furthermore, a precise focusing condition is detected in the selected zone based on the light contained in the selected zone, so as produce a precise focusing condition data. Based on the precise focusing condition data obtained from the selected zone, the objective lens is driven to an infocus condition.

18 Claims, 42 Drawing Sheets

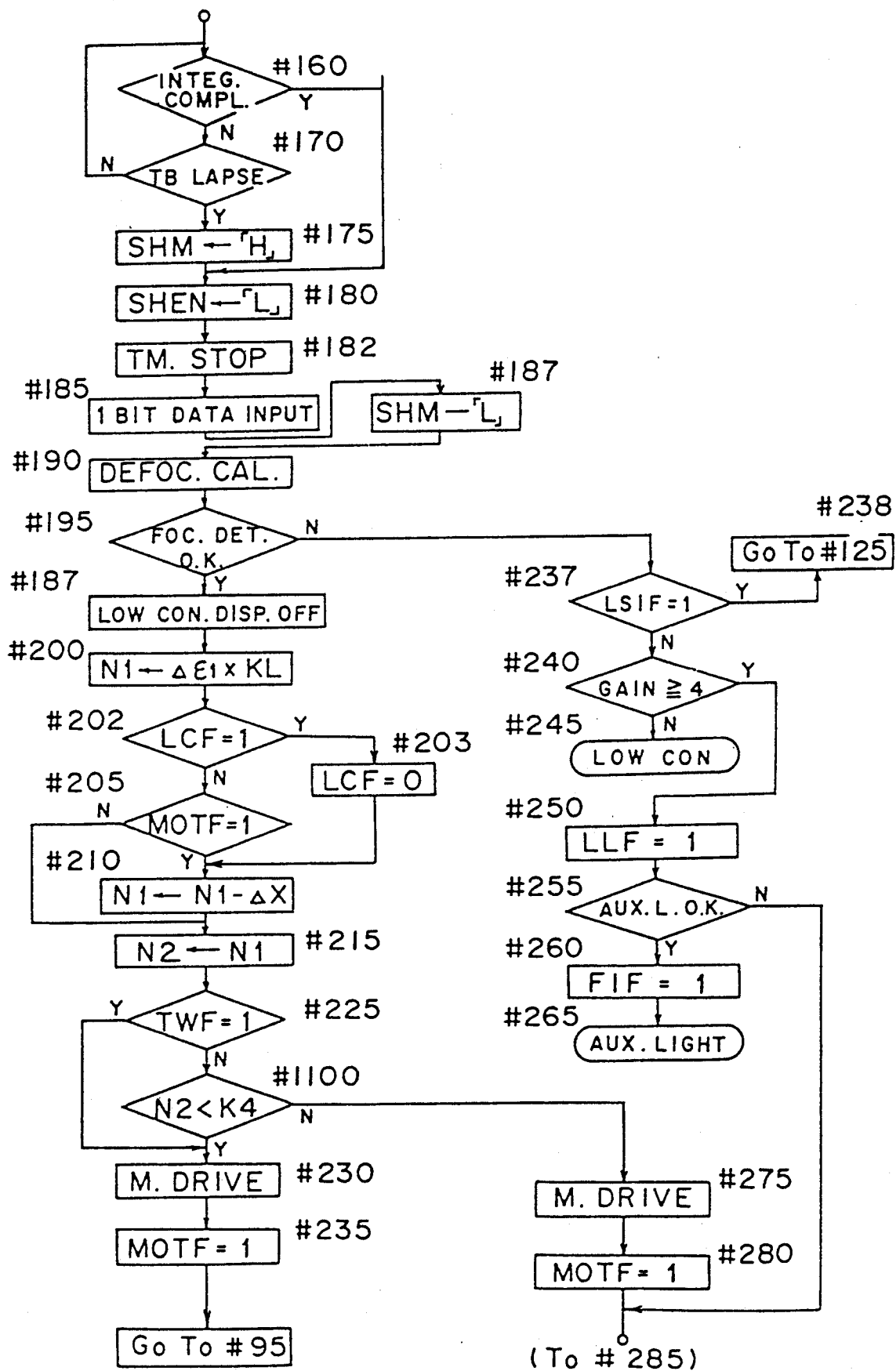

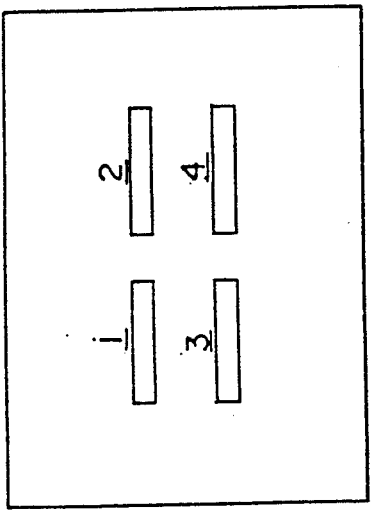
Fig. 21a
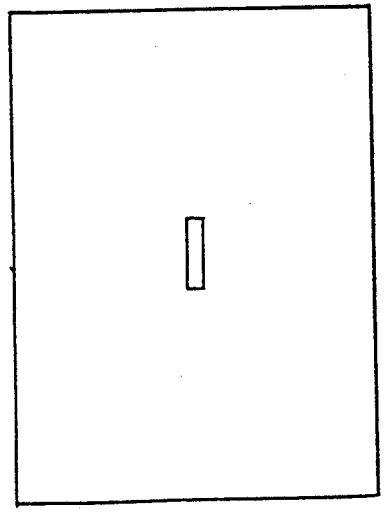
Fig. 21b
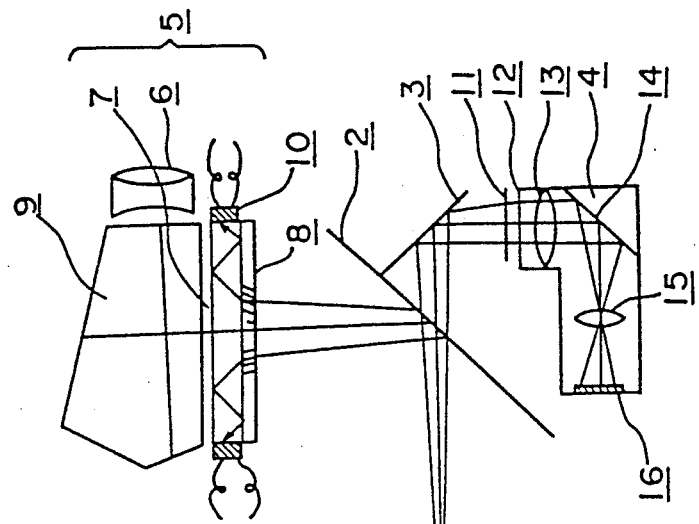
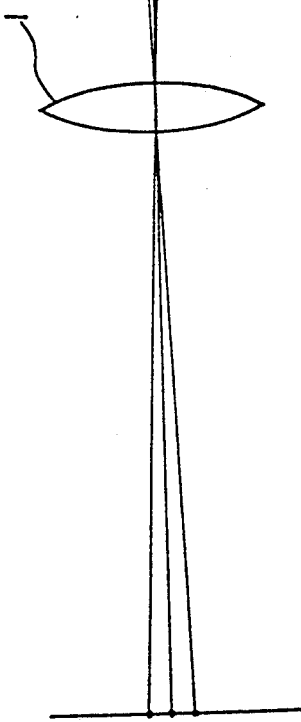
Fig. 22a

AUTOMATIC FOCUS DETECTION SYSTEM

This application is a continuation-in-part of U.S. patent application Ser. No. 051,138 filed on May 15, 1987, now U.S. Pat. No. 4,831,403, which application is a continuation-in-part of U.S. patent application No. 946,578 filed on Dec. 22, 1986, now abandoned in the names of Tokuji ISHIDA, Masataka HAMADA, Kenji ISHIBASHI, Nobuyuki TANIGUCHT and Hiroshi OOTSUKA and assigned to Minolta Camera Kabushiki kaisha.

BACKGROUND OF THE INVENTION

The present invention generally relates to an automatic focus control system for use in a photographic camera and more particularly, to an automatic focus detection system in which two A/D converters which convert analog data representing defocus amounts into digital data are provided respectively for at least one bit and for a greater plurality of at least two bits so as to be properly used, thereby to reduce processing time to be shorter than that in the conventional arrangement employing an A/D converter only for eight bits.

Conventionally, there has been proposed an automatic focus detecting arrangement including an image sensor which produces an analog signal corresponding to an image of a target object to be photographed, transmitted through a lens assembly, and an A/D converting means which converts the analog signal from said image sensor into a digital signal of eight bits so as to calculate a defocus amount from the eight bit digital signal for effecting the focus detection. In the above known arrangement, however, the defocus amount is calculated exclusively through employment of only the digital signal of eight bits, without effecting the calculation of the defocus amount by the digital signal of one bit (binary signal).

Meanwhile, there has also been conventionally proposed another automatic focus detecting arrangement which is adapted to effect the focus detection by the digital signal of one bit as disclosed for example, in Japanese Patent Laid-Open Application Tokkaisho No. 59-165012. In this known arrangement, the image signal in the analog form is converted into the digital signal of one bit for processing, and as a first step, the analog image signal is read by thinning-out. By way of example, in pixels of "a" pieces, data for CCD for each pixel is read out for A/D conversion so as to obtain a defocus amount through calculation, and thus, the lens assembly is driven by this defocus amount. After completion of the driving, the continuous analog image signals in ½ "a" pieces are read out for calculation to obtain a new defocus amount. The above prior art arrangement is intended to cover variation in size of the target object in a field to be photographed when a zoom lens is employed.

In the first prior art as referred to earlier, although accuracy for the focus detection is high when the defocus amount is small since signal processing for eight bits is effected at all times, there has been such a problem that it takes a long time before arrival at a final focus detection due to wasteful procedures involved, owing to the fact that the signal processing for eight bits is not necessarily required in the case where the defocus amount is large as in a first focus detection. Meanwhile, as in the photographing after the first exposure in a continuous photographing mode, the signal processing for eight bits is effected at all times even when such signal processing for eight bits is not necessary, thus requiring much time for the focus detection, with a consequent limitation to the speed in the continuous photographing. Moreover, as described later, there are also many cases where the signal processing for eight bits is not required or where such eight bit signal processing is not preferable, and in the prior art technique as referred to above, since the eight bit signal processing is effected for all of these cases, the focus detecting speed is undesirably limited.

On the other hand, in the second prior art as referred to earlier, although signal processing for one bit is disclosed, this is not a technique related to the high speed focus detection, and thus, the problem in the above first prior art can not be solved thereby.

In order to overcome the disadvantages in the prior art techniques as described above, the present inventors have thought of an arrangement in which, in a prior art automatic focus detection system, a data processing means for at least one bit is provided apart from the data processing means for eight bits in order to increase the processing speed for the focus detection, thereby to properly utilize these two data processing means through change-over therebetween. In this case, when the data processing for at least one bit is selected, the calculating speed is of course increased due to the smaller number of bits, but it has been further studied by the present inventors as to whether or not there are any other points in which at least one bit and eight bits can be exchanged, thereby to increase the processing speed for the overall focus detection. As a result, it has been found that the processing speeding in one bit may be increased with respect to the following two points (a) Since the data only for one bit is required, the information (output voltage) of the CCD image sensor may be be smaller than that in the case where data in eight bits is employed. In other words, the output voltage thereof may be lower. This means that the integration time for obtaining the CCD information may be short.

(b) Time required for the A/D conversion may be short as compared with that in the case of eight bits. Accordingly, it becomes possible to accelerate the period for the data taking-in, with a consequent reduction of time required for the data reading-in.

SUMMARY OF THE INVENTION

Accordingly, an essential object of the present invention is to provide an improved automatic focus detection system which is capable of effecting focus detection in a shorter time, and at the same accuracy as in the conventional arrangements through improvement in such prior art automatic focus detection system.

Another important object of the present invention is to provide an automatic focus detection system of the above described type which is so arranged that, in the case where the digital signal of at least one bit or a greater plurality of bits for the defocus amount calculation is to be obtained from the analog signal of an image sensor, the integration time of the image sensor and signal transfer clock are changed over during one bit processing so as to increase the processing speed with respect to the processing other than that for the calculation time.

In accomplishing these and other objects, according to one preferred embodiment of the present invention, there is provided as shown in FIG. 1, an automatic focus detection system which includes an image sensor which outputs an analog signal corresponding to an image of a target object to be photographed, transmitted through a lens assembly, a first A/D converting means for converting the analog signal from the image sensor into a digital signal of at least one bit, a first calculating means for calculating the digital signal from the first A/D converting means to obtain a defocus amount, a second A/D converting means for converting the analog signal from the image sensor into a digital signal of a greater number of bits (at least two), a second calculating means for calculating the digital signal from the second A/D converting means to obtain a defocus amount, and a selecting means for selecting which of the digital signal of at least one bit or the digital signal of at least two bits is to be used.

As described above, according to the present invention, the analog signal from the image sensor is converted by the first or second A/D converter into the digital signal of at least one bit or at least two bits, and the defocus amount is obtained by the above digital signal through the first or second calculating means. The digital signal of at least one bit and the digital signal of more than two bits are properly used by the selecting means, and in the case where the focus detection by the digital signal of more than two bits is not required, it is possible to effect the focus detection by the digital signal of one bit, whereby the focus detecting speed may be increased as the number of bits is reduced.

In another modification of the present invention, there is also provided as shown in FIG. 20, an automatic focus detection system which includes an image sensor of an integration type which outputs an analog signal corresponding to an image of a target object to be photographed which has transmitted through a lens assembly, an integration time seeting means for setting the integration time of the image sensor, a signal outputting means for outputting the analog signal of the image sensor through sequential synchronization with a clock, a clock setting means for setting frequency of the clock, a first A/D converting means for converting an analog signal read out from the signal outputting means into a digital signal of one bit, a second A/D converting means for converting the analog signal read out from the signal output means into a digital signal of more than two bits, a selecting means for selecting which of the digital signal of one bit or the digital signal of more than two bits is to be used for calculation of defocus amount, and a control means for effecting at least one of a first control for shortening the integration time by the integration time setting means as compared with the case where the digital signal of more than two bits is employed upon selection to use the digital signal of one bit by the selecting means, and a second control for raising the frequency of the clock by the clock setting means.

As described above, according to the modification of the present invention, in order to increase the processing speed for the focus detection in the conventional automatic focus detecting arrangements, the data processing section for one bit is provided apart from the data processing section of eight bits, while moreover, it is arranged to change over the integration time of the image sensor necessary for obtaining data for one bit and transfer clock from those in the case for eight bits, whereby as described earlier with reference to items (a) and (b), the processing speed may also be increased in the processing other than that during the calculating time.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 17(a) through 17(c) represent a continuous flow-chart showing functions of a modification of the embodiment of FIG. 2;

FIG. 21a is a view explanatory of a zone for carrying out the focus detection and an object light measurement;

FIG. 21b is a view explanatory of zones for carrying out the focus and an object light measurement, according to a second embodiment of the present invention;

Figs. 22a–22d are views explanatory of an optical system employed in a camera according to the preferred embodiment of the present invention;

FIG. 33 is a circuit diagram showing one example of a driving cicuit for driving the CCD of FIG. 32a;

DETAILED DESCRIPTION OF THE INVENTION

Before the description of the present invention proceeds, it is to be noted that like parts are designated by like reference nummerals throughout the accompanying drawings.

Figure 1:
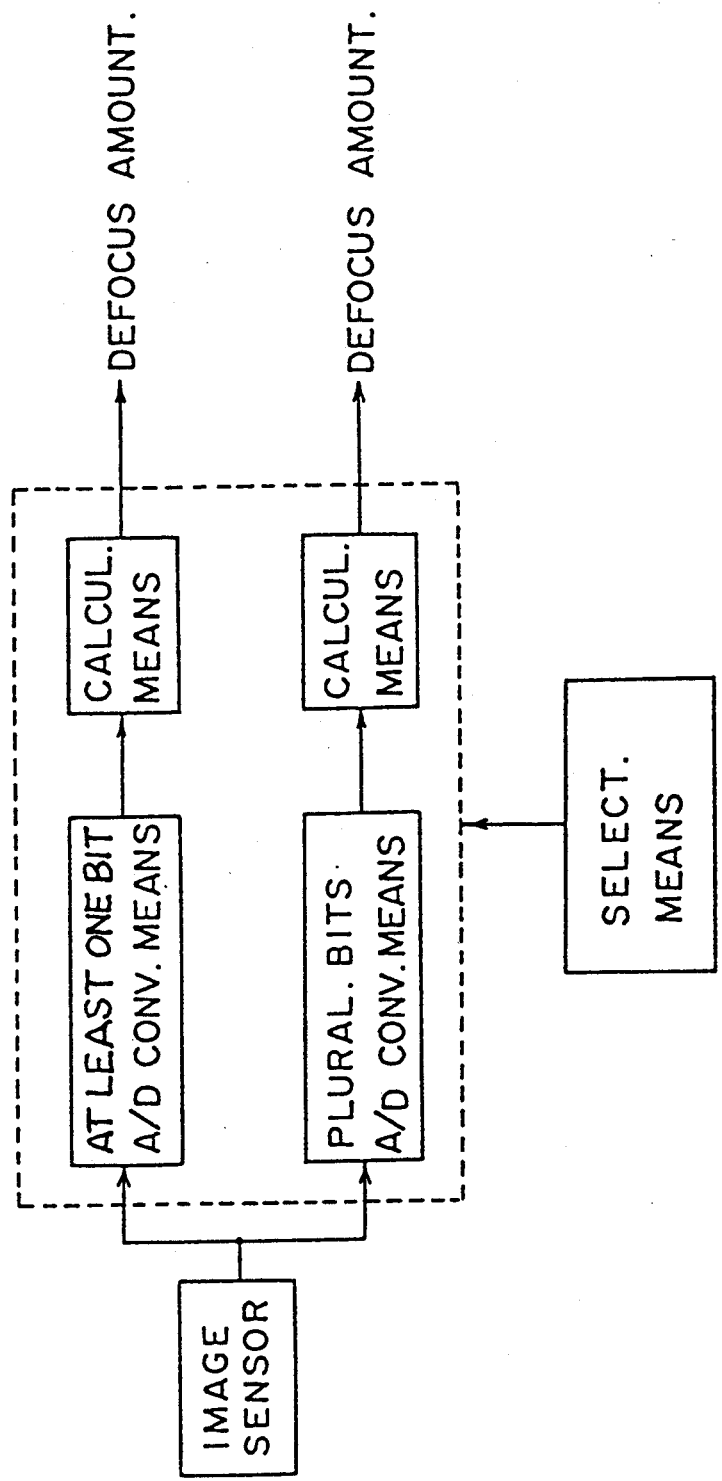
FIG. 1 is a block diagram representing a fundamental arrangement an automatic focus detection system according to the present invention (already referred to)
Figure 2:
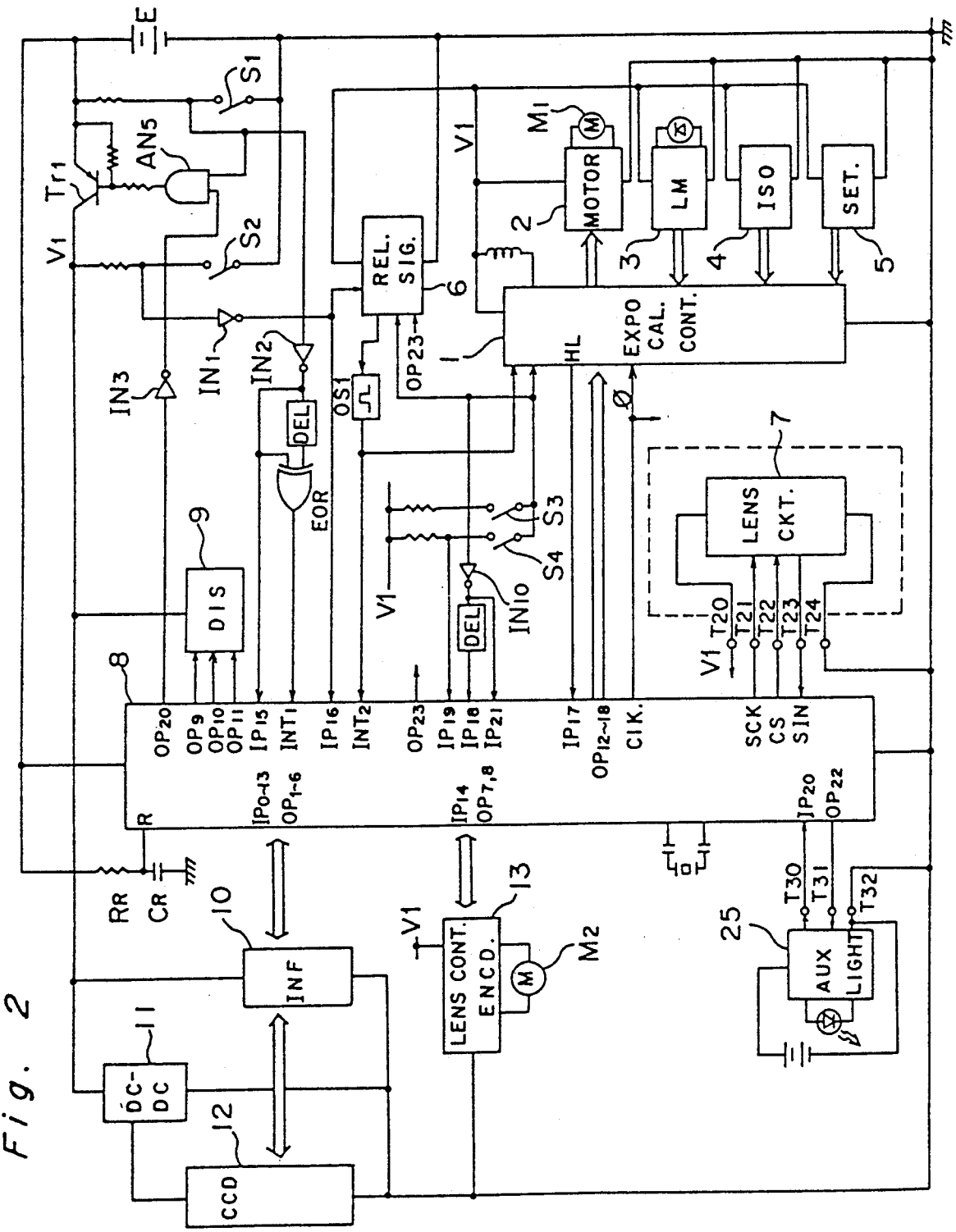
FIG. 2 is an electrical circuit diagram showing an overall construction of an automatic focus detection system according to a first preferred embodiment of the present invention.

Referring now to the drawings, there is shown in FIG. 2, an electrical circuit diagram representing an overall construction of an automatic focus detection system according to a first preferred embodiment of the present invention.

In FIG. 2, the automatic focus detection system generally includes a micro-computer 8 connected to a power source or battery E for effect.ing the automatic focus detection and control, an exposure calculation and control circuit 1 connected to the micro-computer 8 and coupled to a light measuring circuit 3, a film sensitivity setting circuit 4, a photographing mode setting circuit 5 and a motor control circuit 2, a release signal forming circuit 6, a lens circuit 7 provided in an interchangeable lens, a photo-electric conversion circuit 12 composed of a CCD sensor coupled to the micro-computer 8 through an interface circuit 10, a display circuit 9, a lens control circuit 13, a voltage raising circuit 11, and an auxiliary light circuit 25, etc., all of which are coupled to each other through signal lines as illustrated. More specifically, the automatic focus detection system illustrated in FIG. 2 further includes switches S1 and S2 inserted in parallel with the power source E and coupled to each other through a transistor Tr1 whose collector and emitter are respectively connected to the stationary contacts of the switches S1 and S2, with its base being connected to an AND gate AN5 which is further connected to the micro-ccmputer 8, and also switches S3 and S4 which are inserted between the release signal forming circuit 6 connected to the exposure calculation and control circuit 1 and the micro-computer 8.

The switch S1 is a photographing preparation starting switch which is adapted to be turned on at a first depression stroke of a shutter release button (not shown), and upon turning on of this swit.hc S1, the AND circuit AN5 produces a signal of "Low" level to render the transistor Tr1 conductive for supplying power to the respective circuits. The switch S2 is a release switch to be turned on by a second stroke of the release button, and the exposure function is started by the turning on of this switch S2, while the switch S3 is a one frame winding-up switch which is turned on upon completion of the exposure, and turned off upon completion of winding-up of a film by one frame. During the winding-up of the film by one frame referred to above, charging of the release mechanism is effected, and at the time point when the winding-up of the film by one frame is completed, the charging of the release mechanism has been already completed. The switch S4 is a one frame/continuous photographing change-over switch, and is in the continuous photographing mode upon turning on.

The exposure calculation and control circuit 1 which is coupled to the micro-computer 8 calculates optimum diaphragm aperture value and shutter speed based on a signal fed from the micro-computer 8 and corresponding to a fully open diaphragm aperture value of the lens assembly, a signal fed from the light measuring circuit 3 and corresponding to the brightness of the target object to be photographed, a signal supplied from the film sensitivity setting circuit 4 and corresponding to the film sensitivity, and a signal fed from the photographing mode setting circuit 5 and corresponding to the set photographing mode, and thus, by inputting the release signal, effects the exposure control based on the optimum diaphragm aperture value and shutter speed calculated as described above. The motor control circuit 2 is arranged to control a motor M1 for effecting the one frame winding-up of the film by a signal from the exposure calculation and control circuit 1. The release signal f.orming circuit 6 is intended to apply the release signal to the micro-computer 8 in different manners according to the one frame photographing mode or continuous photographing mode. Meanwhile, the lens circuit 7 provided within an interchangeable lens includes a ROM having information intrinsic to each lens stored therein, and a control circuit necessary for reading out the content from the ROM, and is coupled to the micro-computer 8 through corresponding terminals.

The micro-computer 8 for the automatic focus detection and control is so arranged to apply a control signal to the interface circuit 10 for receiving, through the interface circuit 10, the image signals from the photoelectric conversion circuit 12 composed of the CCD sensor so as to effect the focus detection. Based on the result of the focus detection, the micro-computer 8 controls the display circuit 9 coupled to the micro-computer 8 and the lens control circuit 13 for controlling a motor M2 for driving the lens. The voltage raising circuit 11 connected between the photo-electric conversion circuit 12 and the collector of the transistor Tr1 is adapted to raise the voltage for the power source battery E up to a voltage necessary light circuit 25 also coupled to the micro-computer 8 is intended to project light toward the target object so that the focus detection may be effected in a low brightness condition also.

Before explaining the functions of the automatic focus detection system having the circuit construction as described so far, the optical system and the photoelectric conversion section employed in the detection system of FIG.

Figure 3:
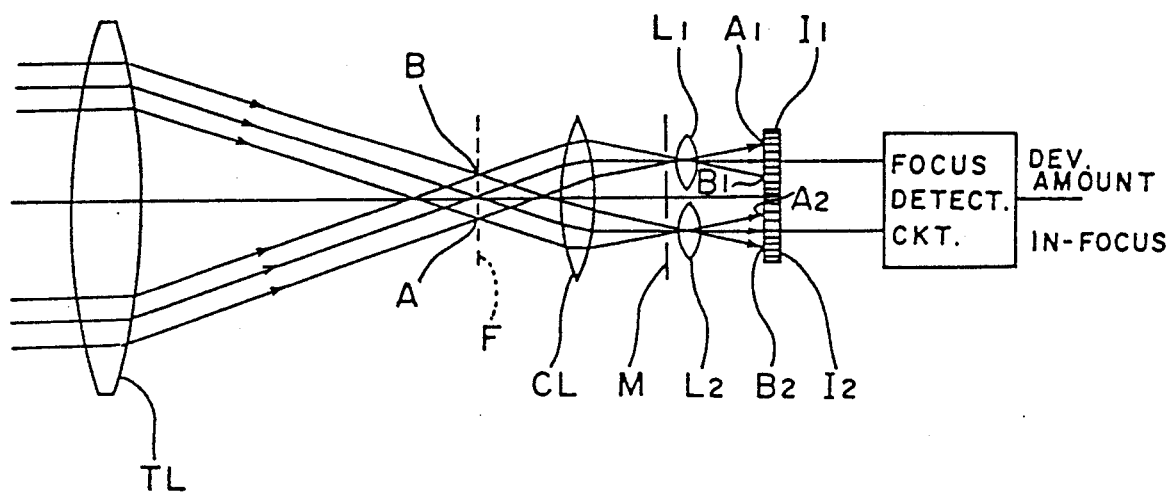
FIG. 3 is a schematic diagram of an optical system to be employed for the embodiment of FIG. 2.

In FIG. 3, there is schematically shown an optical system which may be applied to the circuit arrangement of FIG. 2. The optical system generally includes an objective lens TL, image forming lenses L1 and L2 provided with a mask M with a pair of apertures for limiting light incident thereupon and disposed behind a condenser lens CL which is in turn disposed behind a film equivalent surface F, and charge accumulation type image sensors Il and I2 disposed behind the image forming lenses Ll and L2. The images within ranges A and B at the film equivalent surface F are re-formed on the image sensors Il and I2 through the condenser lens CL and the image forming lenses Ll and L2 respectively as images Al and Bl and A2 and B2. The image sensors Il and I2 feed out two image signals corresponding to light intensity distribution of the two images formed thereon, to the focus detection circuit which is constituted by the micro-computer 8 in the above embodiment. Meanwhile, the image sensors Il and I2 are formed as a single image sensor as described later.

Figure 4:
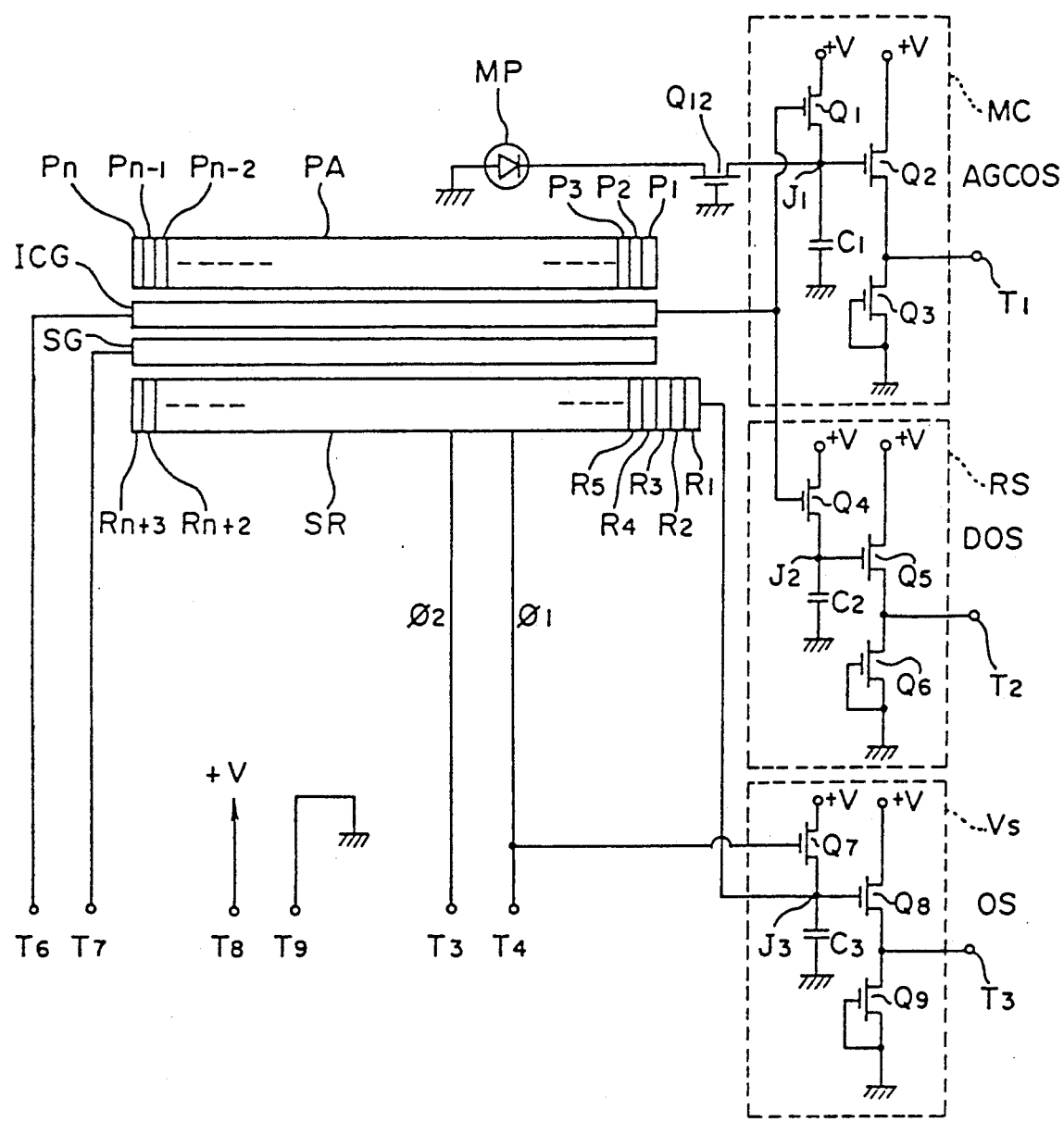
FIG. 4 is an electrical circuit diagram representing a general construction of a photo-electric conversion circuit to be employed in the embodiment of FIG. 2.

Referring also to FIG. 4, there is shown a detailed circuit construction of the photo-electric conversion section 12 including a single image sensor serving as the image sensors Il and I2 as described above. The single image sensor includes a photo-sensor array PA having photo-sensors Pl, P2 ..., P(n-1), and Pn, an integration clear gate ICG for initializing the photo-sensor array PA, and a shift gate SG for transferring the accumulated charge stored in the photo-sensor array PA into a CCD shift register SR having cells R1, R2 ... R(n+2), and R(n+3). The CCD shift register SR transfers the accumulated charge fed from the photo-sensor array PA successively to a video signal output circuit $V_S$ in synchronization with transfer pulses $\phi 1$ and $\phi 2$. In the above arrangement, the number of cells of the CCD shift register SR is larger than the number of the photo-sensors of the photo-sensor array PA by three pieces. The cells R1, R2 and R3 for the CCD shift register SR are intended for idle feeding, and the accumulated charge in each of the photo-sensors Pl, P2, ... P(n-1) and Pn of the photo-sensor array PA is transferred in parallel relation, to the cells R4, R5, ... R(n+2), and R(n+3) by a shift pulse SH to be described later.

Figure 5:
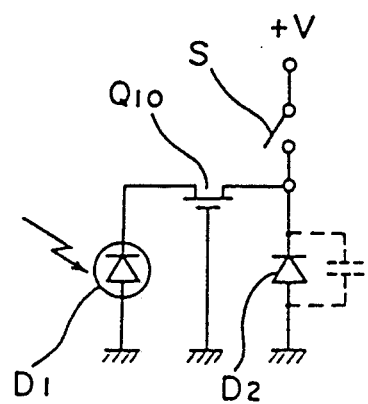
FIG. 5 is a fragmentary circuit diagram for explaining the principle of a photo-sensor to be employed in the embodiment of FIG. 2.

As shown in FIG. 5, each of the photo-sensors referred to above includes a photo-diode Dl, a charge accumulating diode D2 utilizing junction capacitance of PN junction, an FET circuit Q10 connected to cathodes of the photo-diode Dl and the charge accumulating diode D2, and grounded at its gate, and a switch S connected in series between the cathode of the diode D2 and the power source +V. The above switch S is equivalent to a semi-conductor switching element for the integration clear gate ICG, and upon closure of this switch (i.e., when the integration clear signal ICGS is fed and the semi-conductor switching element is turned on), the level at the cathode side of the charge accumulating diode D2 is raised up to the level of +V for the power source. In other words, the photo-sensors are set to the initial state (initialization). Upon opening of the switch S (i.e, when the semi-conductor switching element is turned off after disappearance of the integration clear signal ICGS), the photo-current of the photo-diode Dl discharges the electrical charge of the charge accumulating diode D2 through the FET circuit Q10, and the cathode voltage of the diode D2 is lowered with the lapse of time. More specifically, the photo-current integration is effected here, and this may be considered as accumulation of a negative charge in the cathode of the charge accumulating cathode D2 at a speed corresponding to the intensity of light incident upon the photo-diode Dl. Accordingly, it is considered that each of the photo-sensors accumulates the charge at a speed corresponding to the intensity of the incident light. The accumulation of charge in the photosensors is started after disappearance of the integration clear signal ICGS described earlier, and completed when a shift pulse is applied to the shift gate circuit SG. In other words, by the input of the shift pulse, the accumulated charge of the photo-sensor is transferred to the CCD shift register SR. In the CCD shift register SR, the accumulated charge thus transferred is sequentially applied to a video signal output circuit Vs (FIG. 4) by an amount corresponding to each cell based on the transfer pulses $\phi 1$ and $\phi 2$.

In FIG. 4, power source terminal and ground terminal T8 and T9 are provided for feeding the power source voltage +V to the image sensor, a brightness monitoring circuit MC, a reference signal generation circuit RS, the video signal output circuit Vs, and a brightness monitoring photo-electric element MP in the vicinity of the photo-sensor array PA. These constitute the photo-electric conversion section 12 together with the image sensor.

The brightness monitoring circuit MC includes FET circuits Q1, Q2 and Q3 and a capacitor Cl. The gate of the FET circuit Q1 is connected to the integration clear gate ICG so as to be conducted by the integration clear signal ICGS, thereby to raise the voltage at a junction J1 between the gate of the FET circuit Q2 and the capacitor Cl up to the voltage of the power source +V. The photo-electric element MP is connected to the junction J1 between the FET circuit Q1 and the capacitor Cl through a FET circuit Q12. After disappearance of the integration clear signal ICGS, the capacitor Cl is charged at a speed corresponding to the intensity of the light incident on the brightness monitoring photo-electric element MP. The FET circuits Q2 and Q3 constitute a buffer, and. a voltage AGCOS equal to the voltage at the junction J1 is outputted from a terminal T1 derived from a junction between the FET circuits Q2 and Q3.

Figure 10:
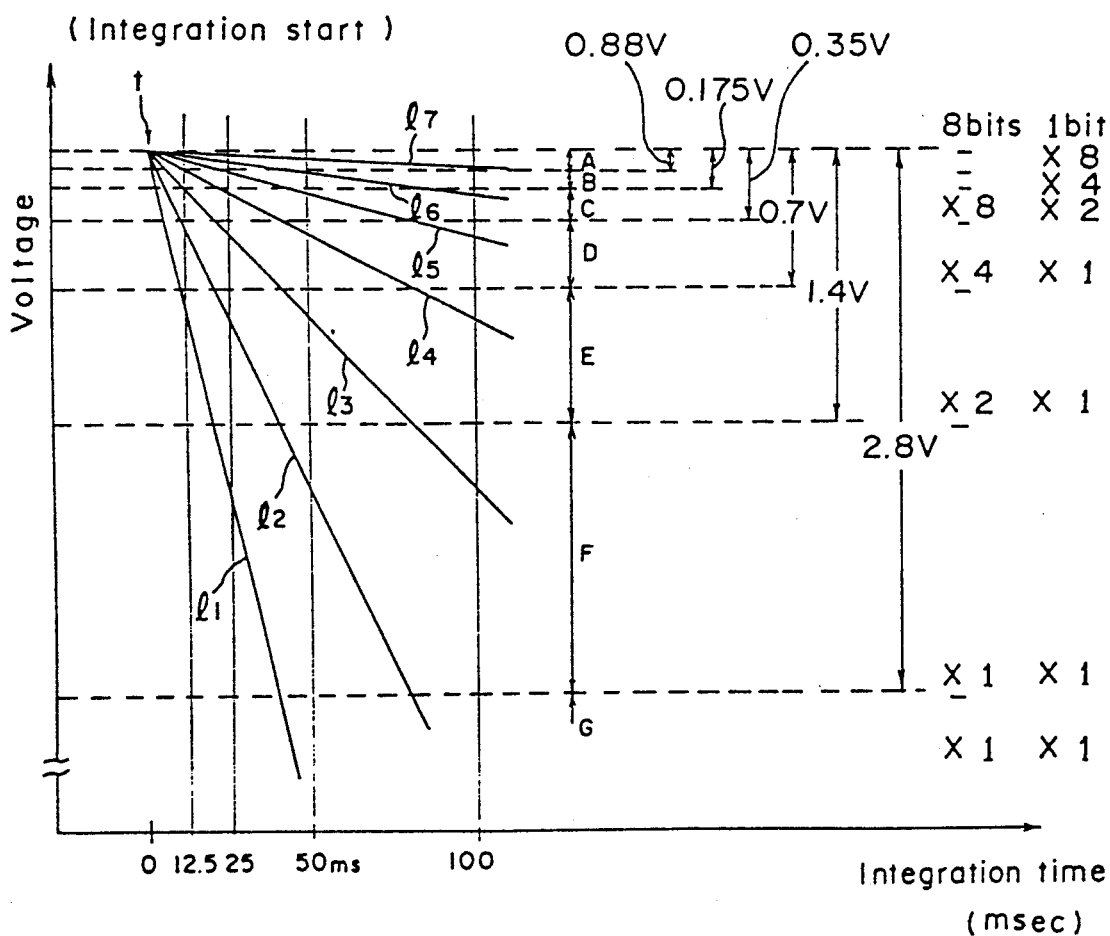
FIG. 10 is a graph showing the variation with time of an output voltage of a brightness monitor circuit to be employed in the embodiment of FIG. 2.

In FIG. 10, variations with time of the above output voltage AGCOS are shown, while lines l1, l2, l3, l4, l5, l6 and l7 indicate that the speed of voltage drop varies according to the brightness monitored by the photo-electric element MP.

Referring back to FIG. 4, the reference voltage generation circuit RS generally includes FET circuits Q4, Q5 and Q6 and a capacitor C2, and is generally similar in construction to the brightness monitoring circuit MC except that a junction J2 is connected only to the FET circuit Q4 and the gate of the FET circuit Q5 and the capacitor C2, with various characteristics being also similar thereto since these circuits RS and MC are formed in the same integrated circuit. Accordingly, the reference voltage DOS at the terminal T2 immediately after disappearance of the integration clear signal ICGS is almost equal to the voltage AGCOS at a terminal T1 of the brightness monitoring circuit MC. Thus, the reference voltage DOS may be used for measuring the amount of the voltage AGCOS lowering with the lapse of time.

Meanwhile, the video signal (image signal) output circuit $V_S$ includes the FET circuits Q7, Q8 and Q9 and a capacitor C3, and a junction J3 thereof is connected also to the output of the CCD shift register SR in addition to the FET circuit Q7 and the gate of the FET circuit Q8 and the capacitor C3. The gate of the FET circuit Q7 is connected to the terminal T4 for the transfer pulse $\phi 1$, and each time said pulse $\phi 1$ is inputted, the FET circuit Q7 is conducted to charge the capacitor C3 to the level of the power source voltage +V for resetting the video signal output circuit $V_S$. Thereafter, by the transfer pulse $\phi 1$, the capacitor C3 repeats the discharging of the charge corresponding to the accumulated charge in the CCD shift register SR to be transferred, and voltages corresponding to the respective photo-sensors are outputted from the terminal T3 for the junction of the FET circuit Q8 and Q9 as video signals OS for respective picture elements, thus forming the image signal on the whole.

Figure 6:
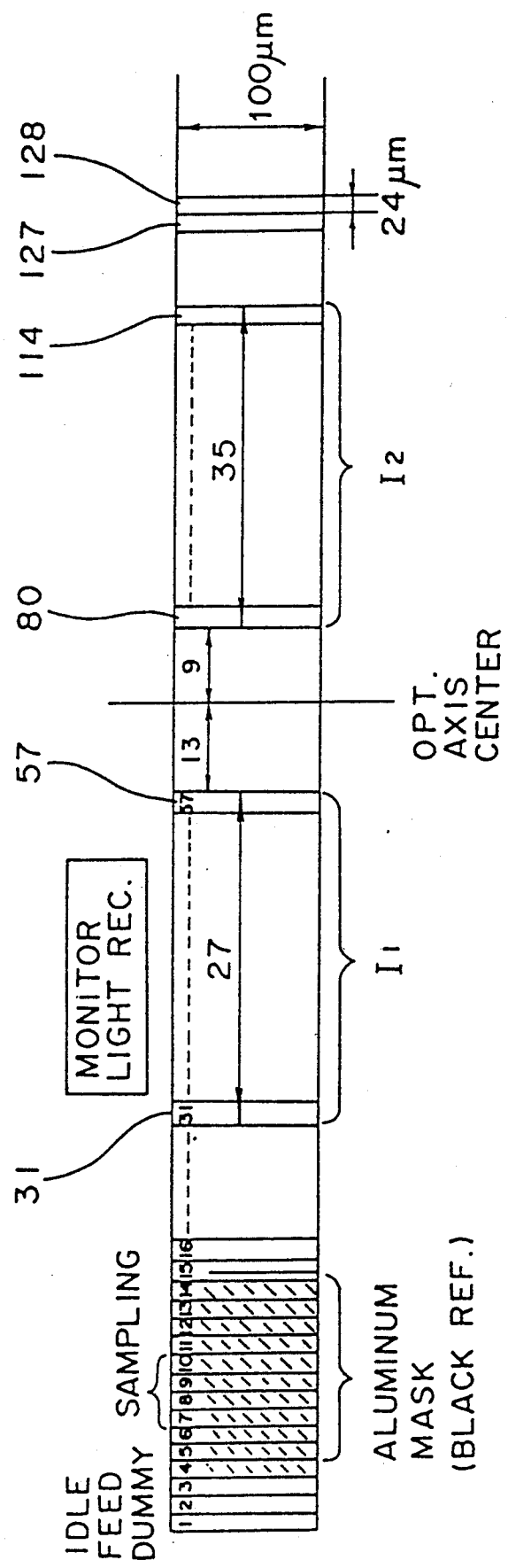
FIG. 6 is a schematic diagram for explaining a CCD shift register employed in the embodiment of FIG. 2.

Referring further to FIG. 6, there is shown a map representing allotment of functions for each cell of the CCD shift register SR according to the present embodiment. In FIG. 6, the cells are provided from cell No. 1 to cell No. 128, and 27 cells from cell No. 31 to cell No. 57 belong to the image sensor Il in FIG. 3, while 35 cells from cell No. 80 to cell No. 114 belong to the image sensor I2 in FIG. 3. The number of cells belonging to the image sensor I2 is set to be larger than that belonging to the image sensor Il, because comparison of outputs of the 27 cells belonging to the image sensor Il with outputs of the cells belonging to the image sensor I2 is successively effected, while shifting the latter outputs one by one, in such a manner that the outputs of 27 cells belonging to the image sensor Il are first compared with the outputs of 27 cells from cell No. 80 to cell No. 106 belonging to the image sensor I2, with a subsequent comparison with the outputs of 27 cells from cell No. 81 to cell No. 107 through shifting by one cell for a final comparison with the outputs of 27 cells ranging from cell No. 87 to cell No. 114.

The respective comparison results represent degree of correlation between the outputs of the 27 cells belonging to the image sensor Il and those of the corresponding 27 cells belonging to the image sensor I2. By determining the comparison result representing the highest correlation degreen, in-focus, front-focus, and rear-focus, etc. can be judged. The cells from No. 1 to No. 3 are cells for idle feeding, while the cells from No. 4 up to the half of No. 15 are of a black reference section applied with a light shielding mask by vapor deposition of aluminum to perfectly prevent light incidence, and by this aluminum vapor deposition, the electrical characteristics of these cells are also varied to a certain extent.

Figure 7:
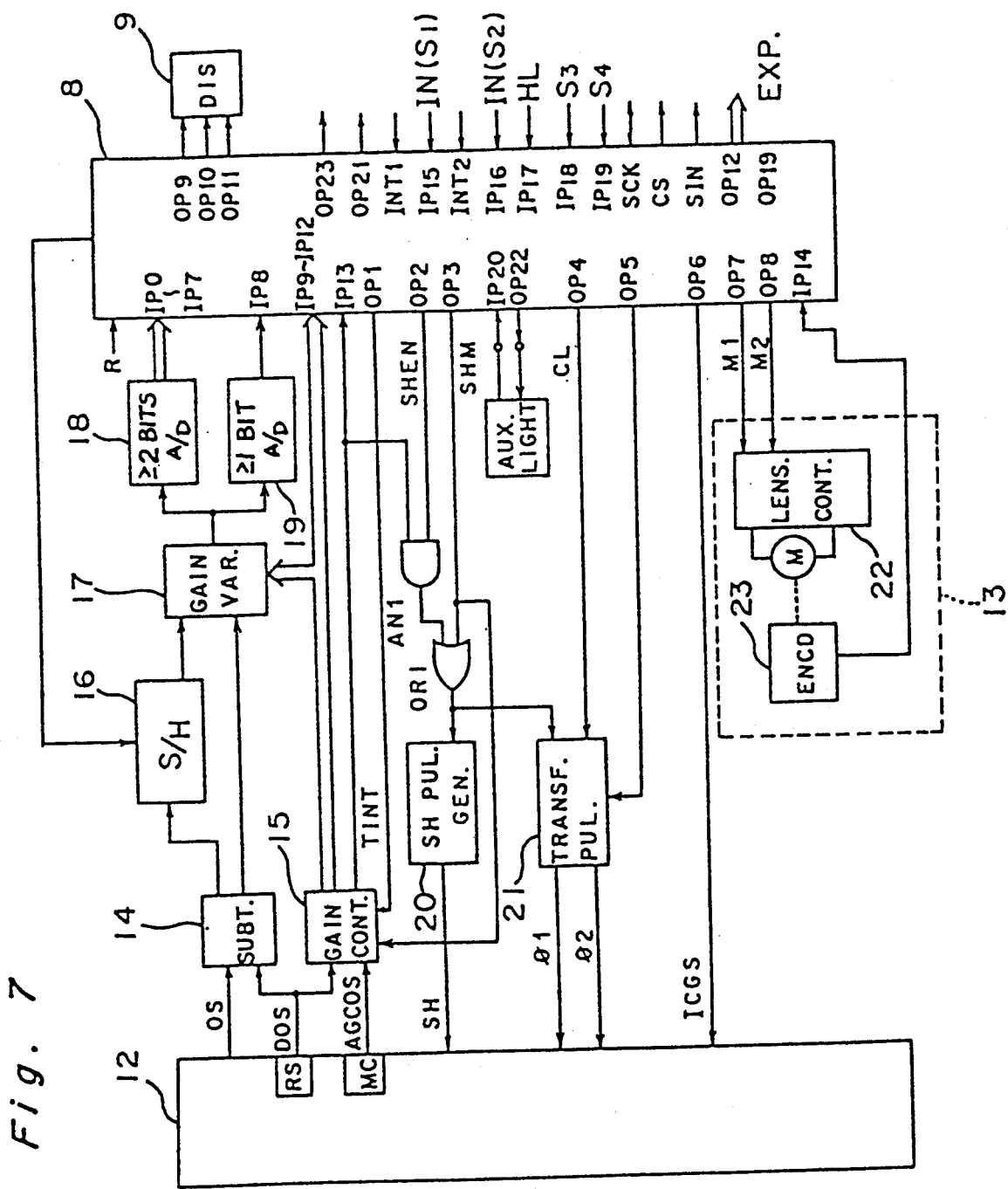
FIG. 7 is a fragmentary circuit diagram showing construction of an interface circuit to be employed in the embodiment of FIG. 2.

Reference is made to FIG. 7 showing a detailed circuit construction of the interface circuit 10 employed in the circuit arrangement of FIG. 2.

Upon detection by the micro-computer 8 of turn-on of the photographing preparation switch Sl through depression of the shutter release button (not shown) by the first stroke, the micro-computer 8 starts control for the focus detection. First, the micro-computer 8 applies the integration clear signal ICGS to the photo-electric conversion circuit 12 to reset the respective photo-sensors to the initial state, and also, restores the output AGCOS of the brightness monitoring circuit MC to the power source voltage level at the initial state by the above signal ICGS. Simultaneously with the above function, the micro-computer 8 outputs a shift pulse permission signal SHEN at "High" level. At the same time as the above integration clear signal ICGS disappears, the respective photo-sensors of the photo-electric conversion circuit 12 start lightintegration, i.e., accumulation of charge, while the brightness monitoring circuit MC starts measuring brightness of the target object to be photographed, with the output AGCOS thereof lowering from the power source voltage at the initial state by a speed corresponding to the brightness of the target object. A gain control circuit 15 connected to the photo-electric conversion circuit 12 receives as inputs, the reference voltage DOS which is the output of the reference voltage generation circuit RS and the output AGCOS of the brightness monitoring circuit MC. The gain control circuit 15 includes voltage dividing means (not shown) for producing reference voltages in six stages based on the reference voltage DOS, and determines the gain of a gain variable amplifier 17 through comparison of these voltages and the brightness monitoring output AGCOS. When the voltage drop of the output AGCOS of the brightness monitoring circuit MC is large during a predetermined limit integration time period TB from the disappearance of the integration clear signal ICGS is large so as to render the output to be lower than a predetermined voltage, a TINT signal in "High" level is outputted from the gain control circuit 15 and fed to the micro-computer 8, and also to an AND circuit ANl having input terminals connected to said circuit 15 and the micro-computer 8. The AND circuit ANl outputs a high level signal by the above signal and the high level signal of the shift pulse permission signal SHEN referred to earlier. This output signal is applied to a shift pulse generation circuit 20 through an OR circuit OR1, and, in response thereto, the circuit 20 applies the shift pulse SH to the photo-electric conversion circuit 12. The respective photo-sensors of the photo-electric conversion circuit 12 complete the integration by the above signal SH, and the accumulated charge is parallelly transferred to the corresponding cell in the CCD shift register SR.

On the other hand, the micro-computer 8 outputs the clock pulse CL to a transfer pulse generation circuit 21 inserted between the OR circuit OR1 and the photo-electric conversion circuit 12, from the time point when the photographing preparation switch Sl is turned on. Then, the transfer clock pulse generation circuit 21 produces transfer pulses $\phi 1$ and $f\phi 2$ deviated in phase through 180° from each other based on the clock pulse. When the output of the OR circuit OR1 assumes a "High" level, the transfer pulse generation circuit 21 outputs the transfer pulse $\phi 1$ which rises in synchronization therewith. More specifically, the transfer pulse $\phi 1$ is to be synchronized with the shift pulse SH, but since the CCD shift register SR has a photo-sensitivity to a slight extent, in the case where the shift pulse SH is not synchronized with the transfer pulse $\phi 1$, the CCD shift register SR senses the light by a time period out of synchronization, and the charge corresponding to the intensity of light incident thereon is accumulated as an error signal. Therefore, the transfer pulse $\phi 1$ is arranged to be perfectly synchronized with the shift pulse SH to eliminate the deviated time for preventing generation of the error signal.

Thereafter, the transfer pulses $\phi 1$ and $\phi 2$ are fed to the photo-electric conversion circuit 12 from the transfer pulse generation circuit 21. In the photo-electric conversion circuit 12, in synchronization with the negative edge of the pulse $\phi 1$ of the transfer pulses, the charge stored in the CCD shift register SR is sequentially produced from the end of the cells (i.e., from cell No. 1 in FIG. 6) as the video signal OS so as to be applied to a subtraction circuit 14 connected to the photo-electric conversion circuit 12, and also, to the gain variable amplification circuit 17 directly and through a sample hold circuit 16. The video signal OS is of a lower voltage as the intensity of light incident upon the corresponding photo-sensor is increased, and the voltage DOS-OS subtracted from the reference voltage DOS at the subtraction circuit 14 is outputted as the picture element signal.

After disappearance of the integration clear signal ICGS referred to earlier, in the case where the output voltage AGCOS of the brightness monitoring circuit MC does not fall below the predetermined voltage within the predetermined limit integration time period TB, and the TINT signal is not outputted from the gain control circuit 15, the micro-computer 8 applies a shift pulse generation instruction signal SHM to the shif.t pulse generation circuit 20 through the OR circuit OR1 after elapse of the time period TB. Upon receipt of this signal, the shift pulse generation circuit 20 applies the shift pulse to the photoelectric conversion circuit 12, thereby to cause the accumulated charge of the photosensor array PA to be transferred to the CCD shift register SR. Thus, in the similar manner as described earlier, the video signal OS is produced from the video signal output circuit $V_S$ by the transfer pulses $\phi1$ and $\phi2$, and the subtracted voltage DOS-OS is outputted from the subtraction circuit 14 as the picture element signal. The sample hold circuit 1 6 connected also to the micro-computer 8 receives the sample hold signal S/H fed by the micro-computer 8 when the picture element signal DOS-SO corresponding to the aluminum mask portion at the 7th to 10th cells of the CCD shift register SR is outputted as as to hold such picture element signal. The above signal is applied to th gain variable amplification circuit 17, and this signal and the picture element signal after the llth signal produced from the subtraction circuit 14 are subjected to subtraction at the gain variable amplification circuit 17, with the output equivalent to a difference therebetween being amplified by a gain to be controlled by the gain control circuit 15. The signal thus amplified is subjected to A/D conversion by an A/D conversion circuit 18 inserted between the gain variable amplification circuit I7 and the micro-computer 8 so as to be formed into picture element signal data of at least two bits, or converted into a digital form by a binary circuit 19 also inserted between the circuit 17 and the micro-computer 8 for being applied to said micro-computer 8 as picture element signal data of at least one bit.

The gain control data obtained by the gain control circuit I5 is also applied to the micro-computer 8, which effects calculation based on both the gain control data and the picture element signal data so as to compute the deviation amount of the images on the image sensors I1 and I2 up to the in-focus state. The micro-computer 8 also calculates the driving amount of the lens based on the deviation amount of the images, and controls a lens control circuit 22 so as to drive the objective lens (not shown) by the lens driving amount thus calculated. Thus, until the objective lens reaches the in-focus position, the micro-computer 8 repeats the sequence from the generation of the integration clear signal ICGS to the lens driving. Upon judgement that the focus detection is impossible due to low brightness (LO-light) as a result of the focus detection described earlier, the micro-computer 8 effects the focus detection by the aid of an auxiliary light if an auxiliary light means is mounted, while it gives a display for "focus detection impossible" at a display circuit 9 connected thereto, if no auxiliary light means is attached.

Subsequently, functions of the camera on the whole, including the functions for the focus detection as described so far, will be explained hereinafter with reference to the basic circuit diagram of FIG. 2, and the flow-charts for the micro-computer shown in FIGS. 11 through 16.

Figure 11A:
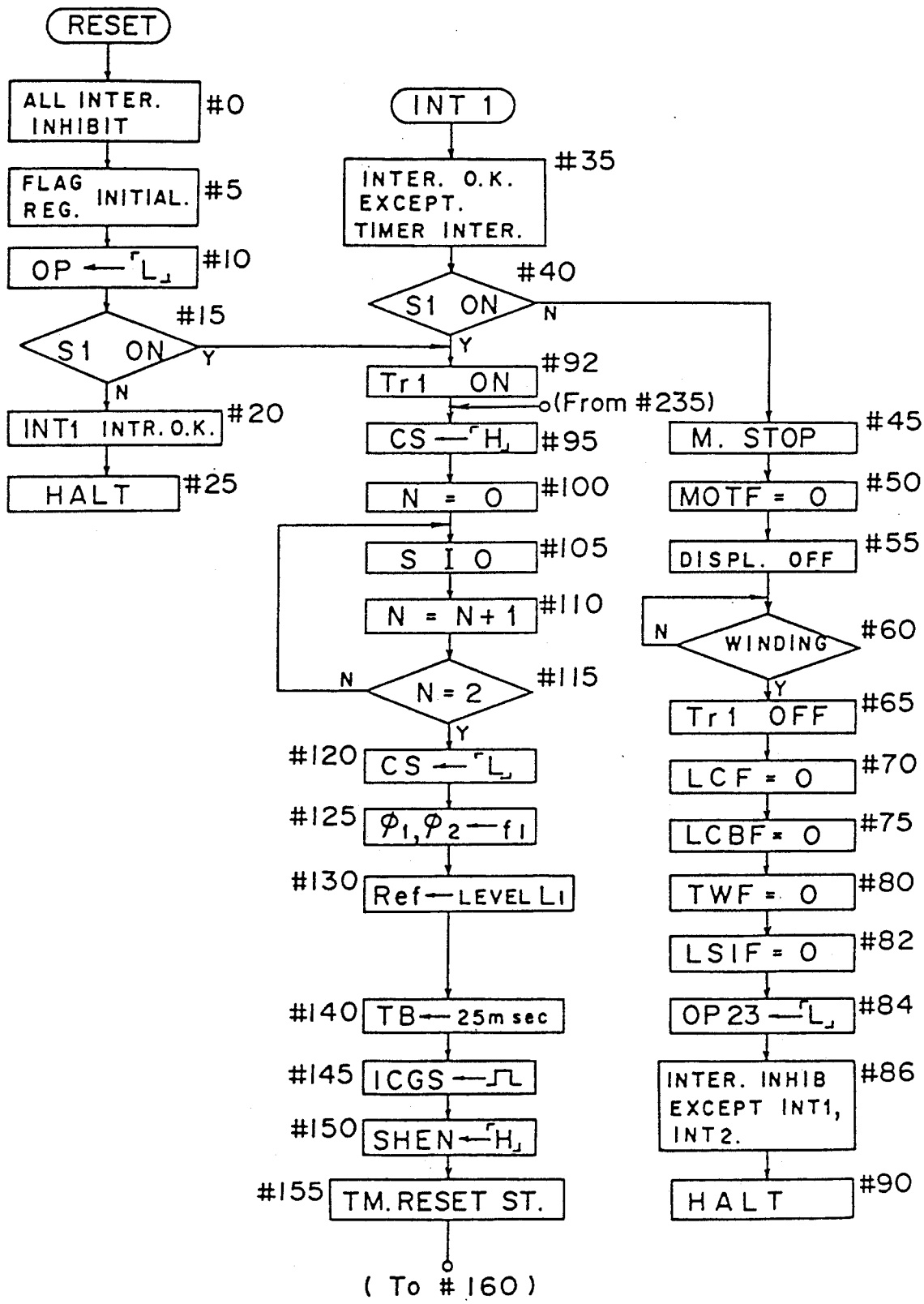
FIGS. 11(a) through 11(c), which are continuous.
Figure 11B:
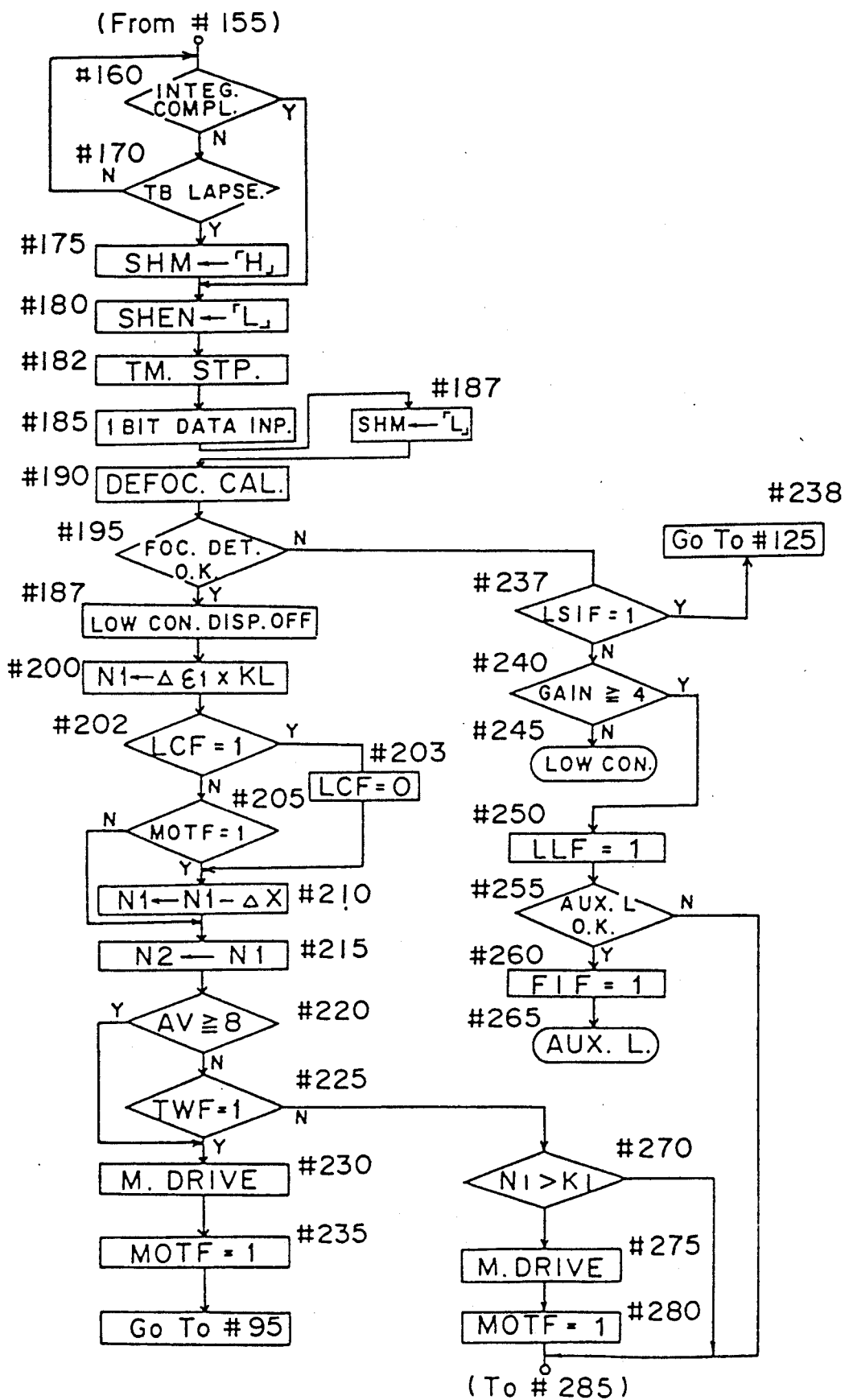
Figure 11C:
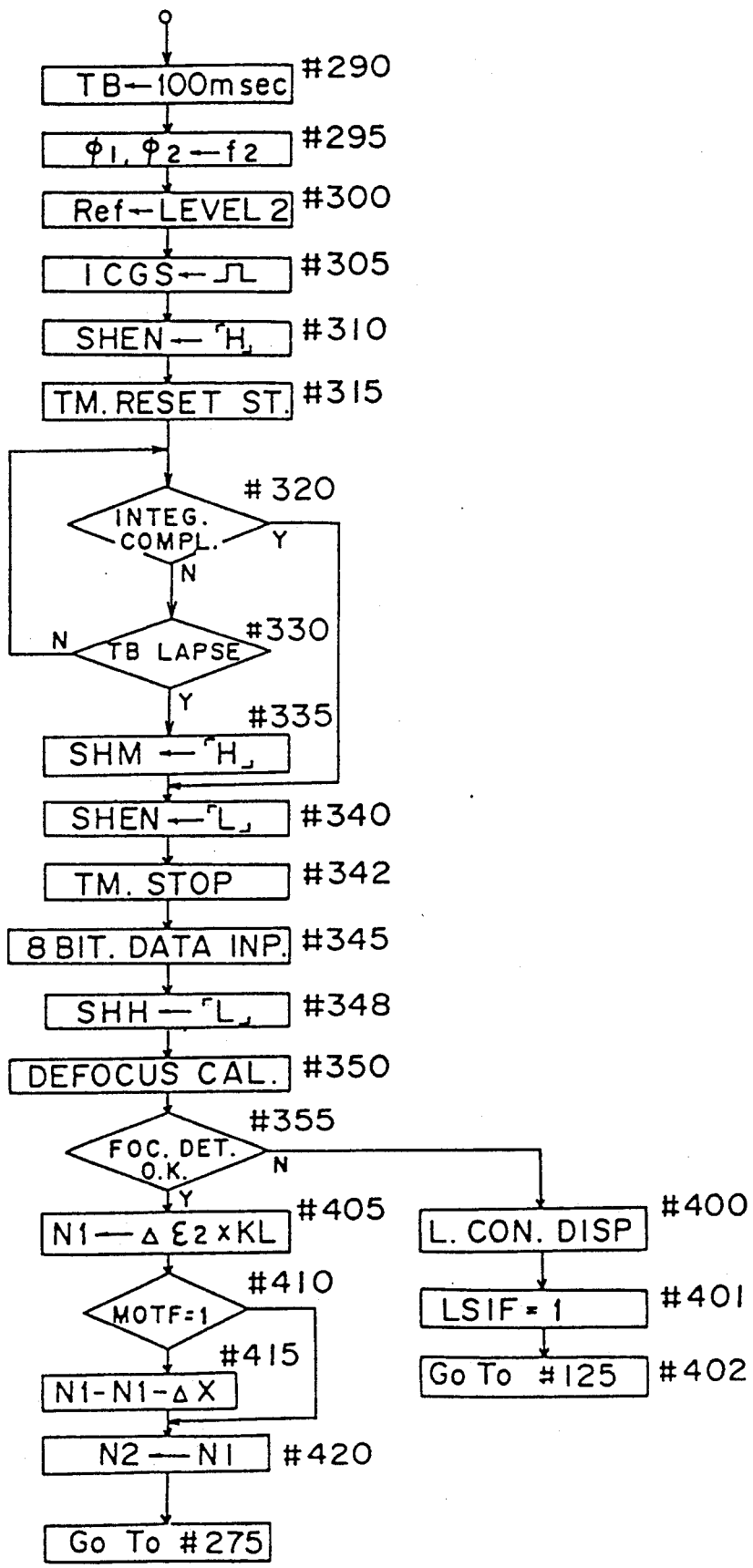

Upon loading of the power source battery E, by a reset resistance $R_R$ and a capacitor $C_R$ connected to each other in series and also, to the power source E at one end of the resistor $R_R$, with a junction therebetween connected to a reset terminal R of the micro-computer 8, a signal changing from "Low" level to "High" level is applied to said reset terminal R, whereby the micro-computer 8 executes the routine for resetting as shown in FIGS. 11(a) to 11(c) which are continuous onto each other.

In the first place, the micro-computer 8 inhibits the interruption into this routine, and initializes all 15 flags and registers (steps #0 and 5). Then, the micro-computer 8 renders all output terminals OP1 to OP23 to be "Low" and judges whether or not the photographing preparation switch S1 is turned on. If this switch S1 is not in the "on" state, the micro-computer 8 permits the interruption only to an interruption terminal INT1 and then, stops (steps #15 to #25).

When the photographing preparation switch S1 is turned on in the state where the power source battery E is loaded with the camera, the output of the AND circuit AN5 becomes "Low" level, with the power feeding transistor Tr1 being turned on so as to supply the power to the respective circuits, and thus, the light measuring circuit 3, film sensitivity setting circuit 4, and photographing mode setting circuit 5 start functioning to feed signals to the exposure calculation and control circuit 1, which produces a signal of "High" level from its terminal HL when the diaphragm aperture value AV represented by the APEX notation is larger than 8, based on the signal thus inputted. Meanwhile, by the turning on of the switch S1, an inverter IN2 connected to the stationary contact of the switch S1, and also to the micro-computer 8 through a delay circuit DEL and an exclusive OR circuit EOR, produces a signal of "High" level, which is adapted to be applied to the exclusive 0R circuit EOR through delay circuit DEL, or directly to said circuit EOR without passing through said delay circuit DEL. Accordingly, the exclusive OR circuit EOR applies a signal changing in level as in "Low"→'- 'High"→"Low", to the interruption terminal INT1 of the micro-computer 8. Similarly, in the case where the switch S1 is turned off from the "on" state also, a signal changing in level as in "Low"→"High"→"Low" is applied to the interruption terminal of the micro-computer 8. In response to the change of this signal, an interruption takes place in the micro-computer 8, and the interruption flow of INT1 as shown in FIG. 11(a) is to be executed.

In the first place, the micro-computer 8 permits interruptions other than a timer interruption, and judges whether the interruption results from the turning on or turning off of the photographing preparation switch S1 based on the level of its input terminal IP15 (steps #35, 40). If it is due to the turning off, the micro-computer 8 outputs a signal from its output terminal OP 7, 8 to stop the lens driving motor, and resets the motor flag MOTF (steps #45, 50). The micro-computer 8 further renders its output terminals OP9, OP10 and OP11 to be "Low" level for turning off the display, and checks whether the film is being wound or not based on a signal applied to the input terminal IP21, thereby to wait for the completion of winding, i.e., change of the signal to IP1 from "L" to "H", if the film is being wound. Upon completion of the winding, the micro-computer 8 outputs a signal of "Low" level from its terminal OP20 so as to turn off the power feeding transistor Trl (step #65). Meanwhile, if the film is not being wound, said microcomputer 8 turns off the transistor Trl immediately, respectively resets a low contrast flag LCF showing low contrast, a two times flag TWF indicating photographing after a first time photographing during a continuous photographing mode, a low contrast back flag LCBF indicating the state of retreating of the lens in a lens scanning for contrast detection to be effected in a low contrast condition, and a low contrast scanning inhibit flag LSIF, and, makes its terminal OP23 "Low" level for inhibiting interruption other than that effected by input of an interruption signal into INT1 and INT2 so as to stop subsequently (steps #75 to 90).

At step #40, when the photographing preparation switch Sl is in the on state, the power feeding transistor Trl is turned on (step #92), and serial data transfer is effected with respect to the circuit within an interchangeable lens, so as to receive from said interchangeable lens, a conversion factor KL for converting the calculated defocus amount and a fully opened diaphragm aperture value of the lens, into the number of revolutions of the lens driving motor.

To this end, a chip select signal CS indicating to effect the data transfer, is rendered to be of "High" level, with the variable N representing the number of data transfer being set to 0, and the transfer is effected (steps #95 to 105). In this transfer, the clock SCK is applied from the micro-computer 8 to the lens circuit 7, and in synchronization with the positive edge thereof, data for one bit is produced from the lens circuit 7. In synchronization with the negative edge of the clock SCK, the micro-computer 8 reads the data, and by repeating the above procedure eight times, i.e., for eight bits, completes one data transfer. Subsequently, the micro-computer 8 adds 1 to the variable N to see if the variable N becomes 2, and if it is not of 2, the procedure returns shifted to step #105, while if the variable N has become 2, the micro-computer 8 judges that the data transfer for 2 bytes has been terminated, and makes the chip select signal CS "Low" to show such state (steps #110 to 120).

Thereafter, the micro-computer 8 effects the control for the focus detection, but before the description thereof, reading of data fed from the shift register will be explained.

In FIG. 7 showing the construction of the interface circuit for the circuit arrangement of FIG. 2 as referred to earlier, the A/D converter of at least one bit 19 is provided to receive the picture element signal from the gain variable control circuit I7 in addition to the A/D conversion circuit of at least two bits. The above binary circuit is intended to accelerate the processing (excluding the lens driving) related to the focus detection, although the accuracy for the focus detection may be slightly lowered thereby.

In a preferred embodiment, the A/D converter of at least one bit 19 is a converter of one bit (a comparator) and the A/D converter of at least two bits 18 is an 8 bit A/D converter. In any event, the A/D converter of at least two bits 18 would always have a greater number of bits than the A/D converter of at least one bit 19.

The reasons why the processing is accelerated are as follows.

(i) The period of time required for A/D conversion of each data is shortened, resulting in shortening of the data reading out period.

(ii) The period of time required for calculating each data is short due to one bit (at least one) processing.

(iii) Owing to the A/D conversion of one bit, the voltage for the data as required in the eight bits (at least two) is not required for the picture element signal as an analog data. In other words, it is possible to reduce the charge accumulation (light integration) time period for accumulation of charges by the photosensor array PA.

More specifically, with respect to item (i), the effect is achieved by raising the frequencies for the transfer clocks φ1 and φ2 of the CCD. Regarding item (ii), the micro-computer 8 can effect the calculation in one bit at a far higher speed than that of 8 bits. The effects as in item (iii) may be obtained by lowering the average output voltage level of the analog picture element signals. This will be described in more detail later.

Conventionally, in the case of the processing at 8 bits, from the resolving power and S/N ratio necessary therefor, voltage higher than a predetermined voltage (an average output voltage level) Vl is required for the respective analog picture element signals. It takes a certain predetermined integration time period (represented by TI) at a predetermined brightness until each photosensor of the photosensor array PA accumulates a charge up to a level capable of ensuring arrival of the corresponding picture element signal at the voltage level Vl. Meanwhile, in the case of the processing at 1 bit, a voltage lower than ¼ of the voltage Vl as required in the case of the processing of 8 bits is sufficient for the purpose, and in the same predetermined brightness the integration time period is also reduced to ¼ (since the dark current as a noise component is also reduced due to reduction of the integration time period, the S/N ratio is not varied as compared with that in the case of the processing at 8 bits). In the present embodiment, whether each photosensor of the photosensor array PA has accumulated a charge up to a level capable of ensuring arrival of the corresponding picture element signal at the voltage level Vl or not is checked by checking the amount of variation of the output voltage AGCOS of the brightness monitoring circuit MC, instead of directly monitoring the amount of the charge accumulated in the photosensor.

In FIG. 10 showing the relation between the output voltage AGCOS of the brightness monitoring circuit MC with respect to the brightness and the integration time period, when the processing is effected at 8 bits, the variation of the output voltage AGCOS of the monitoring circuit MC is checked in the range of 1.4 V to 2.8 V. The upper limit at 2.8 V is so set that the respective photosensors of the photosensor array PA will not be saturated with respect to general target objects to be photographed. Accordingly, upon arrival the amount of variation of the voltage at 2.8 V within a predetermined limit integration time period (100 m sec. in the present embodiment), the TINT signal and thus the shift pulse SH are generated, so that the charge stored in the individual photosensors of the photosensor array PA is shifted to the shift register SR. On the other hand, in the case of the processing at one bit, since the amount of variation of the voltage may be reduced to ¼ (0.35 to 0.7 V) as compared with the case of the processing at 8 bits described above, it is clear that the predetermined limit integration time period may also be reduced to ¼ (25 m sec.), resulting in lowering of the averaged output voltage level of the analog picture element signals.

Figure 8:
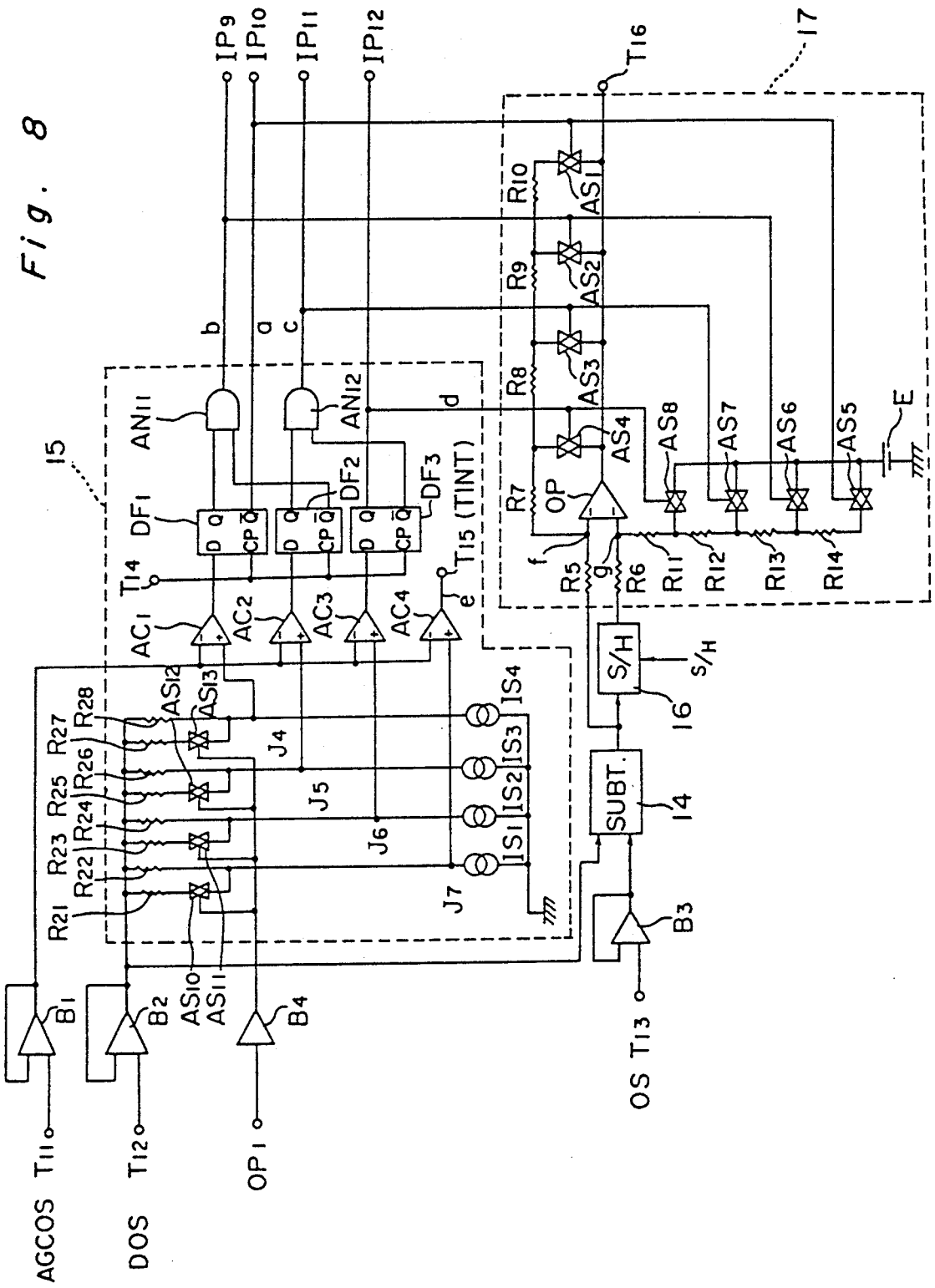
FIG. 8 is a fragmentary circuit diagram representing a gain control circuit and a gain variable amplification circuit to be employed in the embodiment of FIG. 2.

In the circuit of FIG. 8 in which detailed constructions of the gain control circuit 15 and gain variable amplification circuit 17 in FIG. 7 are specifically shown, the reference voltages to be compared with the output voltage AGCOS are multiplied by ¼ in the case of the processing at 1 bit in order to achieve the state as described above.

In the circuit arrangement of FIG. 8, there are provided terminals T11, T12 and T13 which are respectively connected to the terminals T1, T2 and T3 in FIG. 4, a terminal 14 for receiving signal SHM from the micro-computer 8 after lapse of the set limit integration time period TB, a terminal T15 for outputting the TINT signal to be produced upon arrival of the output voltage AGCOS at the zone E (1 bit) or zone G (8 bits) in FIG. 10 within the limit integration time period TB, and a terminal T16 for outputting the picture element signal amplified at the gain variable amplification circuit 17 to the A/D conversion circuit 19 or 18 for 1 bit or 8 bits.

The gain control circuit 15 includes comparators AC1, AC2, AC3 and AC4 for checking the degrees of variation of the output voltage AGCOS of the brightness monitoring circuit MC in a stepwise manner after disappearance of the integration clear signal ICGS. The inverting input of each of the comparators AC1, AC2, AC3 and AC4 is connected through a buffer B1, to the terminal T11 to which the output voltage AGCOS of the brightness monitoring circuit MC is applied. The non-inverting outputs of the comparators AC1, AC2, AC3 and AC4 are respectively connected to a junction J4 between a resistance R28 and a constant current source IS1, a junction J5 between a resistor R26 and a constant current source IS2, a junction J6 between a resistor R24 and a constant current source IS3, and a junction J7 between a resistor R22 and a constant current source IS4. To the resistors R28, R26, R24 and R22, there are respectively connected, in parallel relation, a series-connection of a resistor R27 and an analog switch AS13, a series-connection of a resistor R25 and an analog switch AS12, a seriesconnection of a resistor R23 and an analog switch AS11, and a series-connection of a resistor R21 and an analog switch AS10. The value of the resistor R28 and that of the resistor R27 are in such a relation as R28=(⅓)R27, and similarly, values of other resistors are so related as in R26=(⅓)R25, R24=(⅓)R23, and R22=(⅓)R21, whereby upon turning on of the respective analog switches, the composite resistance value of each parallel resistors will become ¼ of the resistance value of the individual resistors R22, R24, R26 and R28. When the processing of the picture element signals at one bit is to be effected, a signal of "High" level is produced from the terminal OP1 of the micro-computer 8, and the analog switches AS10 to AS13 are turned on through the buffer V4, with a consequent variation of the reference voltages fed to the non-inverting input terminals of the comparators AC1 to AC4.

The resistors R21 to R28 are connected through a buffer B2, to the terminal T12 applied with the reference voltage DOS. Since the reference voltages fed to the non-inverting input terminals of the comparators AC1 to AC4 are obtained by respectively subtracting the voltage as products of the resistance value of the corresponding resistor and the amount of the constant current generated by the corresponding constant current source, from the output voltage DOS of the reference voltage generation circuit RS, it is possible to produce any desired reference voltage by properly selecting the resistance value of the corresponding resistor and the amount of the current source generated by the corresponding constant current source.

When the desired reference voltage for the comparators are formed in the stepped manner, it becomes possible to invert the outputs of the comparator stepwise according to the degree of variation of the output voltage AGCOS of the brightness monitoring circuit MC. The outputs of the comparators AC1, AC2 and AC3 are respectively applied to data terminals D of D flip-flops DF1, DF2 and DF3. To clock pulse input terminals CP of these D flip-flops which determine the timing for taking-in the data, the shift pulse generation instruction signal SHM of the micro-computer 8 is applied after lapse of the integration limiting time TB, whereby the outputs of the comparator AC1, AC2 and AC3 at this moment are taken in by the respective D flip-flops. The output signal (e) of the comparator AC4 is the TINT signal which is outputted when the output voltage AGCOS of the brightness monitoring circuit MC has entered the zone E (in the case of the processing at 1 bit) or zone G (in the case of the processing at 8 bits) in FIG. 10 within the integration limiting time. An AND circuit AN11 has input terminals connected to the output Q of the D flip-flop DF1 and the output $\overline{Q}$ of the D flip-flop DF2, while an AND circuit AN12 has input terminals connected to the output Q of the D flip-flop DF2 and the output $\overline{Q}$ of the D flip-flop DF3, with respective output signals being represented by (b) and (c). Moreover, the output signal of the output $\overline{Q}$ of the D flip-flop DF1 is represented by (a), and these signals (a), (b), (c), (d) and the TINT signal (e) respectively correspond to the zones (A), (B), (C), (D) and (E) (for the processing at 1 bit) or zones (C), (D), (E), (F) and (G) (for the processing at 8 bits) in FIG. 10.

The relations between the states of these signals and the zones in FIG. 10 are shown in Table 1 below.

TABLE 1

| Zone | | Signal | | | | |
|---|---|---|---|---|---|---|
| 1 bit | 8 bits | a | b | c | d | e |
| A | C | 1 | 0 | 0 | 0 | 0 |
| B | D | 0 | 1 | 0 | 0 | 0 |
| C | E | 0 | 0 | 1 | 0 | 0 |
| D | F | 0 | 0 | 0 | 1 | 0 |
| E | G | 0 | 0 | 0 | 1 | 1 |

Upon receipt of the signals (a), (b), (c) and (d), the gain variable amplification circuit 17 sets gains corresponding to the respective signals as described hereinbelow.

As shown in FIG. 8, the gain variable amplification circuit 17 is provided with an operational amplifier OP which has its input terminals f and g respectively connected to the subtraction circuit 14 and the sample-hold circuit 16 through resistors R5 and R6. The resistors R5 and R6 together with resistors R7 to R14 are provided to determine the gains, and are set to have such resistance values that, when the resistance values for the resistors R5, R6, R7, R8, R11 and R12 are represented by r, the resistance values of the resistors R9 and R13 are given by 2r, and those of the resistors R10 and R14 become 4r. Analog switches AS1, AS2, AS3, AS4, AS5, AS6, AS7 and AS8 are connected to the resistors R7 to R14 as shown to receive the above signals (a), (b), (c) and (d), and the analog switches AS1 to AS4 select the resistors R7 to R10 to determine the feedback resistance value of the operational amplifier OP, while the analog switches AS5 to AS8 select the resistors R11 to R14 to determine the bias resistance value of the operational amplifier OP.

The correspondence between the signals (a), (b), (c) and (d) and the analog switches AS1 to AS8 which are conducted when the corresponding signals become "High", and the resistors and gains selected at that time are shown in Table 2 below.

TABLE 2

| Signal | Analog switches to be conducted | Resistors to be selected | Gain |
|---|---|---|---|
| a | AS1, AS5 | R7~R10, R11~R14 | 8 |
| b | AS2, AS6 | R7~R9, R11~R13 | 4 |
| c | AS3, AS7 | R7, R8, R11, R12 | 2 |
| d | AS4, AS8 | R7, R11 | 1 |

Referring back to the flow-chart of FIG. 11(a), when the processing of 1 bit is to be effected as in the foregoing description, the micro-computer 8 first produces a change-over signal of "High" level from the terminal OP5 so as to cause the transfer pulse generator 21 to generate the transfer pulses $\phi 1$ and $\phi 2$ of a frequency f1 which is higher than that f2 of the transfer pulses $\phi 1$ and $\phi 2$ generated by the generator 21 for the processing at 8 bits, and also produces a "High" level signal at the terminal OP1 so as to multiply the reference voltages to be fed to the non-inverting input terminals of the comparators AC1 to AC4 for the gain determination by $\frac{1}{8}$ (steps #125 and 130). The micro-computer 8 further sets the integration limiting time period TB to 25 m sec. (steps #135 and 140), and produces the integration clear signal from the terminal OP6 to start the charge accumulation light integration by the photosensor array PA (steps #135, 140 and 145). Thereafter, the micro-computer 8 produces the shift pulse generation permitting signal SHEN (step #150), and then, resets an integrating timer TM1 for starting (step #155).

The micro-computer 8 judges at step #160 whether or not the charge accumulation by the photosensors of the photosensor array PA has been terminated, and if it has not been terminated, waits for the integrating time TB (25 m sec.) to pass (steps #160 and 170). Meanwhile, in the case where the charge accumulation is not terminated within the integrating time TB (25 m sec.) from the starting of the charge accumulation, the micro-computer 8 outputs the shift pulse generating instruction signal SHM of "High" level from the terminal OP3 for causing the shift pulse generator 20 to generate the shift pulse (step #175) and then renders the shift pulse permitting signal SHEN to be "Low" level (step #180). Thereafter, it stops the integrating timer (step #182). The signal SHEN is also rendered to be "Low" level when the charge accumulation has been terminated at step #160.

The micro-computer 8 reads from the terminal IP8, the picture element signals fed in synchronization with the above transfer pulses $\phi 1$ and $\phi 2$ and converted to digital signals of 1 bit by the binary circuit 19, and, after making the shift pulse generation instruction signal SHM "Low", calculates the defocus amount based on digital picture element signals of 1 bit (steps #185 to 190).

In the case where the focus detection based on the above calculation result is impossible, the procedure proceeds to step #237 from step 195. On the other hand, if the focus detection is possible, the micro-computer 8 turns off the low contrast display, and calculates the amount revolutions N1 of the motor through multiplication of the defocus amount $\Delta\epsilon l$ by the conversion factor KL described earlier (steps #187 and 200).

Subsequently, the micro-computer 8 judges at step #202 whether or not the low contrast flag LCF has been set, and if it has been set, resets the flag LFC at step #203, and if it has not been set, checks at step #205 whether or not the motor flag MOTF has been set.

In the case where the motor flag MOTF has been set, i.e., if the motor is being driven, the count number $\Delta X$ indicating the amount of revolutions of the motor during the preceeding charge accumulation period and the calculation period is subtracted from the amount revolutions N1 obtained by the calculation as described earlier to find a real amount of revolutions to be actually effected (steps #205 and 210). Subsequently, in the similar manner as in the case where the motor flag MOTF has been reset, the real amount of revolutions N1 thus found are set as N2 (step #215).

The micro-computer 8 judges whether or not the optimum diaphragm aperture value AV represented by APEX is larger than 8 ($F_{NO}$ is above 16) based on the signal fed from the exposure calculation and control circuit 1 and applied to a terminal IP17, and also whether or not the photographing is that after the first exposure in the continuous photographing based on the state of the flag TWF (steps #220 and 225). If the diaphragm aperture value AV is larger than 8 or the photographing is after the first exposure in the continuous photographing, the micro-computer 8 drives the motor M2 and sets the motor flag MOTF so that the operation returns to step #91 for effecting the focus detection based on the digital picture element signals of 1 bit (steps #220 to 235). Although such focus detection is rather inferior in the detecting accuracy as compared with that in the case of 8 bits, the target object is included in the depth of field of the lens assembly if the diaphragm aperture is closed down, thus providing a picture sufficiently in focus with respect to the target object is obtained by photographing. The aperture value to which the diaphragm is closed down is preferably larger than 8 (AV°8) according to the APEX notation. It is to be noted that this value is not limited to the above, but may be different according to the calculation systems and optical systems, and can be of such a value that an in-focus width which is inevitably provided depending upon the accuracy of the calculation by 1 bit does not cause the target object to go out of the depth of field of the lens assembly. The judgement whether or not the photographing is after the first exposure in the continuous photographing is required to inihibit the conventional focus detection by 8 bits in such a condition where the time period between the exposures becomes too short to effect the conventional focus detection by 8 bits.

Figure 15:
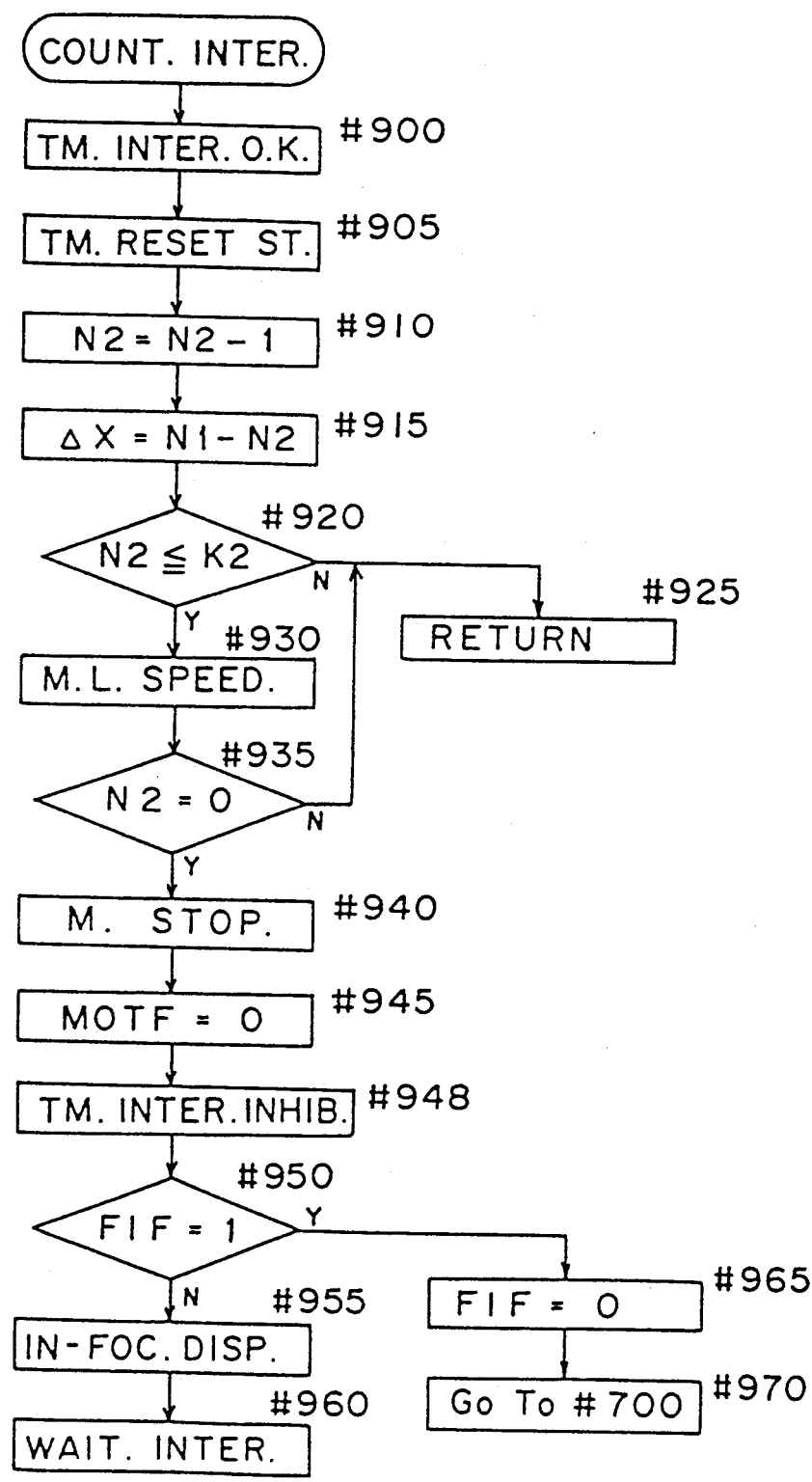
Figure 16:
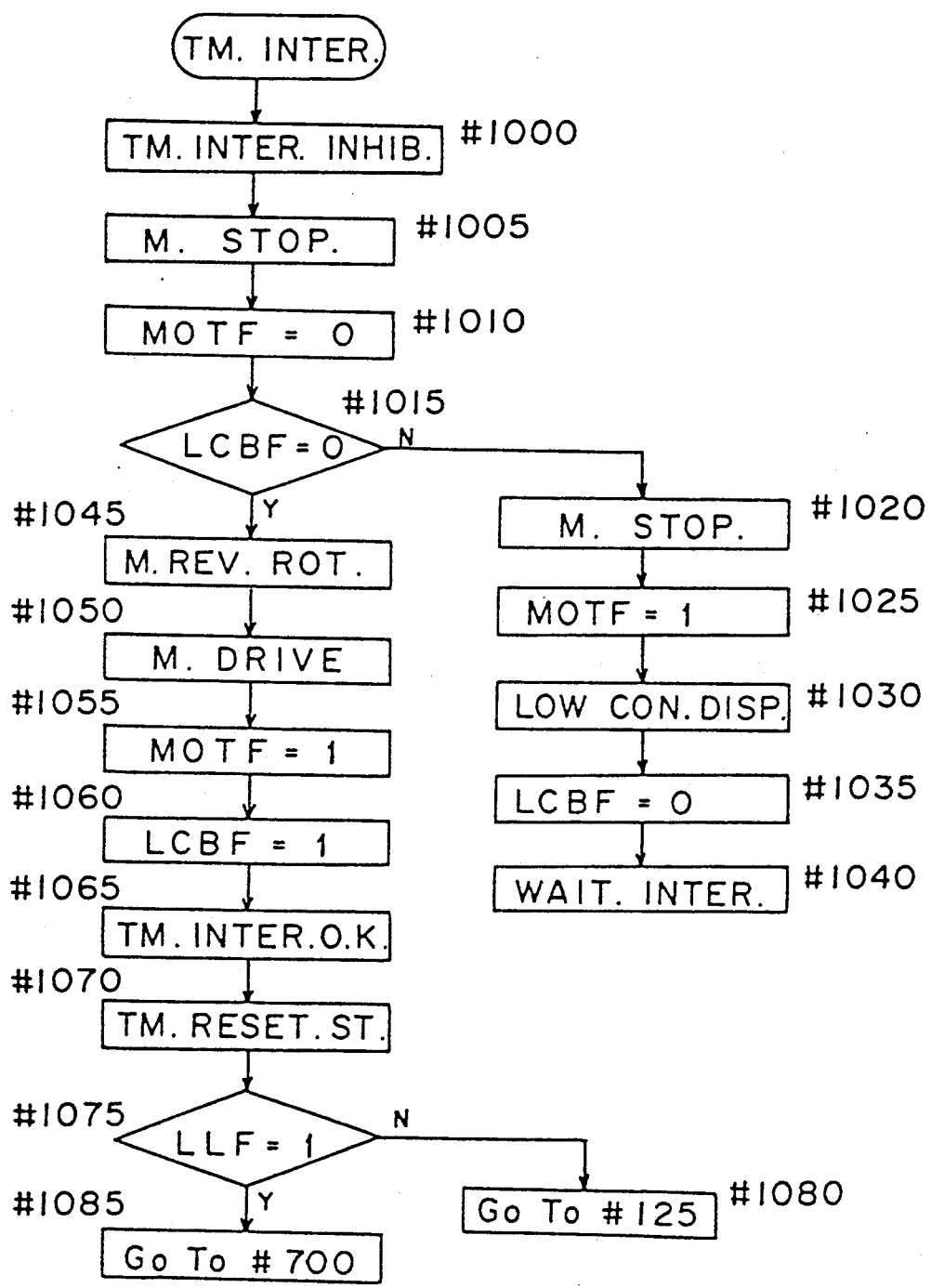

Referring also to FIGS. 15 and 16, the flow for monitoring the amount of the revolutions the motor M2 will be described hereinbelow.

The micro-computer 8 effects a count interruption as shown in FIG. 15 at each pulse signal from an encoder 23 shown in FIG. 7. This encoder is arranged to produce 16 pulses for each one revolution of the motor.

In the counter interruption illustrated in FIG. 15, the timer interruption is first allowed at step #900. This timer interruption takes place when any pulse from the encoder 23 is not received for a predetermined period of time to be set by the timer as in the case where the lens assembly driven by the motor M2 can not move any further by the driving of the motor in the same direction. The micro-computer 8 resets the timer for the timer interruption to start (step #905) and calculates ΔX representing the amount of the revolutions of the motor M2 during the latest charge accumulation period by subtracting 1 from the amount of revolutions N2 and by subtracting N2 from N1 (steps #910 and 15) Thereafter, the micro-computer 8 checks whether or not the amount of revolutions N2 is 0, i.e., whether or not the in-focus condition is achieved after reducing the revolution speed of the motor if the amount of revolutions N2 is smaller than a predetermined value K2 indicating that the lens assembly is in the vicinity of the in-focus point (steps #920 to 935). If the above amount of revolutions N2 is not 0, the operation of the micro-computer 8 proceeds to step #925 for subsequent returning, and if the amount of revolutions N2 is 0, the micro-computer 8 stops the motor and resets the motor flag MOTF as well as inhibits the timer interruption (steps #940 to 948). Then, the micro-computer 8 judges whether or not a flag FIF representing the focus detection by 1 bit during the auxiliary light mode has been set, and if it has been set, resets this flag. Then the operation proceeds to the auxiliary light mode at step #700 (steps #965 and 970). On the other hand, if the flag FIF has not been set, the micro-computer 8 effects the in-focus display and waits for an interruption (steps #955 and 960).

Subsequently, the timer interruption as shown in FIG. 16 will be described hereinbelow.

This interruption takes place when any pulse from the encoder 23 is not received within a predetermined period of time, whereby the micro-computer 8 first inhibits the o timer interruption (step #1000) and stops the motor M2, resetting the motor flag MOTF (steps #1005 and 1010). The micro-computer 8 also judges whether or not a flag LCBF indicating that the direction of the previous drive of the motor M2 was for shifting the lens assembly rearward, has been set, and if it has not been set to indicate that the motor was driven in the direction for shifting the lens assembly forward, rotates the motor in the reverse direction for shifting the lens assembly rearward, and sets the motor flag MOTF (steps #1045 to 1055). The micro-computer 8 further sets the flag LCBF indicating the state that the motor has been retreated, and permits the timer interruption to reset the timer for starting (steps #1060 to 1070). Subsequently, it judges whether or not a low light flag LLF during the auxiliary light mode has been set, and if the flag has been set, the procedure proceeds to the auxiliary light mode at step #700, and if it has not been set, the procedure advances to the normal integrating mode at step 125 (steps #1075 to 1085). In the case where the flag LCBF has been set, the micro-computer 8 stops the motor, resets the motor flag MOTF, gives the display of low contrast, resets the flag LCBF to and waits for an interruption (steps 1020 to 1040).

Referring back to FIG. 11(b), when the condition is neither AV≧8 nor TWF=1 referred to earlier, the procedure proceeds to step #270 at which the micro-computer 8 sees whether or not the amount of revolutions N1 is larger than the predetermined value K1. If the amount of revolutions N1 is above this predetermined value, the micro-computer 8 drives the motor and sets the flag MOTF (steps #275 and 280). It is to be noted here that the predetermined value K1 represents the amount of revolutions of the motor within the time period obtained through addition of the data damping and calculating time period to the limit integrating time period of 100 m sec. When the amount of revolutions N1 is below the predetermined value K1 at step #270 or after execution of step #280, the micro-computer 8 sets the limit integration time period TB to 100 m sec., the frequency of the transfer clocks $\phi 1$ and $\phi 2$ to f2 (<f1), and the reference voltage for determining the gain of the amplifier 17 to those for 8 bits, and outputs the integration clear signal ICGS in the form of pulse to effect the operations necessary for generation of picture element signals OS up to step #342 in the similar manner as in one bit (steps #285 to 342). The micro-computer 8 then receives the digital picture element signals of 8 bits from the terminals IP0 to IP7 and, after making the instruction signal SHM "Low", calculates the defocus amount. If the focus detection is impossible as a result of the above calculation, it effects the low contrast display, and sets the flag LSIF indicating inhibition of the low contrast scanning (steps #345 to 402). Subsequently, the procedure proceeds to step #125.

Meanwhile, when the focus detection is found to be possible at step #355, the micro-computer 8 calculates the amount of revolutions N1 of the motor through multiplication of the defocus amount $\Delta\epsilon 1$ by the conversion factor KL, and if the motor flag MOTF has been set, subtracts the amount of revolutions $\Delta x$ during the latest charge accumulation, data damping and calculation period, from the amount of revolutions N1 obtained as described above (steps #410 and 415) so as to execute step #420 at which the amount of revolutions N1 is rendered to be N2. If the motor flag MOTF has not been set, the micro-computer 8 executes step #420 by skipping step #415, and repeats the operations from step #275.

At steps #190 and #195 shown in FIG. 11(a), when the focus detection is impossible, the procedure proceeds to step #237, and if the flag LSIF indicating the low contrast scan inhibition has been set, the procedure proceeds to step #125, while if the flag LSIF has not been set, the procedure proceeds to step #240. Thus, the micro-computer 8 judges whether or not the cause of the impossible focus detection is due to a low contrast or a low brightness (referred to as a low light hereinafter) based on whether or not the gain as inputted from the gain control circuit 15 is larger than 4. If the gain is above 4, the micro-computer 8 regards the cause as due to the low light and executes steps from #250, while if the gain is less than 4, the micro-computer regards the cause to be due to the low contrast and executes the sub-routine for the low contrast at step #245.

Figure 13:
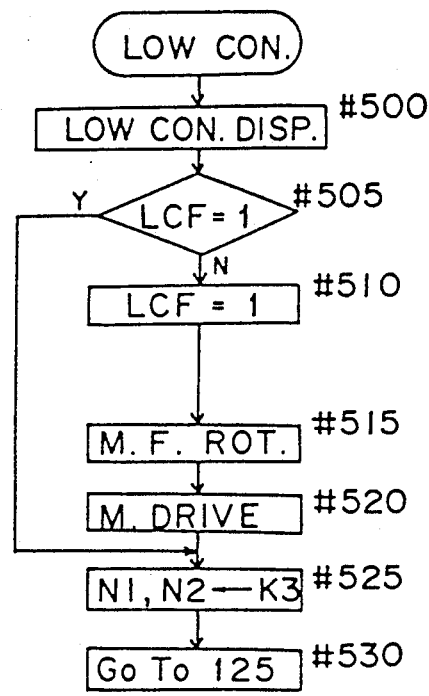

Referring also to FIG. 13 showing the sub-routine as referred to above, the low contrast display is first effected at step #500 and judgement is made at step #505 as to whether or not the low contrast flag LCF has been set. If the flag LCF has been set, the procedure proceeds to step #525 on the assumption that this routine has been executed one time. Meanwhile, if the flag LCF has not been set, the operation advances to step #510 to set said flag LCF, and a signal for driving the motor M2 in the forward direction (i.e, in the direction to deliver or advance the lens assembly) is outputted from the micro-computer 8 to effect the driving of the motor (steps #510 to 520). Subsequently, a predetermined value K3 is applied to N1 and N2 at step #525. The above value K3 is a value larger than the total amount of the revolutions of the motor M2 within the time periods required for effecting the charge accumulation data damping and focus detecting calculation once.

Referring back to the flow-chart of FIG. 11(b), at step #240, when the gain is larger than. 4, the operation proceeds to step #250 to set the low light flag LLF indicating the low brightness, and judgement is made at step #255 based on a signal fed to a terminal IP2 as to whether or not the auxiliary light means has been mounted on the camera. If the auxiliary light means has not been mounted on the camera, the operation proceeds to step #285 to effect the focus detection calculation for 8 bits, since there is a possibility that the focus detection can be effected due to improvement of the resolving power at 8 bits. Such a possibility occurs especially when the target object is dark.

Meanwhile, if the auxiliary light means has been mounted on the camera, flag FIF indicating the 1 bit processing of the auxiliary light mode is set and a subroutine for the auxiliary light mode is called (steps #255 to 265).

Figure 14:
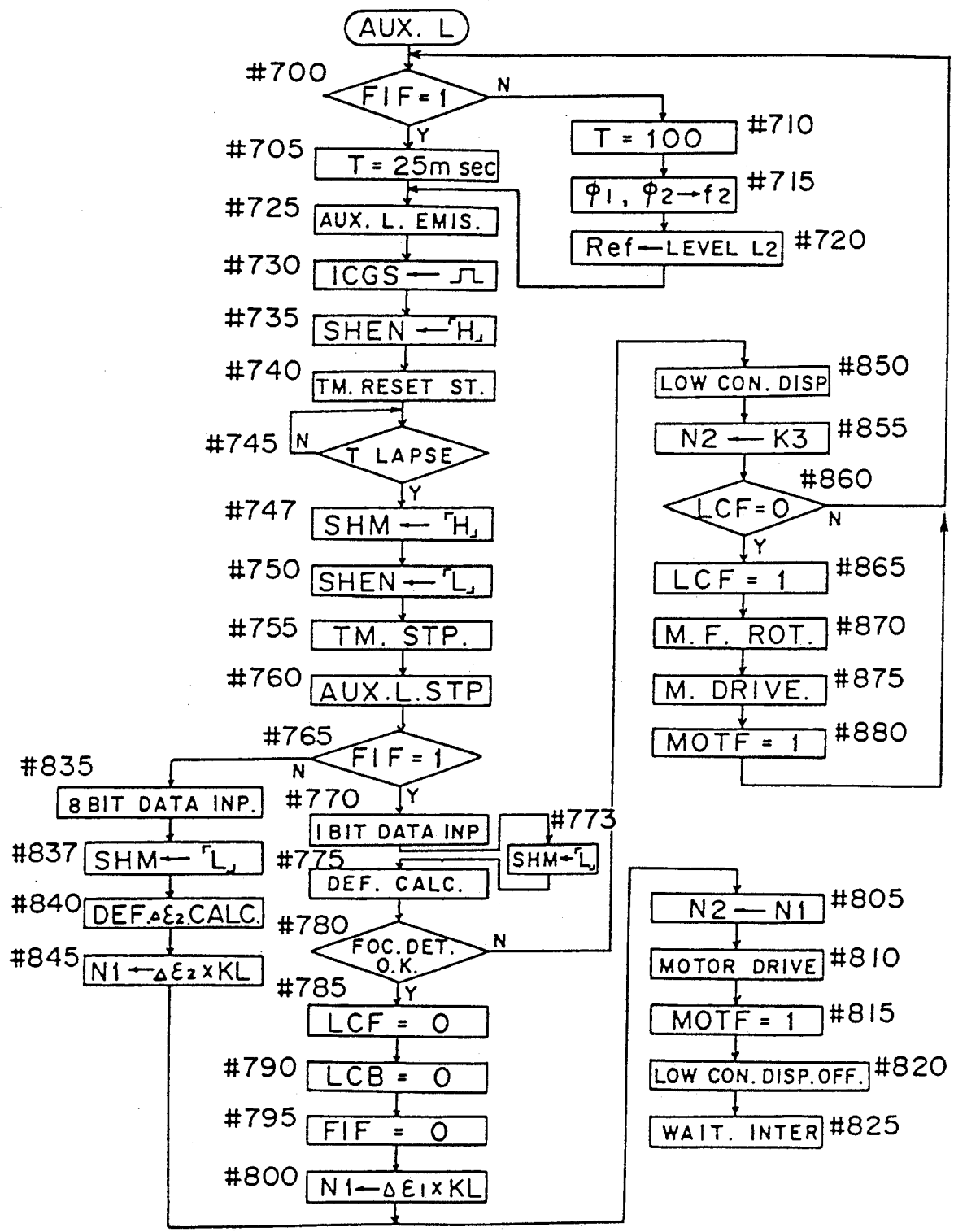

Referring to FIG. 14 showing the sub-routine for the auxiliary light mode as referred to above, it is first judged whether or not the flag FIF representing the 1 bit processing is set, and if this flag has been set, the charge accumulation time period is set to 25 m sec. (steps #700 and In this case, the frequency of the transfer clocks $\phi 1$ and $\phi 2$, and the reference voltages for the determination of gain rema.in to be those for 1 bit processing. In the case where the flag FIF has not been set, the charge accumulation time period is set to be 100 m sec., and the frequency of the transfer clocks $\phi 1$ and $\phi 2$ is rendered to be f2, with simultaneous alteration of the reference voltage for the gain determination to those for 8 bits processing (steps 710 to 720). After step #705 or #720, the micro-computer 8 outputs a signal of "High" level at the terminal OP22 for effecting the auxiliary light emission (step #725), and then, produces the integration clear signal ICGS in the pulse form and the shift pulse permission signal SHEN (steps #735 and 740). After resetting and starting of the timer for the charge accumulation, the micro-computer 8 waits for the charge accumulation time period to elapse, and upon passing of this time, produces the shift pulse generation signal SHM to shift the charge accumulated in the photosensors to the shift register SR and also, outputs a "Low" level signal SHEN indicative of shift pulse inhibition to stop the timer (steps #740 to 755). Subsequently, the micro-computer 8 stops the auxiliary light emission, and judges whether or not the flag FIF indicating the 1 bit processing has been set. If this flag has been set, the micro-computer 8 takes in the 1 bit picture element signals through the input terminal IP8 in synchronization with the transfer pulses $\phi 1$ and $\phi 2$ as the 1 bit processing, and after rendering the shift instruction signal SHM to be of "Low" level, calculates the defocus amount $\Delta \epsilon 1$ (steps #765 to 775). In the case where the focus detection is possible as a result of the above calculation, the micro-computer 8 resets the flags LCF, LCBF and FIF, ahd calculates the amount of revolutions Nl of the motor M2 through multiplication of the defocus amount gel by the conversion factor KL (steps #785 to 800). After rendering the amount of revolutions Nl to be N2, the micro-computer 8 drives the motor M2 and sets the flag MOTF (steps #805 to 815) so as to subsequently wait for an interruption, with the low contrast display turned on (steps #820 and 825). Meanwhile, at step #765, when the flag FIF indicating the 1 bit processing has not been set, the micro-computer 8 takes in the digital picture element signals of 8 bits successively through the input terminals IP0-IP7 in synchronization with the clocks $\phi 1$ and $\phi 2$, and after rendering the shift instruction signal SHM to be "Low", calculates a defocus amount $\Delta \epsilon 2$ and further, through multiplication of the defocus amount $\Delta \epsilon 2$ by the conversion factor KL, the amount of revolutions Nl of the motor M2 (steps #835 to 845). Subsequently, the operation proceeds to step #805.

At step #780, if the focus detection is impossible, the operation proceeds to step #850 to make the low contrast display. Thereafter, the micro-computer 8 sets the amount of revolutions K3 to be used in the low contrast condition as N2 (steps #850, 855) and judges based on the low contrast flag LCF, whether the processing in this flow is of the first time or not (step #860). If the flag LCF has not been set, the processing is for the first time, and the low contrast flag LCF is first set. Then, the micro-computer 8 drives the motor the forward direction, setting the motor flag MOTF (steps #865 to 880), and subsequently repeats the operations from step #700.

Figure 12:
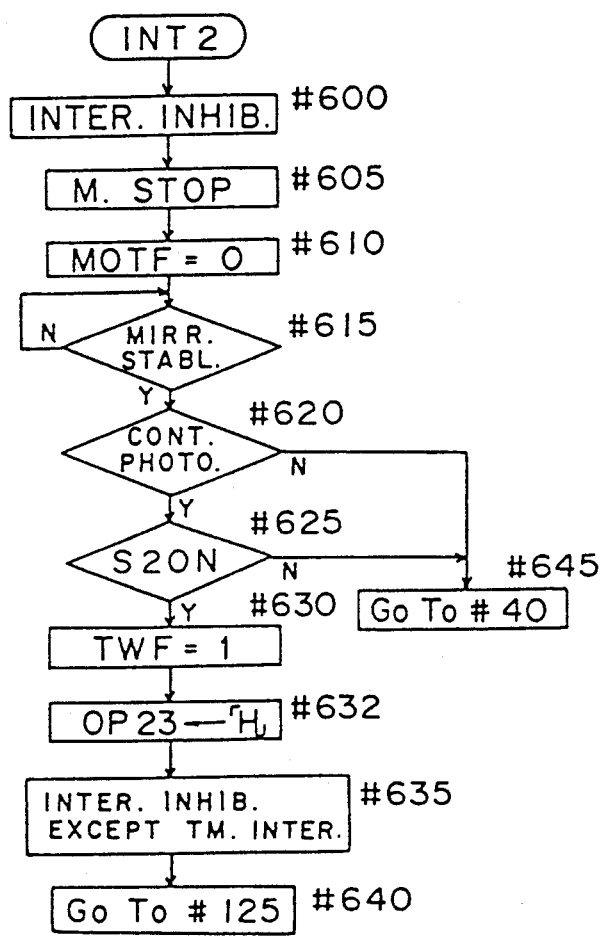
FIGS. 12 to 16 are flow-charts for explaining functioning of the embodiment of FIG. 2.

During the operations for the focus detection as described so far, when a release signal starting an exposure is applied to the interruption terminal INT2, the micro-computer 8 executes the interruption routine of INT2 shown in FIG. 12. In this routine, the micro-computer 8 at first inhibits all the interruptions to this flow and stops the motor M2, resetting the motor flag MOTF (steps #600 to 610).

The release signal is also applied to the exposure calculation and control circuit 1 in FIG. 2, which in turn controls the diaphragm and the shutter according to the brightness of the target object to be photographed, the film sensitivity and the set mode. Th.us, upon completion of the running of a shutter rear curtain, the switch S3 indicating the completion of an exposure is turned on, and a signal generated thereby is converted into a predetermined signal at the exposure calculation control circuit 1 so as to be applied to the motor control circuit 2, whereby the motor control circuit 2 effects film winding by the length of one frame, and the switch S3 is turned off upon completion of the film winding. Simultaneously with the turning-on of the switch S3, a signal changing from "Low" level to "High" level is applied to the input terminal IP18 of the micro-computer 8 through the inverter IN10 and the delay circuit DEL. Upon the film winding of the length of one frame after completion of the exposure, charging of the shutter release system for the subsequent photographing is simultaneously effected by the motor Ml, with consequent returning of a reflecting mirror of the camera to a position where it makes the focus detection possible. The delay circuit connected to the switch S3 through the inverter IN10 is intended to delay the input of the signal changing from "Low" level to "High" level to the input terminal IP18 of the micro-computer 8 by the period of time required for the reflecting mirror to be stabilized, after the returning from the completion of exposure.

The micro-computer 8 waits for input of the signal changing from "Low" level to "High" level to be the input terminal IP18, and upon input of this signal, detects the signal at the input terminal IP19 to check whether the mode is of the continuous photographing mode or not (steps #615 and 620). In the case of the continuous photographing mode, the micro-computer 8 further checks if the release switch S2 is kept turned on. In the case where the mode is not of the continuous photographing mode at step #620, or where the switch S2 is off at step #625, the operation proceeds to step #40 to through step #645.

On the other hand, if the mode is of the continuous photographing mode, with the release switch S2 turned on, the flag TWF indicating the photographing after the first exposure during the continuous photographing mode is set, and the terminal OP23 is made "High" to inhibit interruptions other than the timer interruption (steps #630 to 640). Thereafter, the operation proceeds to step #125 through step #640.

Figure 9:
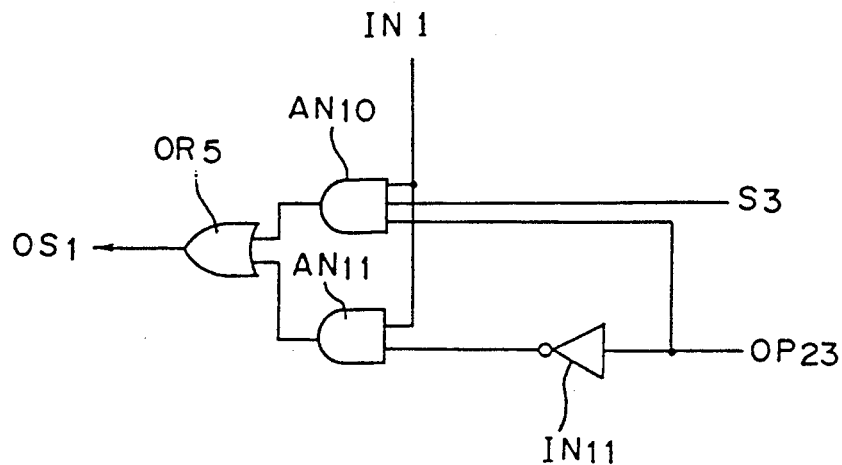
FIG. 9 is a fragmentary circuit diagram showing structure of a signal generating circuit to be employed in the arrangement of FIG. 2.

Now, reference is made to FIG. 9 showing a specific construction of the release signal generation circuit 6.

Briefly explained, in the case where the state is of the first time photographing during the continuous photographing mode, a signal of "Low" level is produced from the terminal OP23 of the micro-computer 8, thereby to disable an AND circuit AN10. An AND circuit AN11 which is connected to the terminal OP23 through an inverter IN11, with the output terminals of the AND circuits AN10 and AN11 being connected to the one shot circuit OS1 through an OR gate OR5. In the above case, the AND circuit AN11 applied with a signal of "H" level obtained by inverting the "Low" level signal from the terminal OP23 by the inverter N11, is in the enabled state. Upon turning on of the release switch S2, the signal of "High" level is applied to the AND circuit AN11 through the inverter IN1, causing the AND circuit AN11 to output a signal of "High" level to the one-shot circuit OS1 through the OR gate OR5. Meanwhile, during the photographing after the first time exposure in the continuous mode, the signal of the terminal OP23 is of "High" level, whereby the AND circuit AN11 receives an inverted "Low" level signal through the inverter IN11 so as to be disabled, with the AND circuit AN10 being rendered to be enabled. Accordingly, upon input of the signal of "High" level from the switch S3 at the completion of the film winding by the length of one frame, the AND circuit AN10 produces a signal of "High" level to the one-shot circuit OS1 through the OR gate OR5. Upon receipt of the signal of "High" level from either the AND circuit AN10 or the AND circuit AN11, the one-shot circuit OS1 produces a pulse which is the release signal referred to earlier.

Figure 17A:
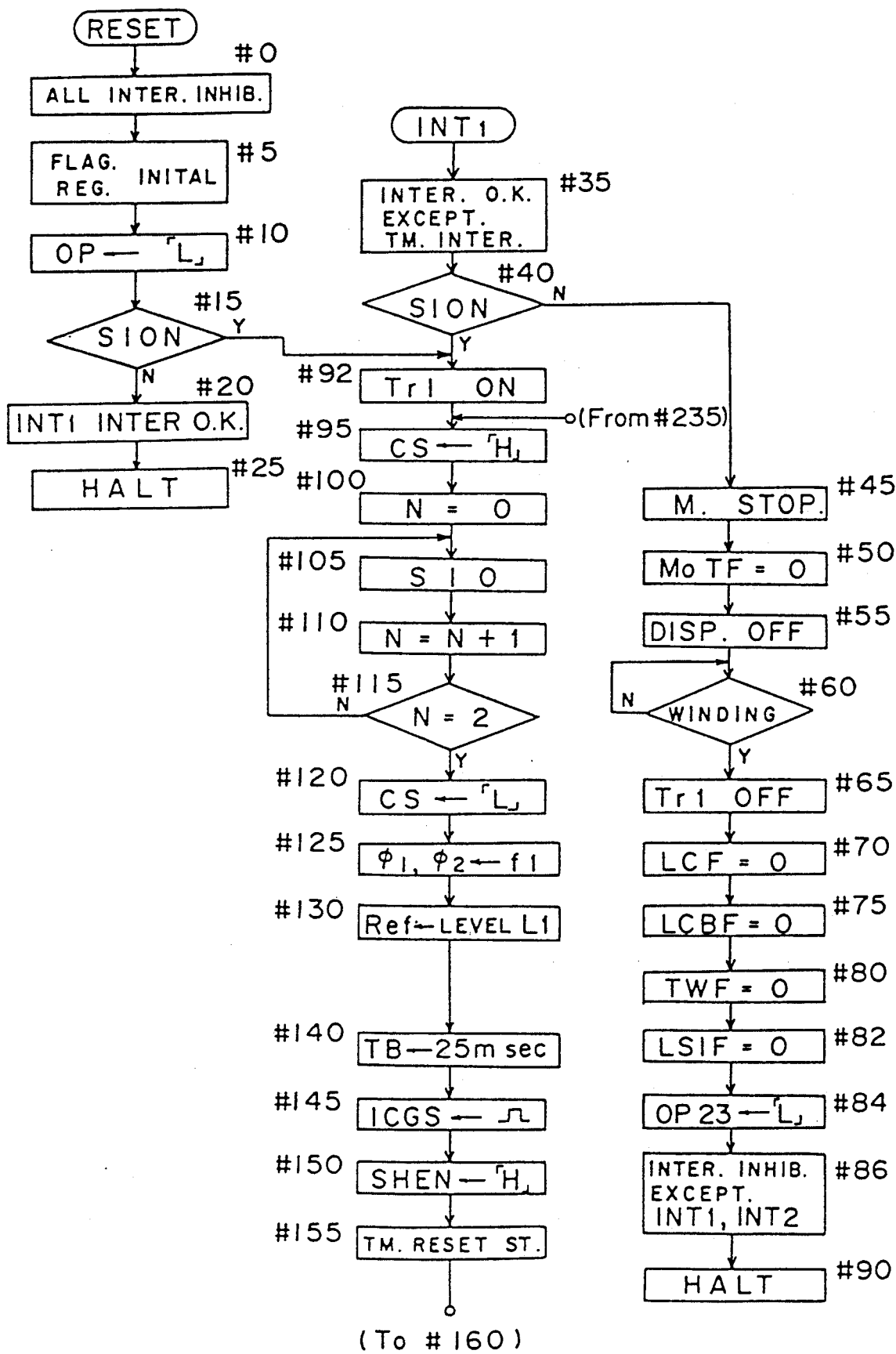
Figure 17C:
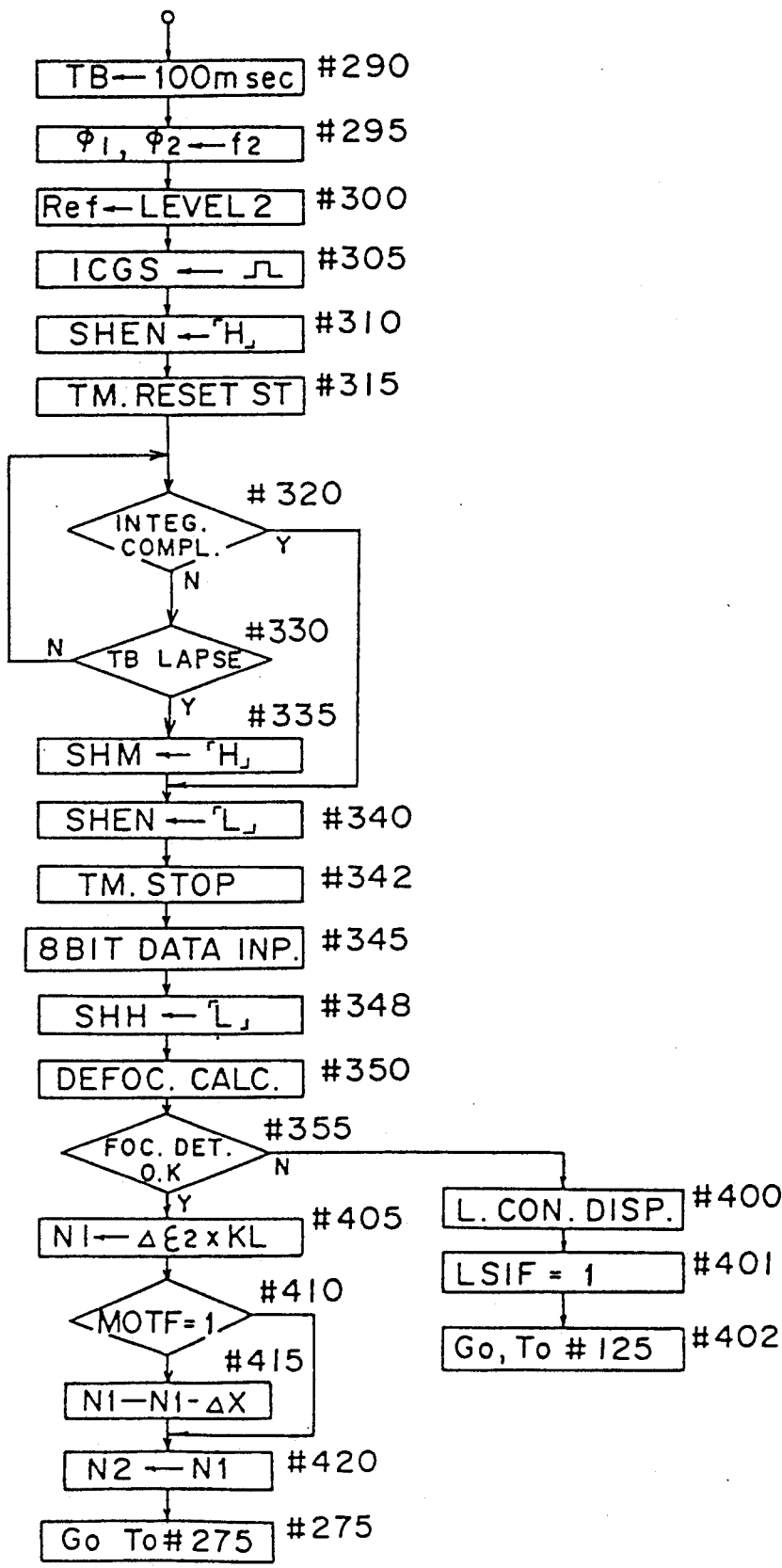

Referring further to FIGS. 17(a), 17(b) and 17(c) which are continuous, there is shown a flow-chart in which part of the flow in FIGS. 11(a) to 11(c) is modified.

As compared with the flow-chart of FIGS. 11(a) to 11(c), steps #220 and 270 are deleted, while step #1100 is added after step #225 in the flow-chart of FIGS. 17(a) to 17(c).

In the modified flow of FIGS. 17(a) to 17(c), the amount of revolutions N1 of the motor M2 is set as N2 at step #215, and the operation proceeds to step #225 to check whether or not the photographing is that after the first exposure in the continuous photographing, and if it is the photographing after the first exposure, further proceeds to C step #230 to drive the motor and to set the motor flag MOTF (steps #225, 230 and 235). If the situation is other than the above, the operation proceeds to step #1100 for comparison of the amount of revolutions N2 with a value K4 indicating the amount of revolutions of the motor M2 equivalent to a predetermined in-focus width. In the case where the amount of revolutions N2 is smaller than the value K4, the operation proceeds to step #275 to drive the motor, while on the contrary, if the amount of revolutions N2 is larger than the value K4, the operation proceeds to step #230. For the above value K4, an amount of revolutions of the motor M2 being larger than that equivalent to the in-focus width which can be obtained by the processing of 1 bit is preferable.

Reference is further made to FIGS. 18(a) to 18(c) and 19 showing a second modification of the flow-chart of FIGS. 11(a) to 11(c).

Figure 18A:
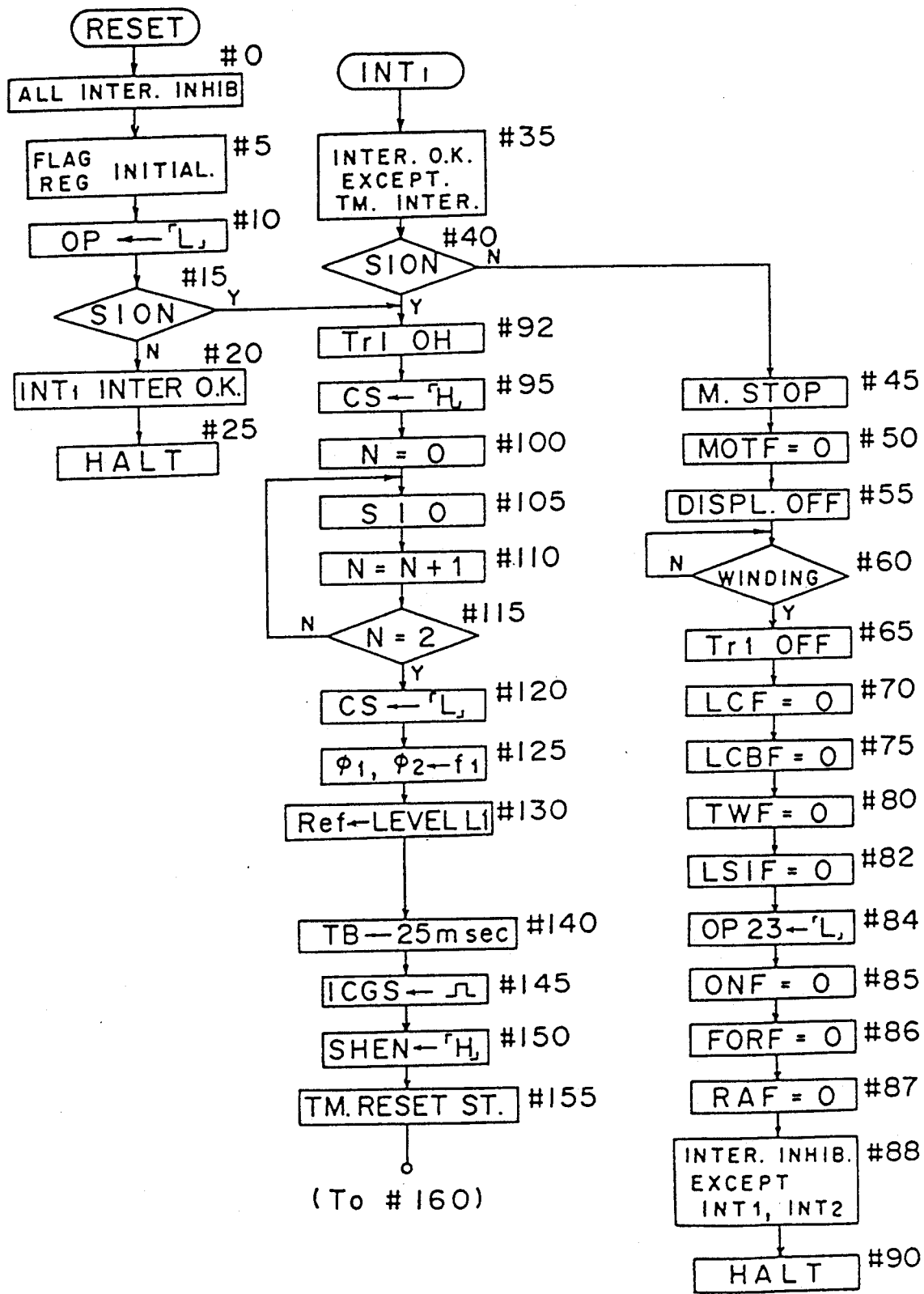
FIGS. 18(a) through 18(c), which are continuous, and FIG. 19 are showing functions of another modification of the embodiment of FIG. 2.
Figure 18B:
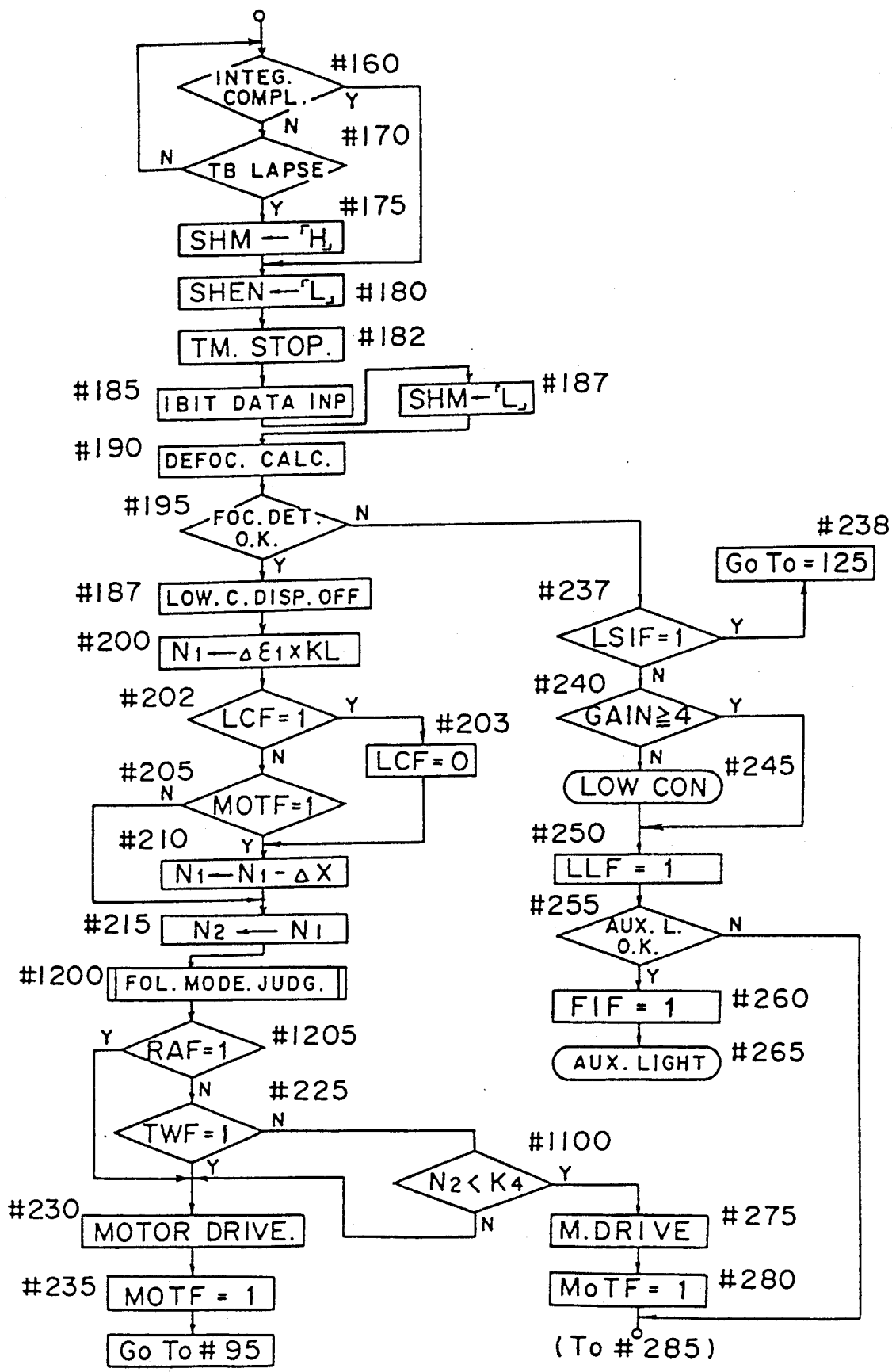
Figure 18C:
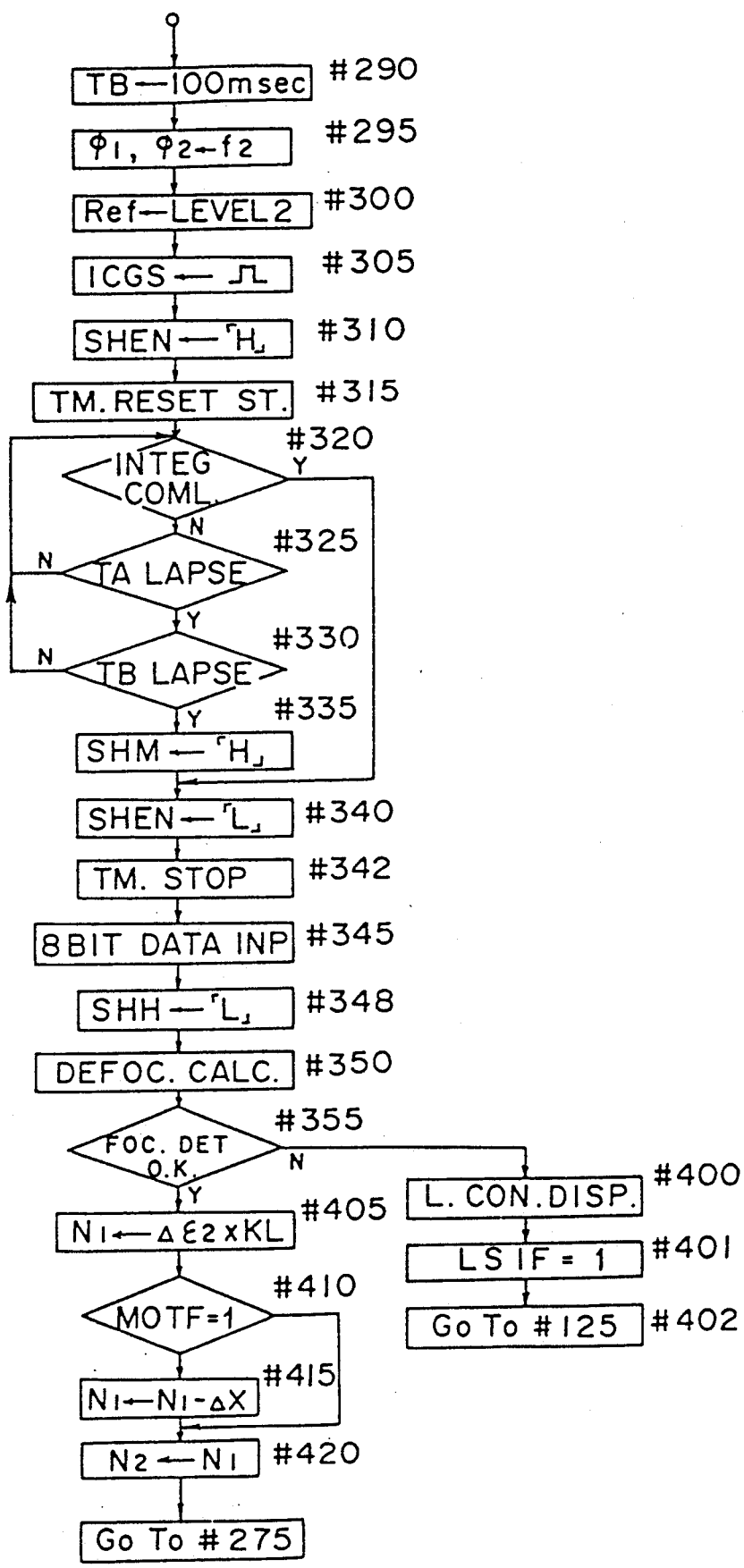

In the flow of FIGS. 18(a), 18(b) and 18(c), steps #1200 and 1205 for judging whether or not the target object to be photographed is moving are provided between steps #215 and 225 in FIG. 18(b). In the case where the target object is moving (referred to as a follow mode hereinafter), the 1 bit processing is effected at all times since it is desired to have the focusing chase the target object at a cycle as fast as possible.

In FIG. 18(b), the flow related only to the above follow mode is such that, after setting the amount of revolutions N1 as N2 at step #215, a sub-routine for the follow mode judgement is called, and judgement is made as to whether or not a flag RAF indicating the follow mode has been set as a result of execution of the sub-routine. If the flag RAF has been set, the operation proceeds to step #230 to repeat the 1 bit processing as described above. Meanwhile, in the case where the flag RAF has not been set, the operation proceeds to step #225 to effect the same processing as in the flow of FIGS. 17(a) to 17(c).

Figure 19:
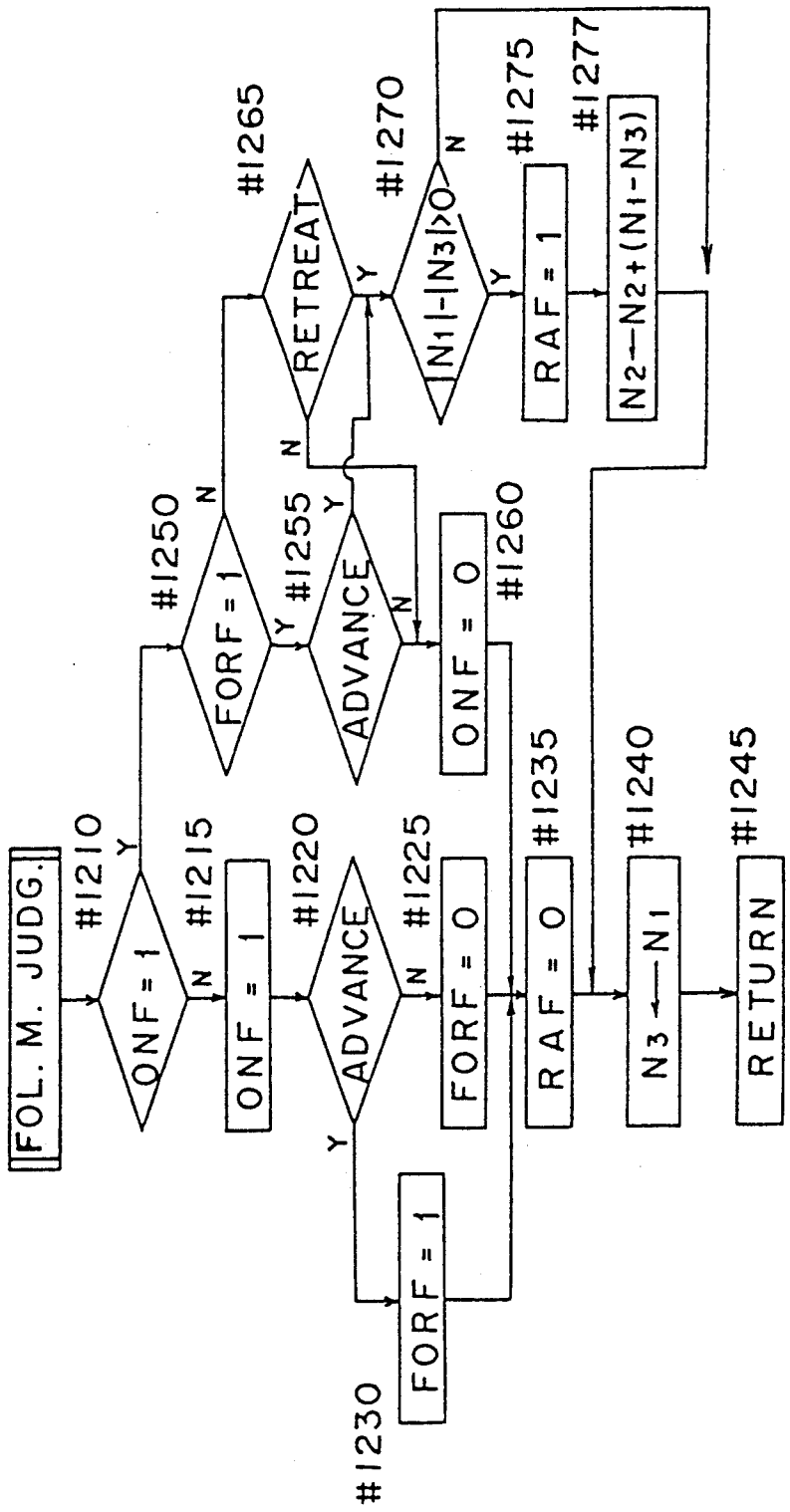
Figure 20:
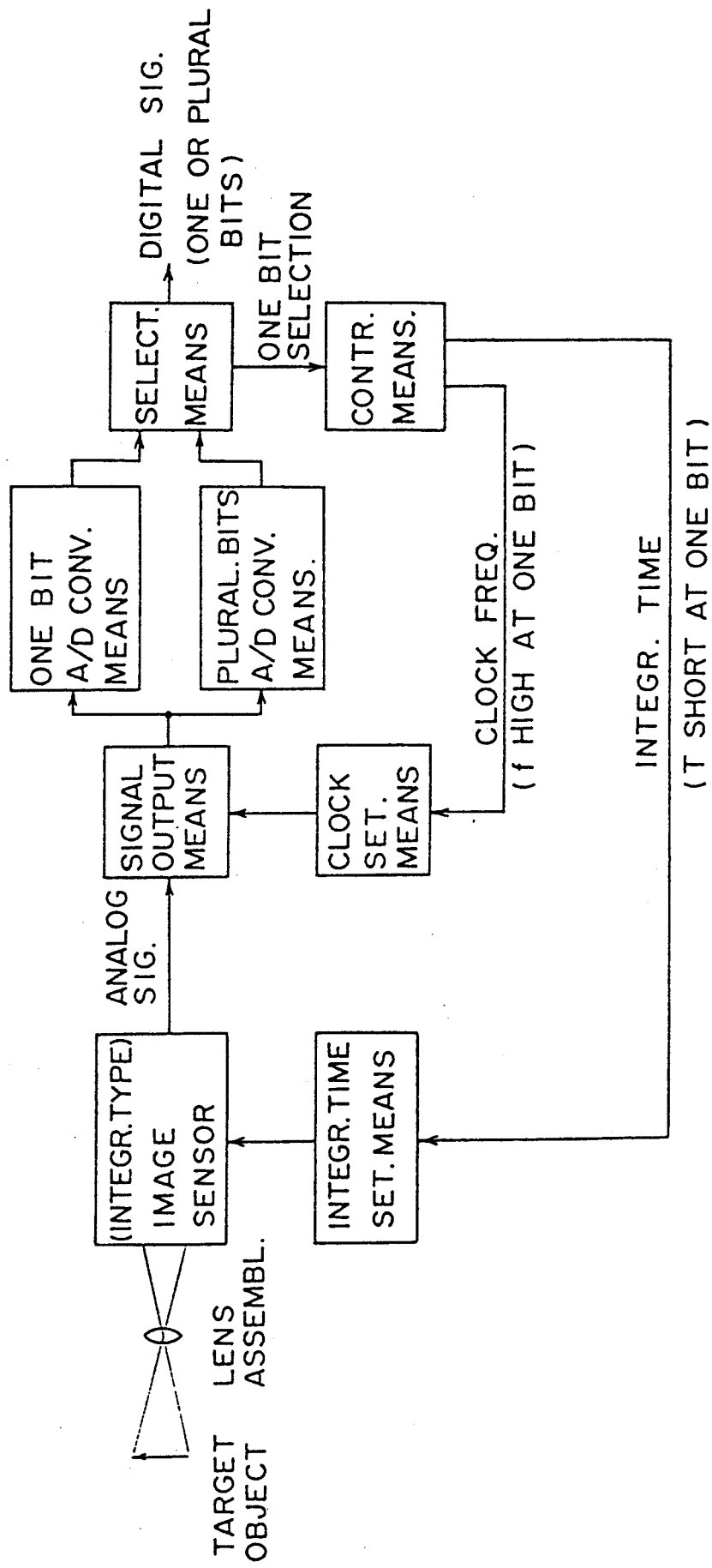
FIG. 20 a block diagram representing a fundamental arrangement for an automatic focus detection system according to another modification of the present invention (already referred to)

Referring also to FIG. 19 showing a flow-chart of the sub-routine for the follow mode, judgement is made at step #1210 on a one time flag ONF indicating the passing of this flow for the first time, and if this flag ONF has not been set, the operation proceeds to step #1215 to set this flag and in the case of control for shifting the lens assembly forward according to the result of defocus, a forward flag FORF indicating such control is set, while, in the case of control for shifting the lens assembly rearward, the forward flag FORF is reset (steps #1210 to 1230). Subsequently, the follow mode flag RAF is reset, with the amount of revolutions N1 set as N3 (steps #1235 to 1245). At step #1210, when the one time flag ONF has been set, the operation proceeds to step #1250 for judgement as to whether or not the forward flag FORF has been set, and if this flag has been set, judgement is made at step #1255 as to whether or the direction of shifting of the lens assembly effected at this time is for shifting the lens assembly forward. If the direction is for shifting the lens assembly forward, the operation further proceeds to step #1270 to find a difference between the absolute value of the present amount of revolutions N1 and that of the previous amount of revolutions N3. In the case where |N1| is larger than |N3|, i.e., when the defocus amount has become larger through movement of the target object, the follow mode flag RAF indicating such a state is set, and the difference between |N1| − |N3| is added to N2 for correction of the defocus amount which has been increased due to the movement of the target object, and the operation proceeds to step #1240 (steps #1250, 1255, 1270 and 1275). In the case where |N1| is smaller than |N3|, the operation proceeds to step #1240, with steps #1275 and 1277 being skipped. If the direction of the shift of the lens assembly effected at this time is for shifting the lens assembly rearward at step #1255, the one time flag ONF is reset and the operation proceeds to step #1235. When the forward flag FORF has not been set at step #1250, i.e., when the previous shifting of the lens assembly was in the direction for shifting the lens assembly rearward, the operation proceeds to step #1265, and if the shifting of the lens assembly at this time is to be effected in the direction for shifting the lens assembly rearward, the operation proceeds to step #1270, while if it is not in the direction for shifting the lens assembly rearward, the operation advances to step #1260.

Referring back to FIG. 18(a), steps #85, 86 and 87 for resetting the one time flag ONF, forward flag FORF and follow mode flag RAF are added to the flow at the right, which is for the case where the photographing preparation switch S1 is off at step #40.

In the second modification as described so far, the judgement of the follow mode is effected by the flow of the 1 bit processing, and as a result, if the mode is of the follow mode, the operation is continuously effected by the 1 bit processing, but the judgement of the follow mode may be modified to be effected by the flow of 8 bit processing (FIGS. 11 or 18) so as to effect the 1 bit processing when the mode is to be the follow mode as the result of judgement by the 8 bit processing.

It should be noted here that, in the foregoing embodiments, although the A/D converter of 1 bit and that of 8 bits are employed, the A/D converter of 8 bits may be replaced by any other A/D converter, if it is capable of A/D conversion of more than 1 bit, with the flow of the microcomputer during calculation or the micro-computer itself being modified correspondingly.

Furthermore, the digital picture element signals of 8 bits and those of 1 bit may be processed by separate calculation circuits for focus detection calculations instead of effecting the calculation by the micro-computer, so that the results of calculations are selected by an appropriate change-over means.

As is clear from the foregoing description, according to the present invention, the A/D converting means of 1 bit and that of more than 2 bits are employed, and by selectively using one of the A/D converting means in a proper manner, it becomes possible to effect the focus detection in a shorter period of time, at a high accuracy similar to that in the conventional automatic focus detecting arrangements.

Furthermore, according to the present invention, the proper selective use of the 1 bit digital signal and the digital signal of more than 2 bits makes it possible to increase the speed of focus detection processing other than the calculation of defocus amount by change-over of the charge accumulation (integration time) period and frequency of signal transfer clocks for the image sensor for focus detection.

Referring to FIG. 21a, a photographing frame in the viewfinder according to prior art is shown, in which a rectangular frame at the center thereof represents a zone for effecting a focus detection and a spot light measurement In fact, the light measuring device and the focus detecting device actually employed in the camera, have a sensitive zone located in a small area at the center of the viewfinder. Consequently, an automatic focus (hereinafter referred to as an AF) adjustment is carried out such that, a photographer first holds a camera so that the object to be photographed is spotted by the center rectangular frame in the viewfinder, regardless of his or her intention for the framing, so that the target object to be photographed can be detected for the adjustment by the focus detection sensitive zone of the AF device. Then, the photographer locks the focus detected condition by an AF lock means. Then, the photographer is ready to take a picture according to his or her desired framing. When a moving object is to be consequently photographed, since it is very difficult to catch the moving object in the focus detection sensitive zone at all times without failure, the target object moving at high speed often falls out from the focus detection sensitive zone, resulting in an unstable operation of the AF device.

Accordingly, in order to solve the above-described disadvantages and inconveniences, the present invention provides an automatic focusing camera which is, as shown in FIG. 21b, provided with a plurality of focus detection sensitive zones. The spot light measuring zones are located correspondingly to the plurality of the focus detection sensitive zones.

It is statistically found out that the photographs at a high percentage have the main object to be photographed located closest to the camera. Therefore, based on this fact, according to the automatic focusing camera of the present embodiment, it is so arranged that a focus detection sensitive zone detecting an object which is located closest to the camera is automatically selected among a plurality of focus detection sensitive zones. Based on the focus data obtained from the selected zone, the picture-taking lens is automatically focused to the closest object, and at the same time, based on the spot light measurement data obtained from the same selected zone, the display of the exposure data and the exposure control are carried out. Accordingly, the troublesome operation such as to obtain focus data and exposure data before setting the camera to a desired aiming angle can be solved by the camera of the present embodiment. According to the present embodiment, without framing the main object at the center of the photographing frame of the viewfinder, the automatic focus adjustment and the spot light measurement of the main object can be carried out.

FIGS. 22a–22d show an optical system of the camera according to the present embodiment.

Referring to FIG. 22a, there is shown a schematic view of the optical system according to a second embodiment of the present invention applied to a single lens reflex camera. In FIG. 22a, a part of the light having passed through a picture-taking lens 1 is reflected by a main mirror 2 and is directed to a view finder section 5. The remaining light is passed through a translucent portion of the main mirror 2 and is reflected by a sub-mirror 3 to direct light towards an automatic focus detecting module 4. The light directed to viewfinder section 5 forms an image on a mat surface of a focusing screen 7 which is then outputted to a photographer's eye through a pentagonal roof prism 9. A part of the light directed to the viewfinder section is scattered by a diffraction grating 8 and is completely reflected between top and bottom faces of the screen 7 and is guided to a spot light measuring element 10 disposed on the side surface of the screen 7.

Figure 22B:
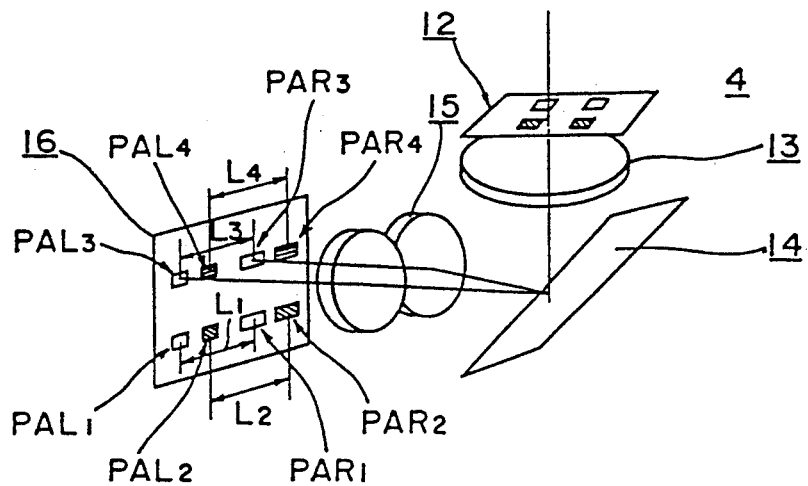
Figure 22C:
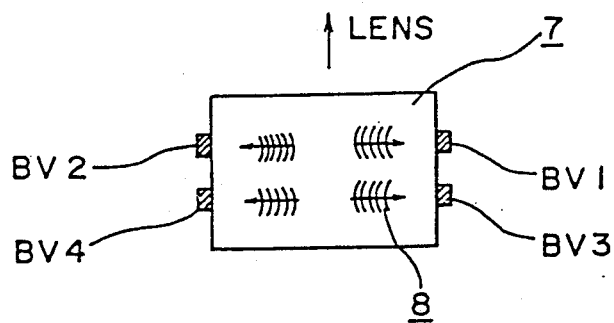

FIG. 22c indicates the arrangement of the diffraction grating 8 and four spot light measuring elements BV1-BV4 provided on the side surface of the focusing screen 7. The diffraction grating 8 has four sections which are placed on mat surface of the screen 7 in a manner as shown in FIG. 22c so that the light is scattered and guided in four different directions as indicated by arrows. The light measuring elements BV1-BV4 are disposed at respective light emission outlets, i.e., at places indicated by the arrows. The light having passed through main mirror 2 and directed to the lower part of the camera body by sub-mirror 3 further passes through an infrared light cut-off filter 11, a mask plate 12 provided at a place approximately equal to a focal plane, a condenser lens 13, a mirror 14 and a pair of re-focusing lenses 15, thereby forming two images on a photoelectric converting element 16. A detailed description will be given hereinbelow with reference to FIG. 22b.

Figure 22D:
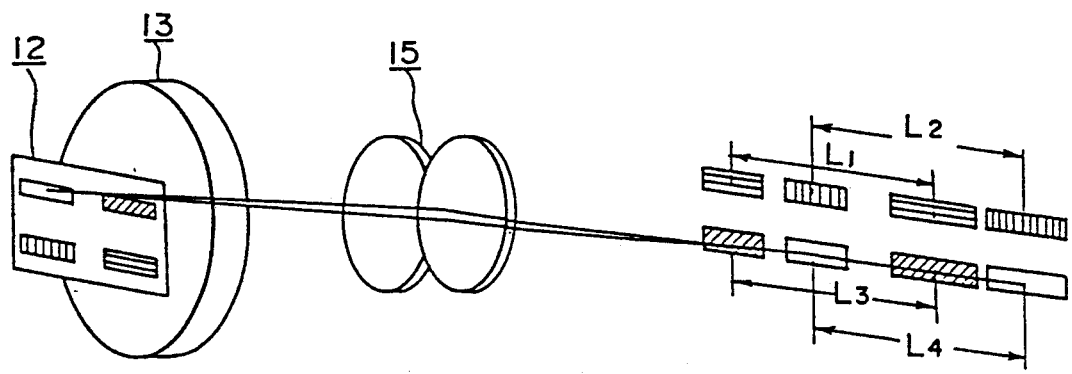

Referring to FIG. 22b, the light passed through infrared light cut-off filter 11 reaches the mask plate 12 placed adjacent the focal plane. Mask plate 12 permits only the light in four zones, first zone, second zone, third zone and fourth zone, to pass therethrough. The light from mask plate 12 in four zones passes through condenser lens 13, and is deflected 90° by mirror 14. Then, the light is divided into two by re-focusing lenses 15, so that for each zone two images, a standard image and a reference image, are formed on photoelectric converting element 16. More specifically: for the first zone, a standard image and a reference image are formed on standard area PAL1 and reference area PAR1, respectively; for the second zone, a standard image and a reference image are formed on stahdard area PAL2 and reference area PAR2, respectively; for the third zone, a standard image and a reference image are formed on standard area PAL3 and reference area PAR3, respectively; and for the fourth zone, a standard image and a reference image are formed on standard area PAL4 and reference area PAR4, respectively. When the distance or deviation $X_z$ (z=1 through 4) between the standard area $PAL_z$ and a reference area $PAR_z$ is equal to a predetermined deviation $L_z$, it is determined that the object is in the in-focus condition. When the deviation $X_z$ is larger than $L_z$, it is determined that the object is in the rear-focus condition in which the object is located too close to the picture-taking lens with respect to the infocusing condition of the lens. On the contrary, when the deviation $X_z$ is smaller than the deviation $L_z$, it is determined that the object is in the front-focus condition in which the object is located too far away from the picture-taking lens with respect to the infocusing condition of the lens. When the optical system of FIG. 22b is developed, it will be as shown in FIG. 22d.

Figure 23:
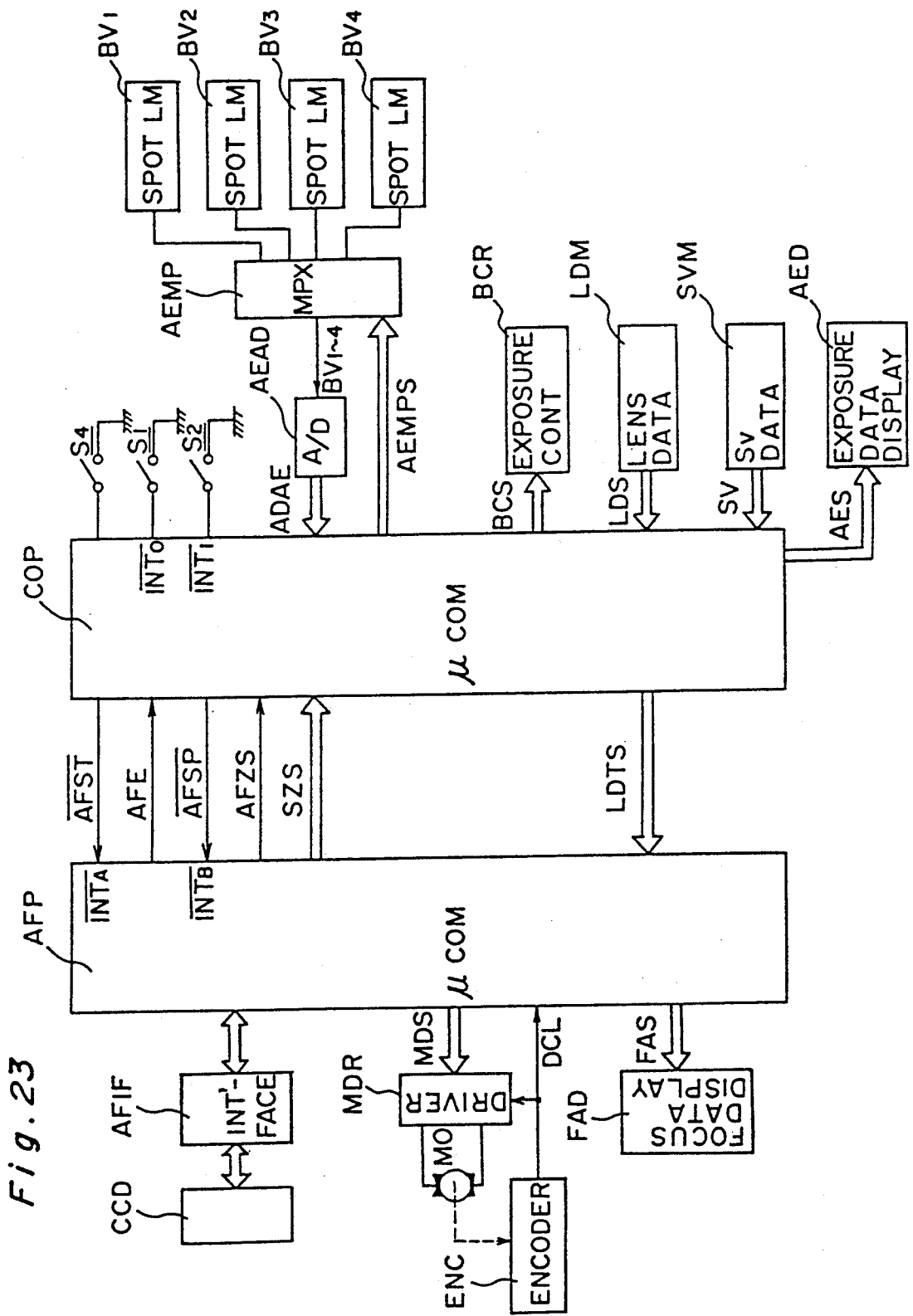
FIG. 23 is a block diagram showing an entire circuit employed in the camera of FIG. 22.

An electric circuit arrangement of the camera according to the present embodiment is shown in FIG. 23.

The camera of the present embodiment is controlled by two microprocessors, i.e., a microprocessor COP which controls the entire camera (referred to as a camera-control micro-computer hereinafter) and a microprocessor AFP which controls the automatic focusing (hereinafter referred to as an AF micro-computer). A reference character S1 designates a switch for starting the measurement of the object light and the AF automatic focusing operation; S2 designates a release switch for effecting the film exposure, thereby starting the photographing operation of the camera; S4 designates a switch which is turned off when the main mirror and a shutter curtain of a focal plane shutter are charged, an.d is turned on after the completion of the exposure. A signal to open or close each of the above-described switches is inputted to the camera-control micro-computer COP.

An output generated from each of the spot light measuring elements BV1-BV4 is selectively outputted by a selecting signal AEMPS from the camera-control micro-computer COP in a multiplexer AEMP and, inputted to the camera-control micro-computer COP in the form of a digitalized value by an A/D converting circuit AEAD. The camera-control micro-computer COP receives, from a lens data outputting circuit LDM, data LDS which is necessary for the AF control. Data LDS includes the conversion coefficient for converting the defocus amount detected in an automatic focus detecting part to an appropriate amount corresponding to individual lenses by which the lens is focused, the maximum aperture value of the lens, the minimum aperture value of the lens, etc. Of the data LDS, only the data necessary for the AF control are transferred to the AF micro-computer AFP.

The camera-control micro-computer COP receives data from an ISO data outputting means SVM, which produces the film sensitivity data on the Apex value Sv. The camera-control micro-computer COP calculates the exposure data on the basis of the inputted data, and produces an exposure value signal AES to an exposure display AED for displaying the exposure data. Furthermore, after a release signal for the release switch S2 is applied to the camera-control micro-computer COP, the camera-control micro-computer COP outputs an exposure controlling signal BCS to an exposure control BCR, thereby controlling the exposure.

AF (automatic focusing) micro-computer AFP drives an AF sensor composed of CCDs through an AF interface AFIF. An output from the AF sensor CCD is processed in the analog form and is converted to the digital form by the AF interface AFIF, such that the digitalized image information is applied to the AF control micro-computer AFP which, in response to the receipt of the digitalized image information, carries out the AF calculation to obtain the de-focus amount.

Furthermore, the AF control micro-computer AFP converts the de-focus amount to the shifting amount of the lens on the basis of the lens data supplied from the camera-control micro-computer COP, whereby a motor driver MDR drives a motor MO by an amount corresponding to the lens shifting amount. While motor MO is being driven, the rotating amount of the motor is detected by an output signal DCL from a motor encoder ENC, which is also fed back to motor driver MDR.

Moreover, AF control micro-computer AFP is arranged to indicate the in-focus condition by outputting an in-focus signal FAS to an in-focus data display device FAD, for the purpose of confirmation of the in-focus condition, etc.

The signal exchange between the camera-control micro-computer COP and the AF micro-computer AFP will be described hereinbelow. An AF start signal AFST sent from the camera-control micro-computer COP to AF micro-computer AFP is for starting the AF operation. In FIG. 23, a bar extending over AFST indicates that AF micro-computer AFP starts the AF operation in response to the change of the AF start signal AFST from a HIGH level to a LOW level.

When an AF end signal AFE sent from AF micro-computer AFP to camera-control micro-computer COP is changed from a LOW level to a HIGH level, it is indicated that the AF operation is completed and that the in-focus condition is obtained. A pulse signal, AF stop signal AFSP, is sent from camera-control micro-computer COP to AF micro-computer AFP so as to stop the AF operation.

Moreover, an AF zone selecting signal AFZS, when it becomes a HIGH level, indicates that one of the four zones described above is selected. A signal SZS represents the selected zone. A data bus LDTS is provided for transmitting AF lens data to the AF micro-computer AFP only the data necessary for the AF operation among the lens data LDS inputted from lens data outputting circuit LDM by camera-control micro-computer COP.

With reference to the flow-charts shown in Figs. 24, 25a and 25b, the operation of the above-described circuit will be described particularly with respect to the camera-control micro-computer COP and the AF micro-computer AFP.

Figure 24:
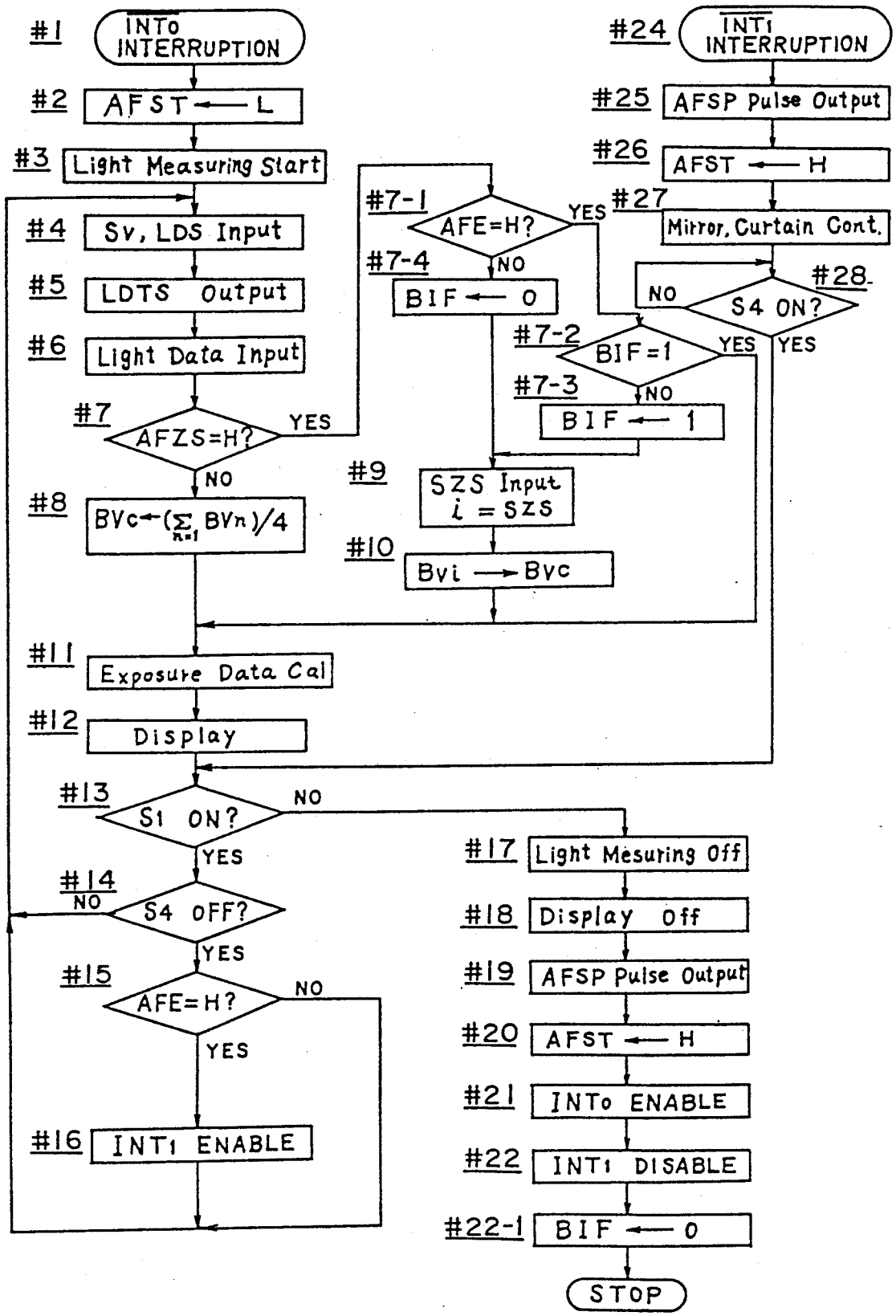
FIG. 24 is a flow-chart showing an operation of a micro-computer in the circuit of FIG. 23.

When a release button is depressed halfway, switch S1 turns on, so that an interruption signal is added to an interruption terminal INT0 of camera-control micro-computer COP (step #1 in FIG. 24). This interruption signal enables camera-control micro-computer COP, i.e., drives camera control microcom-puter COP out of the stop mode, so that start signal AFST is changed from a HIGH level to a LOW level, thereby activating the AF control micro-computer AFP (step #2 in FIG. 24) to start the light measuring operation (step #3 in FIG. 24). Then, camera-control micro-computer COP receives data necessary for calculating the exposure, such as, Sv data from ISO data outputting means SVM and various lens data LDS from lens data outputting means LDM (step #4 in FIG. 24). Among them, only the lens data necessary for the AF operation are further transmitted to AF control micro-computer AFP (step #5 in FIG. 24). The light measurement data are inputted to camera-control micro-computer COP from AF control micro-computer AFP at step #6.

Thereafter, camera-control micro-computer COP determines whether or not the AF zone selecting signal AFZS from AF micro-computer AFP is changed to a HIGH level (step #7 in FIG. 24) The AF zone selecting signal AFZS, which will be further described in detail later, is in a LOW level state at the beginning of the operation.

When the AF zone selecting signal AFZS is at a LOW level (indicating that any AF zone has not yet been selected), camera-control micro-computer COP calculates an average of the light measuring data BV1-BV4 and takes the average as the measured value (step #8), and further carries out an exposure calculation based on each data (step #11 in FIG. 24). Upon completion of the exposure calculation, cameracontrol micro-computer COP produces the result of the calculation to the exposure display device AED for the display (step #12). After the above-described operations in one locp are completed, it is detected whether or not switch S1 is continuously depressed (step #13). If switch S1 is kept depressed, it is checked whether or not the shutter is completely charged (step #14) and whether or not the infocus condition is obtained (step #15).

If the results of both steps #13 and #14 are YES, an interruption from the interruption terminal INT1 is permitted so that the shutter release can be effected (step #16). Thereafter, the program is returned to step #4 in which the data are inputted again.

On the Other hand, if at least one of the results of steps #13 and #14 is NO, the program returns back to step #4 without passing through step #16 so that the shutter release permission cannot be given. If switch S1 is not depressed at step #13, the light measurement and the display of the exposure are stopped at steps #17 and #18, with the AF stop signal AFSP being outputted so as to stop the AF operation at step #19, and also the AF start signal AFST being brought into a HIGH level at step #20. Then, the interruption from the interruption terminal INT0 is permitted at step #21, while the interruption by the terminal INT1 from switch S2 is prohibited at step #22. Then, a flag BIF is reset at step #22-1, and thus the AF operation is stopped, i.e,. AF micro-computer AFP enters the stop mode.

Figure 25A:
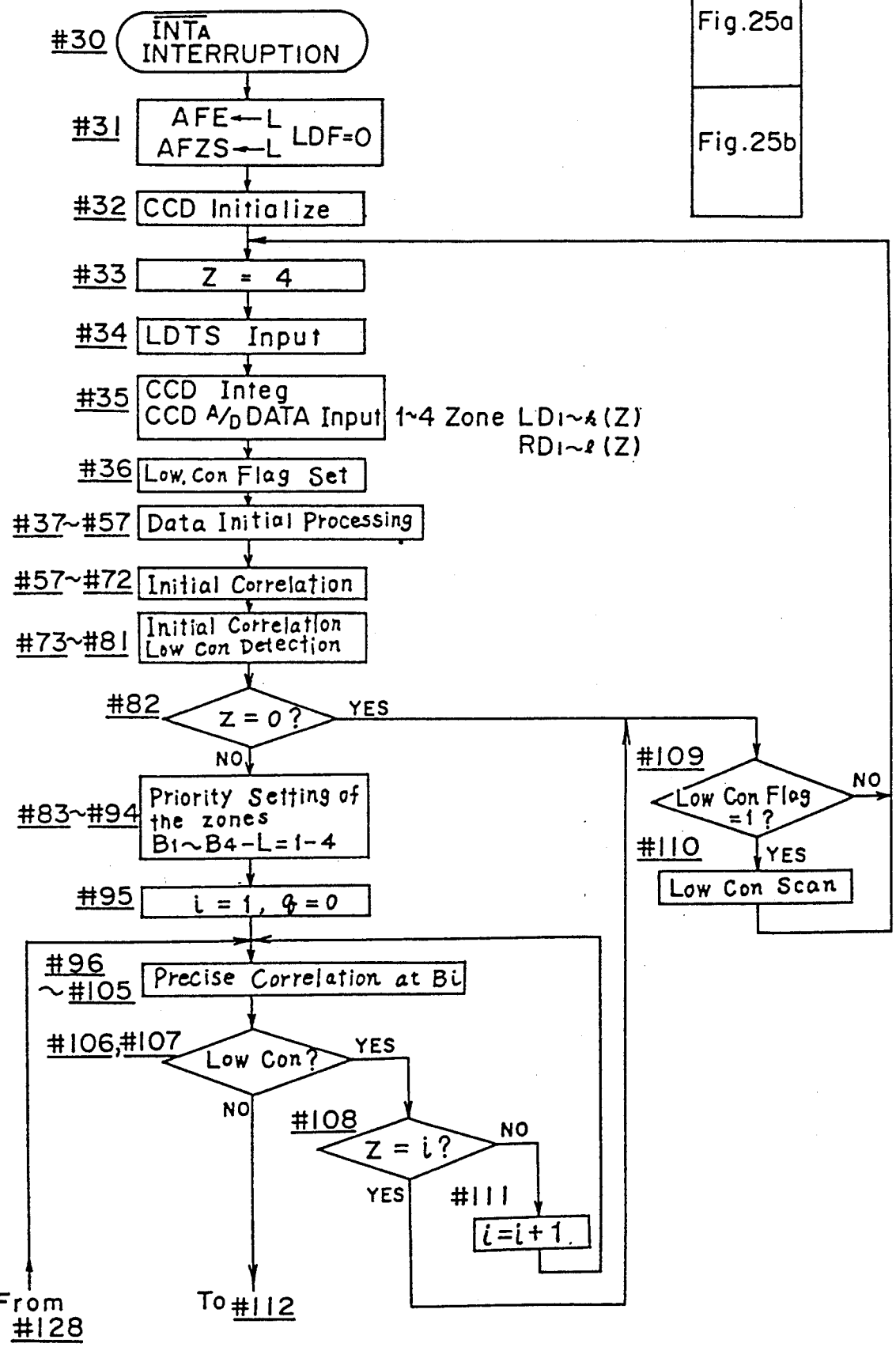
FIGS. 25a and 25b taken together as shown in FIG. 25 show a flow-chart of an of an AF micro-computer employed in the circuit of FIG. 23.
Figure 25B:
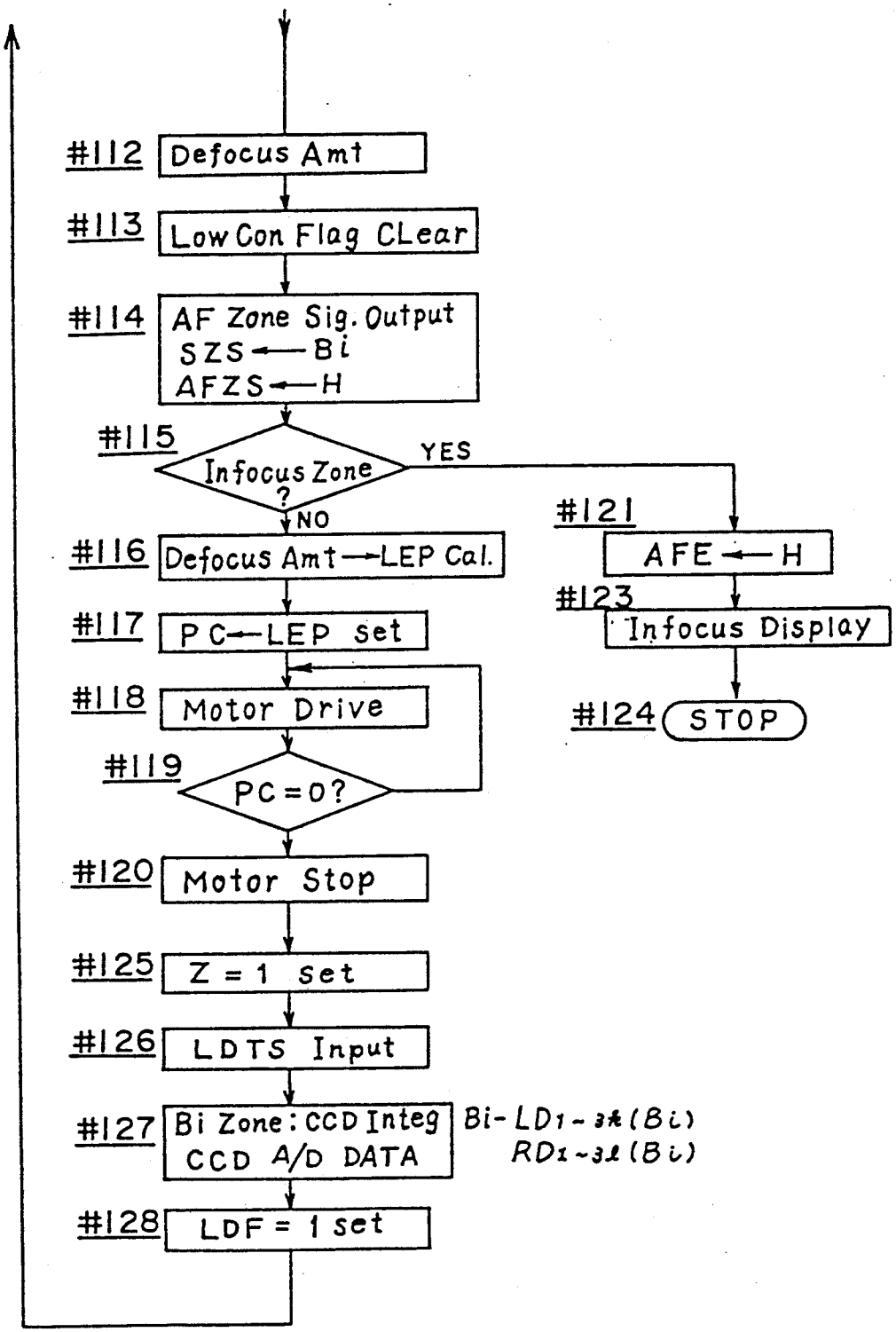

On the other hand, AF micro-computer AFP starts the operation when the stop mode is interrupted as the AF start signal AFST sent from the camera-control micro-computer COP is applied to an interruption terminal INTA of AF micro-computer AFP (step #30 in FIG. 25a). When AF micro-computer AFP starts the AF operation, the AF end signal AFE is dropped to a LOW level and also the AF zone selecting signal AFZS is dropped to a LOW level, so that AF micro-computer AFP prodropped vides a signal to camera-control micro-computer COP indicating that the AF zone has not yet been selected, and at the same time, the AF micro-computer AFP resets a flag LDF, which flag is set when the lens is driven (step #31 in FIG. 25a).

Next, after the CCD is initialized (step #32 in FIG. 25a), a variable Z, representing the AF zone number, is set as "4" (step #33), and the lens data LDTS necessary for the AF operation is inputted from the camera-control micro-computer COP (step #34). Then, the CCD is controlled. First, the integration of the CCD is effected. When the integrated light amount reaches a proper level, or when a predetermined maximum integration time lapses as occurred when the brightness of the object to be photographed. is relatively low, a shift pulse is applied to the CCD. Accordingly, the data of the CCD, namely, the image information in the digital form is inputted (step #35 in FIG. 25a). Although the operation will be described more in detail later, it is to be noted here that the data from the CCD in all the zones 1-4 are inputted.

A low contrast flag, used for indicating whether or not the object to be photographed has a low contrast, is set (step #36 in FIG. 25a). The low contrast flag is cleared only when the focus detection effected at the preceding CCD integration was possible. In this situation, since the CCD integration is carried out for the first time, the low contrast flag is set. The flag will be utilized later so as to decide whether the low-contrast scan should be carried out, or whether the in-focus detection should be carried out again with the lens being remained in the position as it is. It is to be noted here that the low-contrast scan is an operation effected when the contrast of the object to be photographed is relatively low, and is carried out such that the lens is driven all over the driving range thereof, for example, in one reciprocal movement to find a position which can provide a proper contrast of the object.

In order to decide the priority of the four zones for the focus detection calculation, a data initial processing (steps #37-#57), an initial correlation (steps #57-#72), an initial correlation low contrast detection (steps #73-#81) and a priority setting of the zones (steps #83-#94) are carried out. These operations will be described later in detail, but in brief, the operations are such that, the zone including the closest object among the objects within the photographing frame, in other words, the zone having the largest image deviation among image deviations L1, L2, L3 and L4 (FIG. 22d) calculated in each zone is selected and the focus detection is effected only with respect to the particular zone. This is because, if the precise correlation calculation is conducted for all of the zones, the calculation time may be undesirably prolonged.

It is checked in step #82 whether or not the variable Z is "0", and if the variable Z is "0", it is decided that all of the AF zones are in low contrast.

The determination of the low contrast at this stage of the operation is performed in a simple manner as described above in a small range of determination because the determination of the low contrast will be carried out again after the precise correlation. With respect to the zone selected by the initial correlation, the in-focus condition detection calculation is further carried out with more accuracy in the precise correlation calculation (steps #96–#105). Based on the above precise correlation calculation, lation, the low contrast check is further performed (steps #106, #107). When the selected zone has a low contrast, the program goes through steps #108 and #111, and carries out the precise correlation calculation (steps #96–#105) for another zone. The steps #108, #111, #96–#105 are repeated, so that the contrast conditions in the zones are detected in turns in the priority order as determined in steps #83–#94 until a zone with a sufficient contrast is found. If a zone with a sufficient contrast is found, the program goes to step #112 for the defocus amount calculation. If all of the four zones has a low contrast, the program goes to step #109. At step #109, if the low contrast flag is set, the situation is assumed that the lens is considerably away from the in-focus position with respect to the object to be photographed, and therefore it is considered that the detection of the de-focus amount is not possible. In such a situation, a low contrast scan operation (step #110) is carried out by one reciprocal movement of the lens between the nearest focusing position to the infinite focusing position. During the reciprocal movement of the lens, the CCD integration and the calculation are repeated many times so as to search a lens position at which the defocus amount can be detected.

When it is detected that the zone is not in the low contrast and the de-focus amount is calculated (step #112), the low contrast flag is cleared (step #113), and this situation of the lens is stored. Thus even if it is detected in the next integration that the zone has a low contrast, the integration and calculation of the CCD are carried out in all the zones with the lens remained as it is. By so doing, even if the aiming object moves from one zone to another without a substantial change in the distance between the object and the camera, the low contrast scanning will not be carried out just because that the zone as selected in the previous cycle is now in the low contrast condition. Thus, it is possible to prevent the lens from losing its position as the result of the low contrast scanning.

Thereafter, in order to inform. camera control microcomputer COP of the light measuring zone as selected by AF control micro-computer AFP, a zone signal SZS representing zone selected by AF control micro-computer AFP is transferred to camera-control micro-computer COP, and then the AF zone selecting signal AFZS changes its state to a HIGH level control microcomputer COP comes to step #7, the program goes to step #7-1 and further to step #9, so that the AF zone signal SZS is inputted in order to conduct the spot light measurement calculation based on the signal obtained from the light measuring element corresponding to the selected zone (step #10). This is explained in detail hereinbelow.

If the AF zone selecting signal AFZS is detected as in a HIGH level in step #7 in FIG. 24, it is further detected in step #7-1 whether or not the AF end signal AFE is HIGH. Then, when the AF end signal AFE is HIGH indicating that the in-focus condition is obtained, it is further detected at step #7-2 whether a flat BIF is set or not. In the case where the flag BIF is not set, the flag BIF is set at step #7-3. Then, the program proceeds to step #9. On the contrary, in the case where the flag BIF is set, the program goes to step #11, without changing the Bvc in step #10. As apparent from the above, the light measuring data of the zone (identified by the AF zone selecting signal AFZS) selected immediately after the lens has reached the in-focus condition is AE locked. If the AF end signal AFE is found not to be HIGH in step #7-1 indicating that the lens has not reached the in-focus condition, the flag BIF is reset in step #7-4. Then, the program goes to step #9.

Thereafter, the AF control micro-computer AFP detects whether or not the calculated de-focus amount is within the predetermined in-focus zone (step #115). When it is detected that the lens is positioned within the in-focus zone, the AF micro-computer AFP changes the AF end signal AFE to be HIGH, indicating the completion of the AF operation to camera-control micro-computer COP, together with the display of the in-focus condition, and permitting the shutter release (steps #121 and #123).

In contrast, when it is detected at step #115 that the lens is out of the in-focus zone, the shifting amount of the lens is calculated (step #116) in the form of a number of pulse LEP to be counted by the encoder ENC with the use of the conversion coefficient with which the de-focus amount is converted to the lens shifting amount inputted previously. Motor MO is accordingly driven by the number of the calculated pulse counts which number is counted by a counter PC (steps #117, #118 and #119), thereby to move the lens by the calculated lens shifting amount, and then the motor is stopped (step #120).

After the above-described operation, the integration of the CCD is carried out again in order to check again whether or not the lens is properly focused. At this time, to shorten the operating time, the integration is carried out only in the selected CCD zone through the preceding calculation (step #127). Before this, the variable Z is set to be "1", and the data LDTS necessary for the AF operation is inputted to AF micro-computer AFP (steps #125 and #126) so that the low contrast detection can be carried out only in the selected CCD zone. Then, the precise correlation calculation only with respect to the selected CCD block is conducted, and the lens is shifted in accordance with the result of the focus detection. If it is detected at this stage that the selected CCD is in the low-contrast, the lens is held in the position as it is, and the operations from the integration of the CCD in all zones are repeated without moving the lens.

The foregoing description is related to the fundamental operation of the automatic focusing camera provided with an automatic focus adjusting means which adjusts the focusing condition of the lens irrespective of the position of the target object in the photographing frame and, an exposure control means which controls the exposure by the spot light measurement with respect to the target object.

Next, the description is directed to the details of the operations for the data initial processing (FIG. 26), the initial correlation (FIG. 27), the initial correlation low-contrast detection (FIG. 28) and the priority setting of the zones (FIG. 29), which are arranged from a viewpoint of reducing the calculation time.

First, the data initial processing routine will be described in connection with FIG. 26. At step #37, a zone data Z is set to be "1" identifying one of the four AF zones. At step #38, a cumulative contrast data C(Z) is set to be "0" indicating a cumulative contrast value to be zero at the beginning, and at step #39, a cycle number data j indicating the number of contrast calculation cycles carried out for one AF zone is set to be "0".

Then, at step #40, a difference of the A/D converted data between two adjacent picture elements in the standard area in the CCD is taken, and the difference is checked whether it is positive or negative. Each time the difference is checked, sign data Ldj holds "1" (step #41) or "0" (step #42) when the detected result is positive or negative, respectively. More specifically, when each picture element in the standard area is producing a data LDj, a calculation:

$$LD_j(Z) - LD_{j+1}(Z) \tag{1}$$

is carried out in step #40, a result of which is judged whether it is positive or negative. In the case where the result is positive, the sign data Ldj is made "1" in step #41, while in the case where the result is negative, the sign data Ldj is made "0" in step #42.

The same calculation as formula (1) is carried out in step #43, and the obtained difference represents a contrast value C. An absolute value $|C|$ is taken and is added to a cumulative contrast value C(Z) (step #44), thereby obtaining a sum of the absolute values $|C|$s up to the present calculation cycle. Then the cycle number data j is increased by "1" in step #45. The operations of steps #38-#45 are repeated until the cycle number data j becomes (k-1) (k is the number of picture elements provided in the standard area) (step #46).

Therefore, by repeating steps #40-#46 for (k-1) cycles, sign data Ldl(1), Ld2(2), Ldj(1), and $Ld_{k-1}(1)$ are stored in AF micro-computer AFP which represent a contrast change distribution along the standard area in the first AF zone, and at the same time, the cumulative contrast value C(1) is also stored. Similar data will be stored for the second, third and fourth AF zones, as described below.

When the cycle number data j becomes equal to (k-1) in step #46, it is detected in step #47 whether or not the zone data Z representing the AF zone number is "4". In this manner, the operations of steps #38-#45 for each one of the four AF zones are carried out. In the case where the zone data Z is not "4", the zone data Z is added with "1" in step #48, so that the operation returns to step #38. The operations in step #38-#47 will be repeated until the zone data Z becomes "4", i.e., until four standard areas are processed. Accordingly, data representing the contrast change distribution and the cumulative contrast value are stored for each of the first, second, third and fourth AF zones.

When the zone data Z becomes "4" in step #47, the program advances to step #49. In steps #49-#57, operations similar to steps #37-#47 (excluding steps #38, #43 and #44) are carried out. In steps #49-#57, four reference areas are processed. It is to be noted here that, in steps #49-#57, instead of the sign data Ldj, a sign data Rdj is used for holding "1" or "0" for the indication of positive or negative of the obtained difference between two neighboring picture elements in the reference area. Also, l, which is greater than k, represents the number of the picture elements provided in the reference area.

Thus, in the manner described above, for the first to fourth standard areas, the cumulated contrast values C(Z) (Z=1 through 4) and the contrast change distributions:

$$Ld_1(Z), Ld_2(Z), \ldots, Ld_j(Z), \ldots \text{ and } Ldk_{l-1}(Z)$$

are obtained, and for the first to fourth reference areas, the contrast change distributions:

$$Rd_1(Z), Rd_2(Z), \ldots, Rd_j(Z), \ldots \text{ and } Rd_{l-1}(Z)$$

Figure 26:
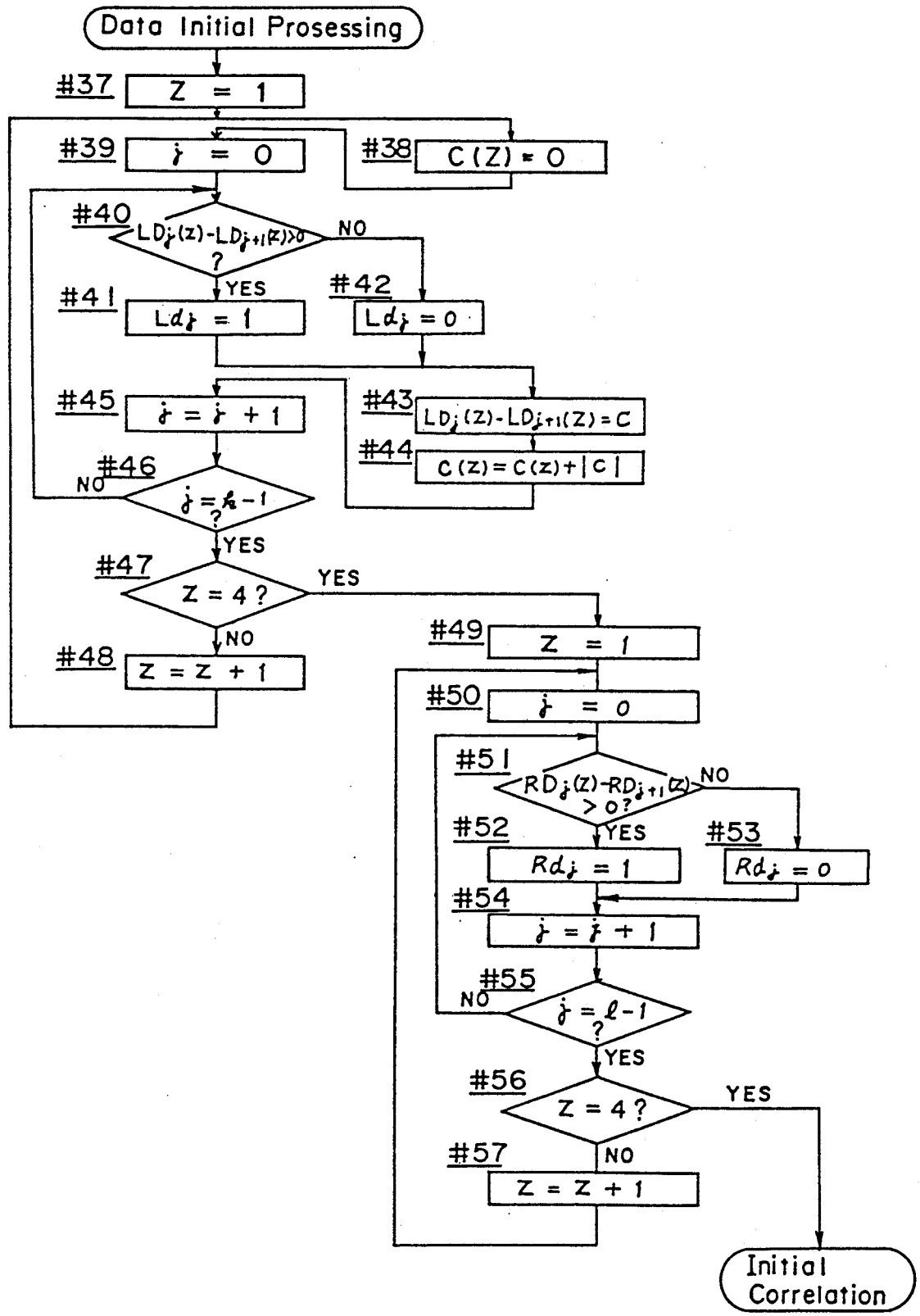
FIGS. 26–29 flow-charts respectively showing operations of initial processing routine, the initial correlation routine, the initial correlation low contrast detection routine and the priority setting routine of the zones.

(l± is greater than k)

are obtained, thereby completing the initial processing operation (FIG. 26).

Figure 27:
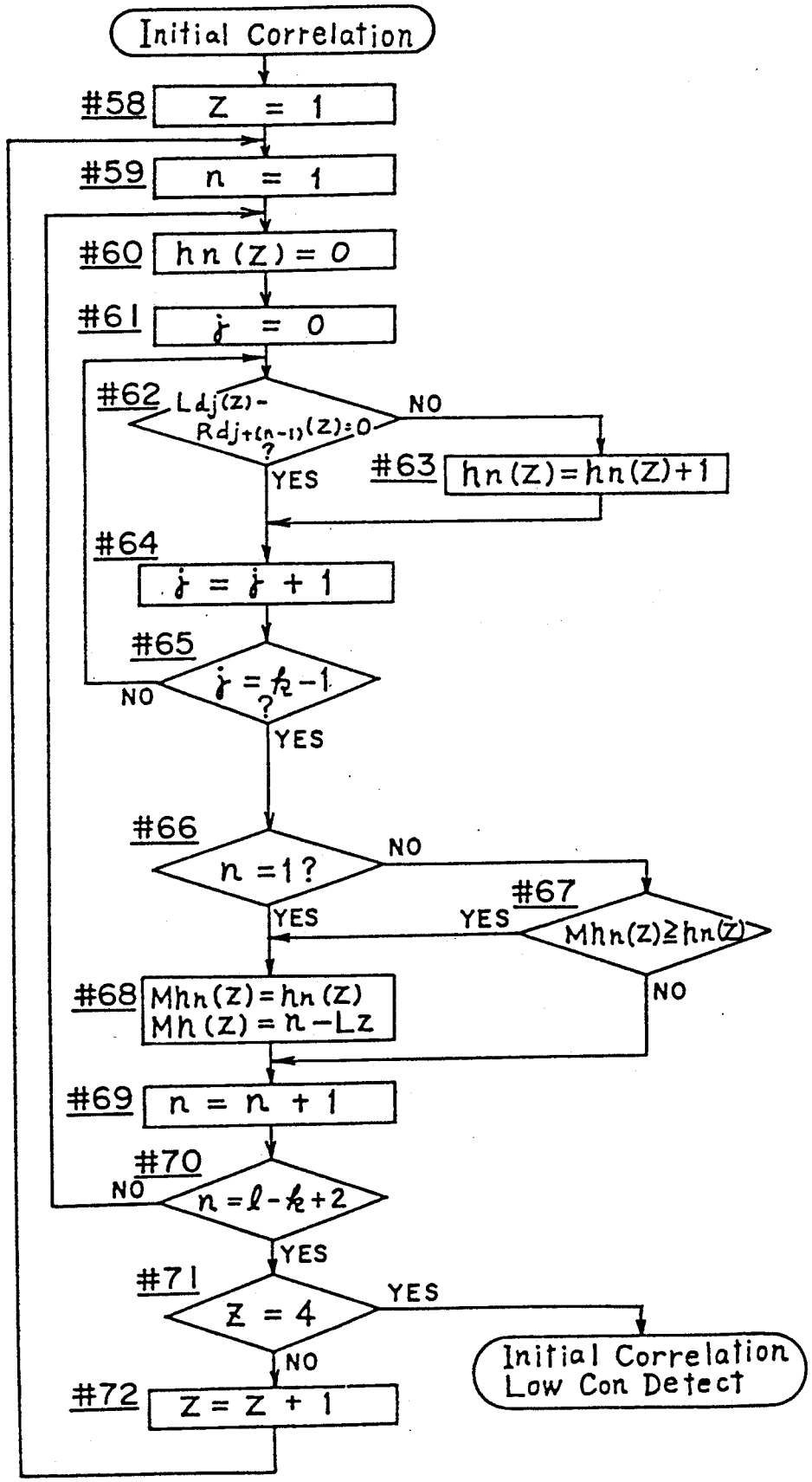

Referring to FIG. 27, the initial correlation routine will be described. At step #58, the zone data Z is set to be "1" identifying one of the four AF zones. At step #59 a shift data n is set to be "1", at step #60 a correlation data hn(Z) is set to be "0", and at step #61 the cycle number data j is set to be "0" indicating the number of contrast calculation cycles carried out for one AF zone.

At step #62, a calculation $$Ld_j(Z) - Rd_{j+(n-1)} \tag{2}$$

is carried out to obtain a difference between the contrast change distribution of the standard area and that of the reference area.

More specifically, for the first (k-1) cycles of operations through steps #62-#65, since shift data n=1, a difference between the contrast change distribution:

$$Ld_1(1), Ld_2(1), \ldots, Ld_j(1), \ldots \text{ and } Ld_{k-1}(1)$$

of the standard area and the contrast change distribution:

$$Rd_1(1), Rd_2(1), \ldots, Rd_j(1), \ldots \text{ and } Rd_{k-1}(1)$$

of the reference area is obtained. To this end, a difference between sign data $Ld_j$ in the standard area and the sign data $Rd_j$ in the reference area is calculated at step #62 as indicated below:

$$Ld_1(Z) - Rd_1(Z)$$
$$Ld_2(Z) - Rd_2(Z)$$
$$Ld_3(Z) - Rd_3(Z)$$
$$\vdots$$
$$Ld_{k-1}(Z) - Rd_{k-1}(Z)$$

In each subtraction, if the difference is equal to zero indicating the concordance between sign data $Ld_j$ and $Rd_j$, the program proceeds to steps #64 and #65 so as to carry out the next subtraction. On the contrary, if the difference is not equal to zero indicating the discordance between sign data $Ld_j$ and $Rd_j$, the program follows step #63 to count the number of occurrences of such a discordance in each comparison between the contrast change distributions $Ld_j(Z)$ and $Rd_j(Z)$. The counted result is stored as the correlation data hn(Z).

When the correlation data hn(Z) has a great number, indicating that the discordance occurred many times, it can be said that the correlation is low or poor. On the other hand, when the correlation data hn(Z) has a small number, indicating that the discordance occurred only a few times, it can be said that the correlation is high or good.

When (k-1) cycles of operations through steps #62-#65 are carried out, the program goes to step #66, at which it is detected whether n=1 or not. At this stage, since shift data n=1, the program goes to step #68 at which the correlation data hn(Z) is stored as a minimum correlation data Mhn(Z), and also, (n−Lz) is stored as an image deviation data Mn(Z). Here, an amount Lz represents a predetermined shift amount to obtain a proper infocus condition. Thus, (n-Lz) represents an amount of defocus.

At step #69, shift data n is increased by "1", such as to "2" at this stage, and at step #70, it is detected whether or not n is equal to (1−k+2). If not, the program returns to step #60 at which the correlation data hn(Z) is cleared to "0", and at next step #61, the cycle number data j is also cleared to "0".

Then, for the next (k-1) cycles of operations through steps #62-#65, since shift data n=2, a difference between the contrast change distribution:

$$Ld_1(1), Ld_2(1), \ldots, Ld_j(1), \ldots \text{ and } Ld_{k-1}(1)$$

of the standard area and the 1-bit shifted contrast change distribution:

$$Rd_2(1), Rd_2(1), \ldots, Rd_{j+1}(1), \ldots \text{ and } Rd_k(1)$$

of the reference area is obtained. To this end, a difference between sign data $Ld_j$ in the standard area and 1-bit shifted sign data $Rd_{j+1}$ in the reference area is calculated at step #62 as indicated below:

$$Ld_1(Z) - Rd_2(Z)$$
$$Ld_2(Z) - Rd_3(Z)$$
$$Ld_3(Z) - Rd_4(Z)$$
$$\vdots$$
$$Ld_{k-1}(Z) - Rd_k(Z)$$

In the same manner as described above, during the above subtractions, the number of occurrences of the discordance is counted in step #63, and the counted result is stored as the correlation data hn(Z).

Then, at step #66, it is detected whether or not n=1. At this stage, since n=2, the program goes to step #67 at which it is detected whether or not the newly obtained correlation data hn(Z) is equal to or smaller than the minimum correlation data Mhn(Z) as so far obtained. If the newly obtained correlation data hn(Z) is smaller than the present minimum correlation data Mhn(Z), the program goes to step #68 to store the newly obtained correlation data hn(Z) as the minimum correlation data Mhn(Z), and also the image deviation data Mh(Z) is rewritten. On the contrary, at step #67, if the newly obtained correlation data hn(Z) is not smaller than the previously obtained minimum correlation data hn(Z), the program goes to step #69 to increase the shift data n by "1".

In this manner, for one zone, after every one bit shift, the comparison between the contrast change distribution along the standard area and the contrast change distribution along the reference area is carried out. Therefore, in total, the comparison is carried out for n(=1−k+2) times for one zone.

The above operation (steps #59-#70) is carried out for four zones, so that the minimum correlation data Mhn(Z)

(n is between 1 and 1−k+2 and Z is 1, 2, 3 or 4) and the image deviation data Mh(Z) are obtained for each of the four zones, thereby completing the initial correlation operation (FIG. 27), and making it possible to start the initial correlation low contrast detection operation.

Figure 28:
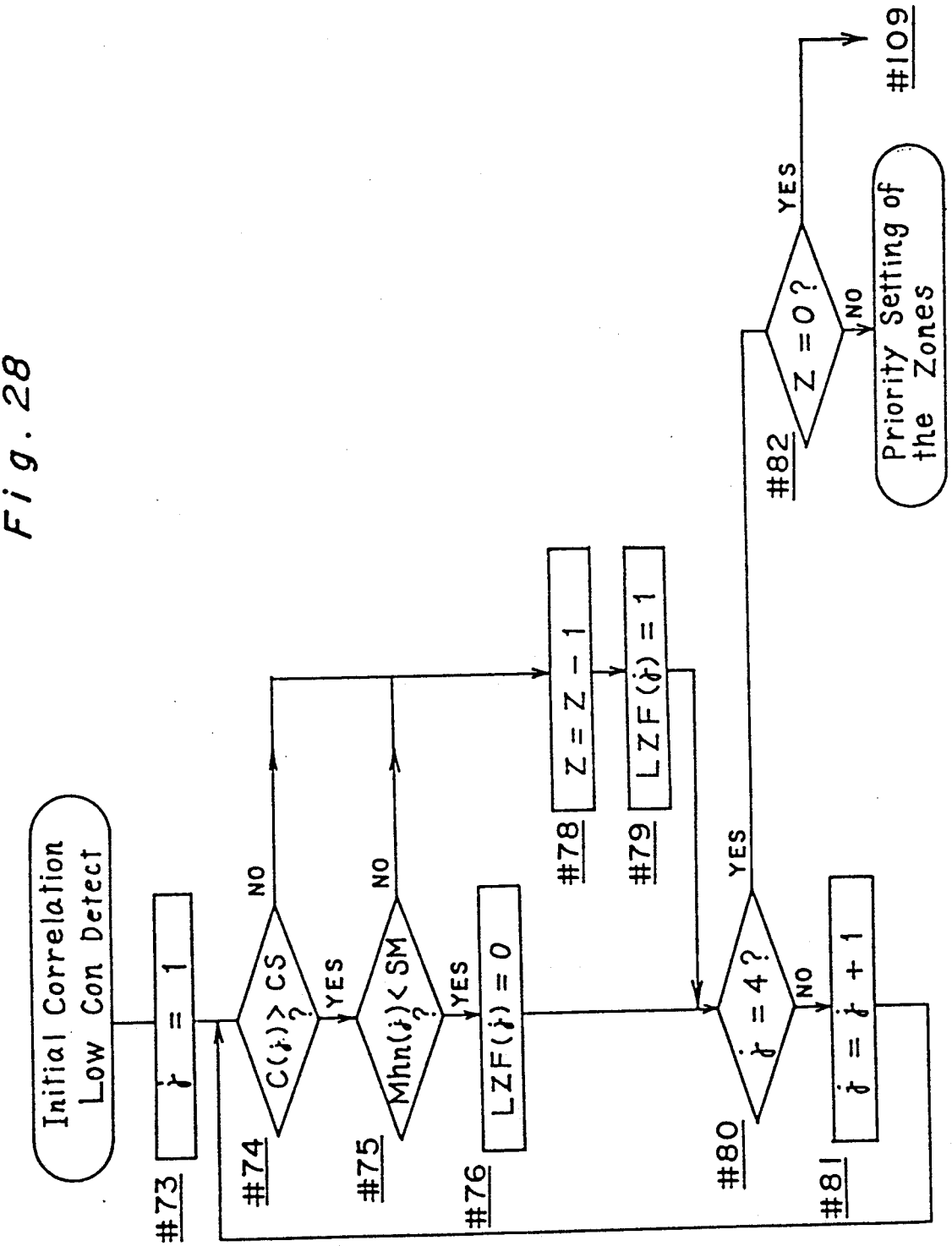

Referring to FIG. 28, the initial correlation low contrast detection routine is shown, in which the low contrast detection is carried out using the calculation result of the cumulative contrast value C(j) obtained from the data initial processing operation (FIG. 26) and the minimum correlation data Min(j) obtained from the initial correlation operation (FIG. 27). In the flow chart of FIG. 8, the variable j is used for representing the zone number which is first set to be "1" at step #73 so as to carry out the low contrast detection with respect to each of the four AF zones. Since step #73 is preceded by step #71 (FIG. 28), the variable Z is now carrying "4". It is detected at step 74 whether or not the cumulative contrast value C(1) for the first AF zone is over a predetermined value CS. At step #75, it is detected whether or not the minimum correlation data Mhn(1) is less than a predetermined value SM.

In the case where the cumulative contrast value C(1) exceeds the predetermined value CS and at the same time, the minimum correlation data Mhn(1) is less than the predetermined value SM, it is so detected that the focus detection can be carried out for the first AF zone, and accordingly, a low contrast zone flag LZF(1) for the first AF zone is reset to be "0" at step #76.

On the other hand, if the contrast value C(1) is under the predetermined value CS, or if the minimum correlation data Mhn(1) is over the predetermined value SM, the variable Z which is initially carrying "4" is reduced to "3" at step #78, and als, it is so detected at step #79 that the focus detection is not possible for the first AF zone, so that the low contrast zone flag LZF(1) for the first zone is set to be "1".

At step #80, it is detected whether j=4 or not. If not, then at step #81, the cycle number data j is increased by 1, and the program returns to step #74 to repeat the steps #74-#79. At step #80, when j=4, the program goes to step #82 detecting whether Z=0 or not. Since Z is decreased from "4" each time the program advances through steps #78 and #79, Z is now carrying a number equal to the number of reset low contrast flags. When there is at least one reset low contrast flag, meaning that there is at least one zone for which the focus detection can be carried out, the program goes to the flow chart of FIG. 29 at which the priority setting of the zones is carried out. On the contrary, when there is no reset low contrast flag, meaning that all four zone are so out of focus that the focus detection can not be carried out, the program goes to step #109 (FIG. 25a) to carry out the low contrast scan.

Figure 29:
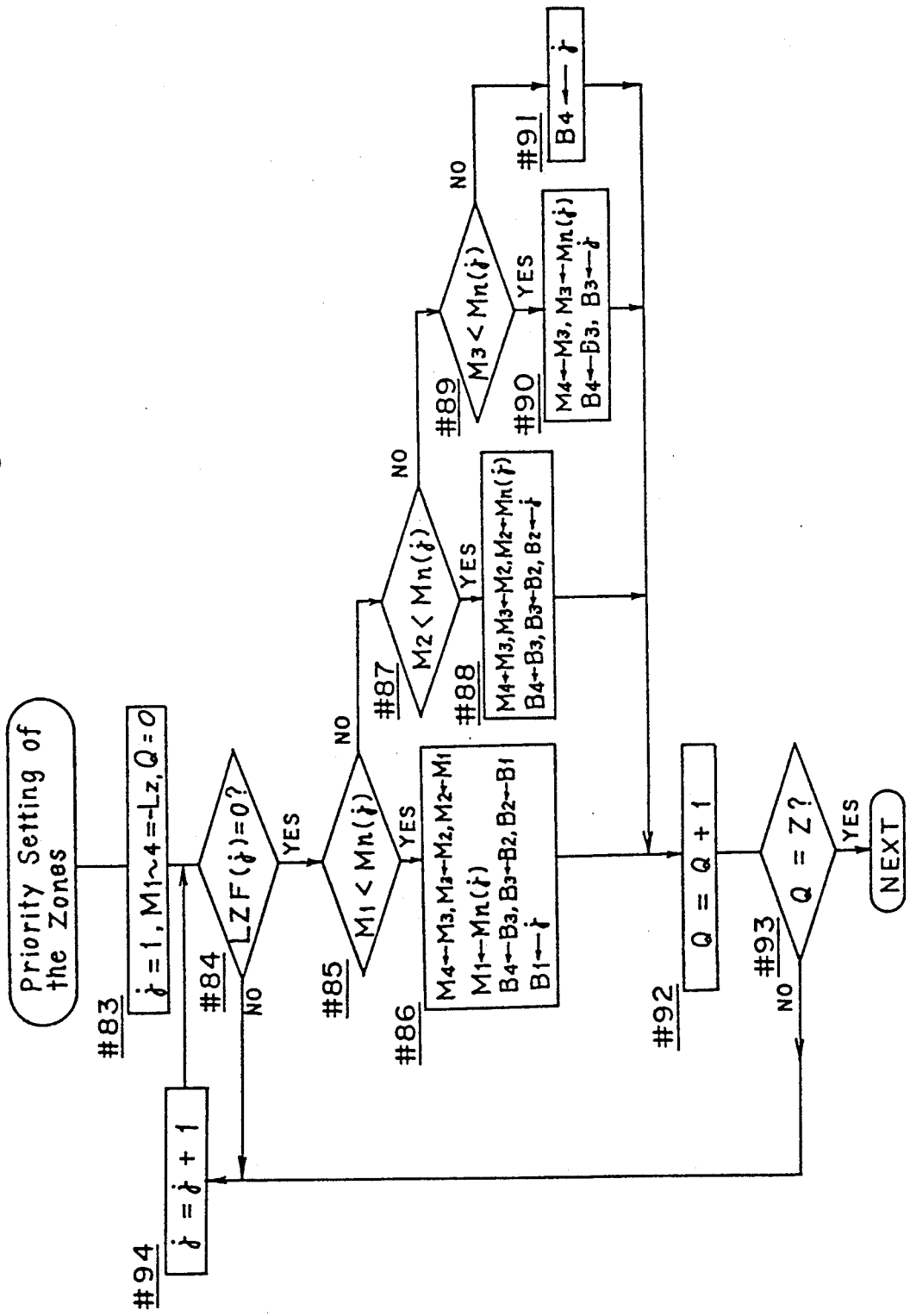

Referring to FIG. 29, a flow chart for setting the priority of zones is shown. At step #83, the zone number data j to be "1", registers M1, M2, M3 and M4 for storing the image deviation data are stored with the minimum image deviation −Lz and a cycle number data Q is set to be "0". At step #84, it is detected whether the low contrast flag LZF(1) for the first zone is reset, or not. If not, meaning that the first zone is so out of focus that the focus detection can not be carried out, then it is not necessary to provide any priority to such a zone. In this case, the program goes to step #94 to add "1" to zone number data j so as to determined the next low contrast flag, e.g., LZF(2). If the second low contrast flag LZF(2) is reset, then the program advances to step #85 at which it is detected whether or not the image deviation data Mn(2) for the second zone is greater than the minimum image deviation −Lz. At this stage, obviously the data Mn(2) is greater than the minimum image deviation −Lz as stored in register Ml. Therefore, the program goes to step #86 at which the data in register M3 is shifted to register M4, the data in register M2 is shifted to register M3, the data in register Ml is shifted to register M2, and the image deviation data Mn(2) is stored in register Ml in which the highest image deviation data is stored. Similarly, a register Bl is stored with "2" indicating the zone number having the highest priority. Other registers B2, B3 and B4 are stored respectively with the data previously stored data, such as "0", in registers Bl, B2, and B3. Then, at step #92, the cycle number data Q is increased by "1". Then, at step #93, it is detected whether Q=Z (Z is now carrying a number equal to the number of reset low contrast flags), or not. If not, then the zone number data j is increased by "1", such as to "3", and the program returns to step #83.

At step #84, if the third low contrast flag LZF(3) is reset, then the program advances to step #85 at which it is detected whether or not the image deviation data Mn(3) for the third zone is greater than the image deviation Mn(2) as stored in register Ml.

At step #85, if the data Mn(3) is greater than Mn(2), the program advances to step #86 at which the data Mn(3) is store in register Ml, and the data Mn(2) is shifted to register M2. Similarly, the present zone number data j, i.e., "3" is stored in register Bl, and the zone number data "2" previously stored in register Bl is shifted to register B2, indicating that the third zone has the first priority and the second zone has the second priority.

On the contrary, at step #85, if the data Mn(3) is not greater than Mn(2), the program advances to step #87 at which the data Mn(3) is compared with the minimum image deviation −Lz as stored in register M2. Obviously, the data Mn(3) is greater than the minimum image deviation −Lz as stored in register M2. Therefore, the program goes to step #88 at which the data in registers M2 and M3 are shifted to registers M3 and M4, respectively, and register M2 is stored with the data Mn(3). Similarly, register B2 is stored with the present zone number data j, i.e., "3" indicating that the third zone has the second priority.

In this manner, the zones carrying the reset low contrast flag are given with the priorities, and the first priority is given to the zone which has the smallest image deviation data, i.e., the zone receiving an image of an object located closed to the camera.

Figure 30:
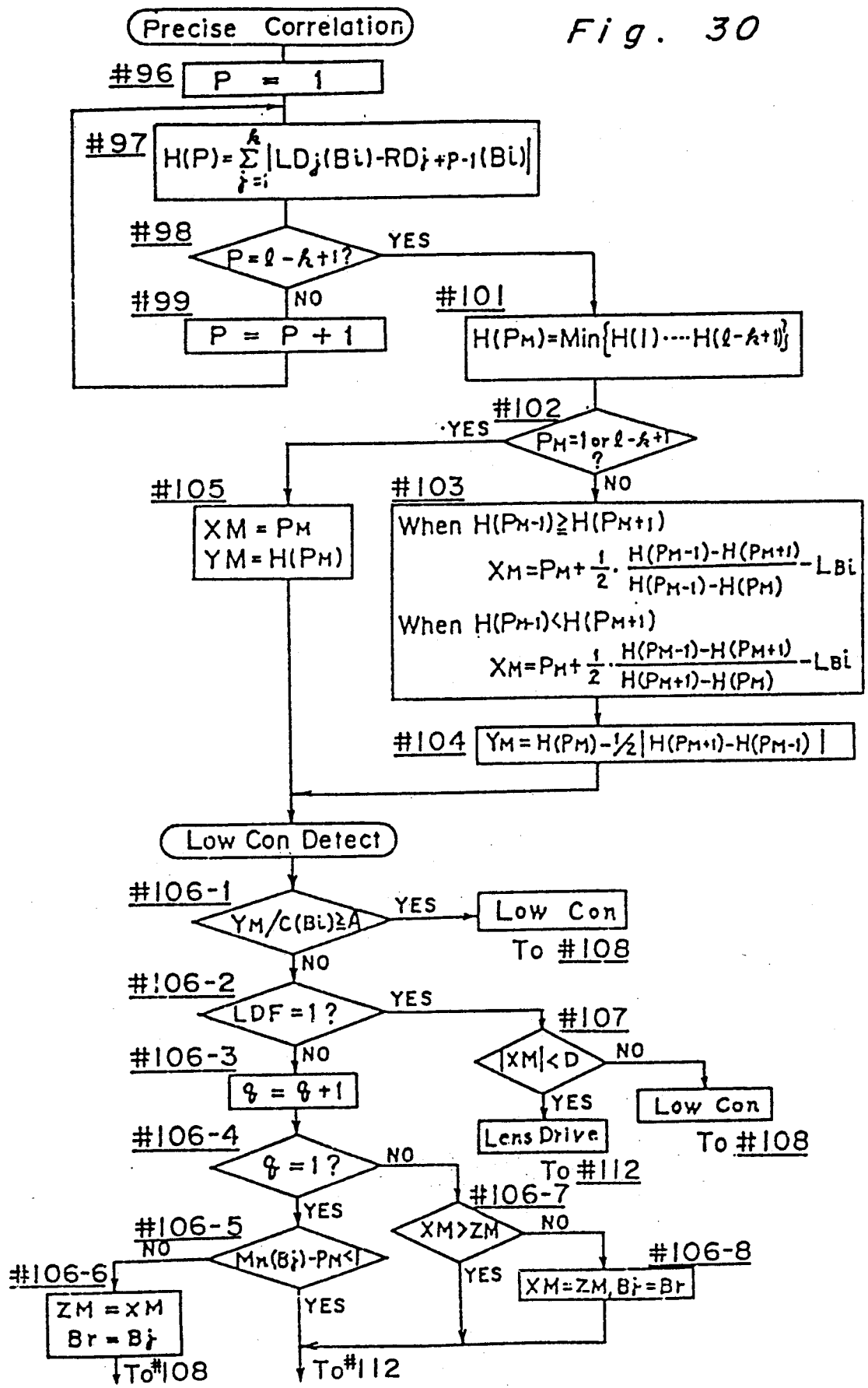
FIG. 30 is a flow-chart showing an operation of a precise routine according to the preferred embodiment of the present invention.

Although the camera of the present embodiment has been described above with the description related to the initial processing, initial correlation, initial correlation low contrast detection and priority setting of the zones, the same function as the above can be achieved in such a manner as that, instead of the calculation (subtraction) in step #97 in FIG. 30 to obtain the precise correlation value of the precise correlation or the initial processing in which the CCD data is binarized by a predetermined value or an average output value of the CCD data, etc., an exclusive logic sum of the two data may be obtained, and the shift position is searched at which the above exclusive logic sum becomes the minimum value, so as to effect the initial correlation.

Referring to FIG. 30, the procedure for the precise correlation will be described in detail.

For the precise correlation value, it is obtained by the sum of the output differences, which are not binarized of outputs of the picture elements in the standard area and the reference area of the zone, as in the case of the initial correlation. More specifically, when each picture element in the standard area of the zone $B_i$ having the highest priority is producing data $LD_j$, and each picture element in the reference area of the zone $B_i$ is producing a data $RD_j$, the precise correlation value H(p) is obtained as follows, $$H(p) = \sum_{j=1}^{k} |LD_j(B_i) - RD_{j+p-1}(B_i)|$$

provided that p changes from 1 to $1-k+1$. Therefore, $1-k+1$ precise correlation values H(p) are obtained through shifting of the reference area picture elements, one bit at a time, for $1-k+1$ times with respect to the standard area picture element array (steps #96-#99). When $1-k+1$ precise correlation values H(p) are obtained, the one H(PM) that has the minimum value is searched (step #101). Thereafter, in step #102, it is detected whether or not the shift amount PM is either one of "1" and $1-k+1$.

When the shift amount PM is neither "1" and $1-k+1$, the program goes to step #103 in which an interpolation calculation result is subtracted by an image deviation LBi of in-focus condition so as to obtain an image deviation XM.

The interpolation calculation is disclosed in detail in U.S. Pat. No. 4,636,624 of Ishida et al. Therefore, its detail will not be explained herein.

Furthermore, in step #104, the minimum precise correlation value YM is obtained.

On the contrary, in step #102, when the shift amount is either "1" or "$1-k+1$", the interpolation calculation can not be carried out. Therefore, the image deviation XM is set to be equal to the shift amount PM obtained in step #101, and also the minimum value H(PM) calculated in step #101 is regarded as the minimum precise correlation value YM.

Since the image deviation having the minimum precise correlation value can be anticipated from the result $Mn(B_i)$ obtained in the initial processing, it is possible to shorten the calculation period if the calculation is performed only with respect to those adjacent the anticipated image deviation within the selected zone $B_i$.

Based on the minimum precise correlation value YM and the image deviation PM obtained in the above described manner, the low contrast detection is carried out again, if necessary. Here, the condition is such that the minimum precise correlation value YM divided by the contrast value obtained in the initial processing is smaller than a predetermined value A (step #106-1). If the divided value is greater than the predetermined value A, the selected zone is regarded as the low contrast zone, and therefore, the program goes to step #108.

At step #106-2, it is detected whether the operation up to step #128 has been carried out at least for once, or not. If yes, in which case a flag has been set at step #128, the program goes to step #107 to detect whether or not an absolute value of the image deviation XM is smaller than a predetermined value D. If XM is smaller than D, the program goes to step #112 so that the lens is driven based on the image deviation XM. However, if XM is greater than D, it is so assumed that since the image deviation XM is changed abruptly (over the predetermined value D), the object must have been moved out from the selected zone. In such a case, the program goes to step #108 to carry out the CCD integration from the beginning for all the zones.

Since the initial correlation is a simple correlation, there may be a case in which the defocus amount calculated in the initial correlation is greatly different from that obtained from the precise correlation with respect to a particular image. In such a case, it may be possibly happen that an object located more close to the camera is in a zone other than the selected zone. Therefore, in order to positively pick the closest object, the following step are carried out.

At step #106-3, a variable q, which is initially zero, is increased to "1". Then, at step #106-4, it is detected whether or not q=1. If q=1, indicating the first cycle of the operation, the program goes to step #106-5 at which the image deviation $Mn(B_j)$ obtained in the initial correlation is subtracted by the image deviation PM obtained in the precise correlation, and it is detected whether or not the difference therebetween is less than "1" picture element pitch. If the difference is greater than "1" picture element pitch, the program goes to step #106-6 to store the image deviation XM and the selected zone number $B_i$ in registers ZM and Br, respectively. Thereafter, the program goes to step #108. Then, after repeating the another cycle of operation, and when step #106-3 is entered for the second time, the variable q is increased to "2". Thus, the program advances from step #106-4 to step #106-7 in which the newly obtained image deviation XM is compared with that stored in register ZM. If the newly obtained image deviation XM is greater, the program goes to step #112 to drive the lens based on the newly obtained image deviation XM. On the contrary, if the newly obtained image deviation XM is smaller, the program goes to step #106-8 at which the newly obtained image deviation XM and the zone number Bi are replaced with those obtained in the previous cycle as stored in registers ZM and Br (step #106-8). Then, at step #112, the lens is driven based on the previous data. At steps #106-7 and #106-8, the data having a greater image deviation is selected so the the close object can be selected. At step #106-5, if the difference is less than "1" picture element pitch, the program goes to step #112 to drive the lens.

Figure 31:
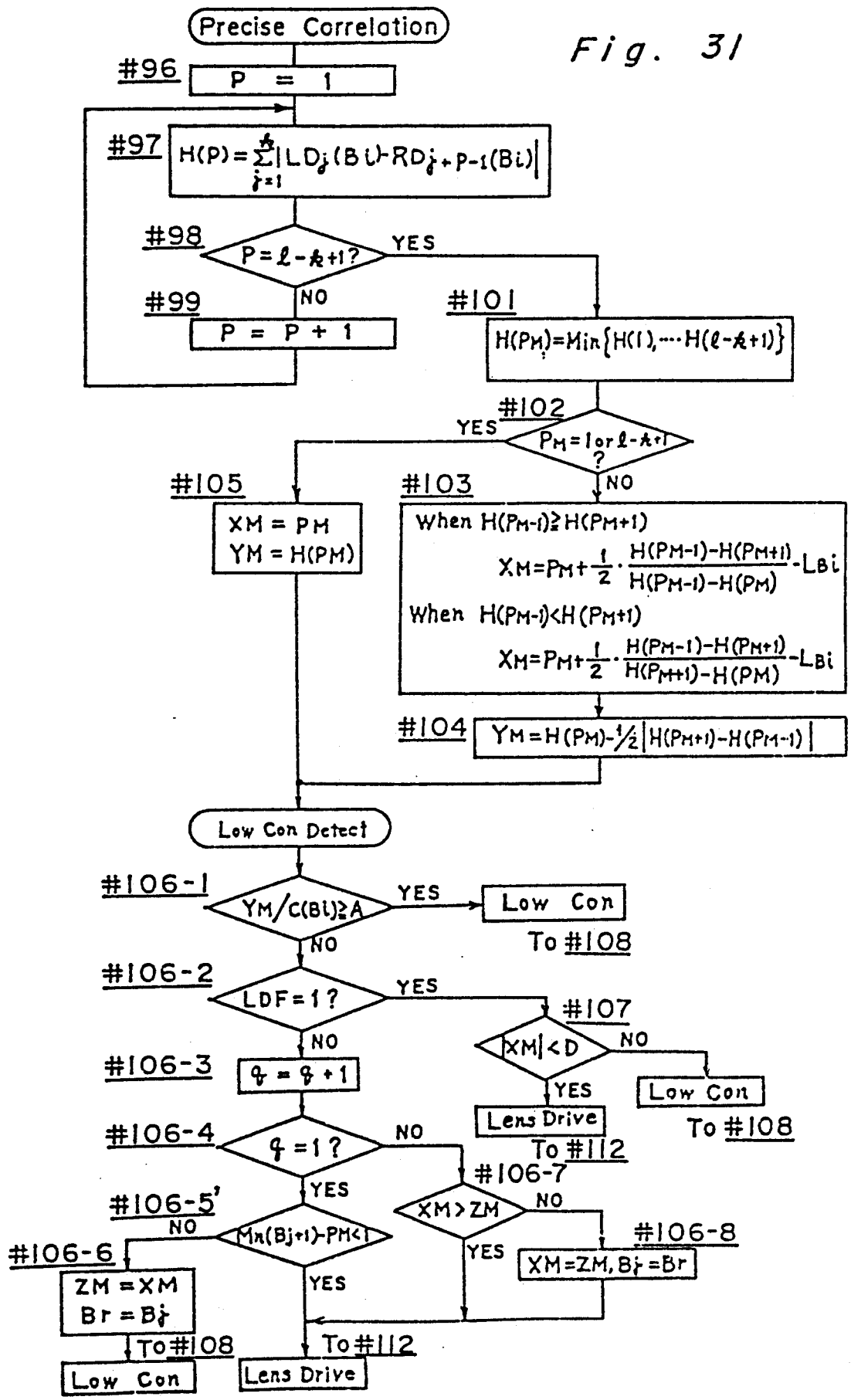
FIG. 31 is a modification of the flow-chart shown in FIG. 10.

Referring to FIG. 31, a flow chart similar to that shown in FIG. 30 is shown. The only difference is in step #106-5' in which the subtraction is conducted by the use of the image deviation $Mn(B_{j+1})$ selected in the initial correlation not as a primary, but as a secondary.

The flow of the whole operation in the camera according to the present embodiment has been fully described above. Hereinbelow, the detailed construction of the electric circuit, the AF sensor CCD and the AF interface AFIF will be described now.

Figure 32A:
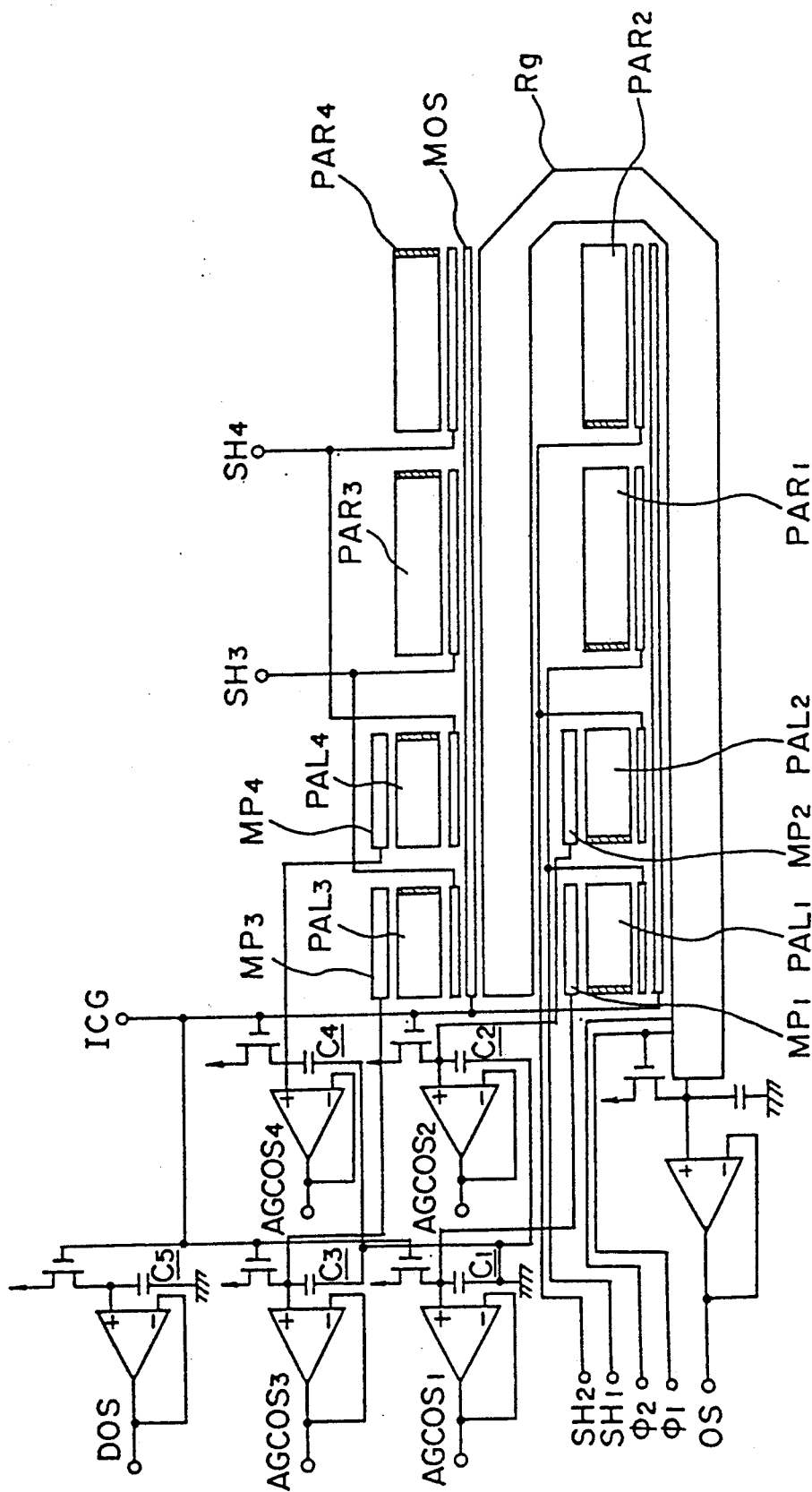
FIGS. 32a and 32b are diagrammatic views respectively showing examples of a structure of a CCD.
Figure 32B:
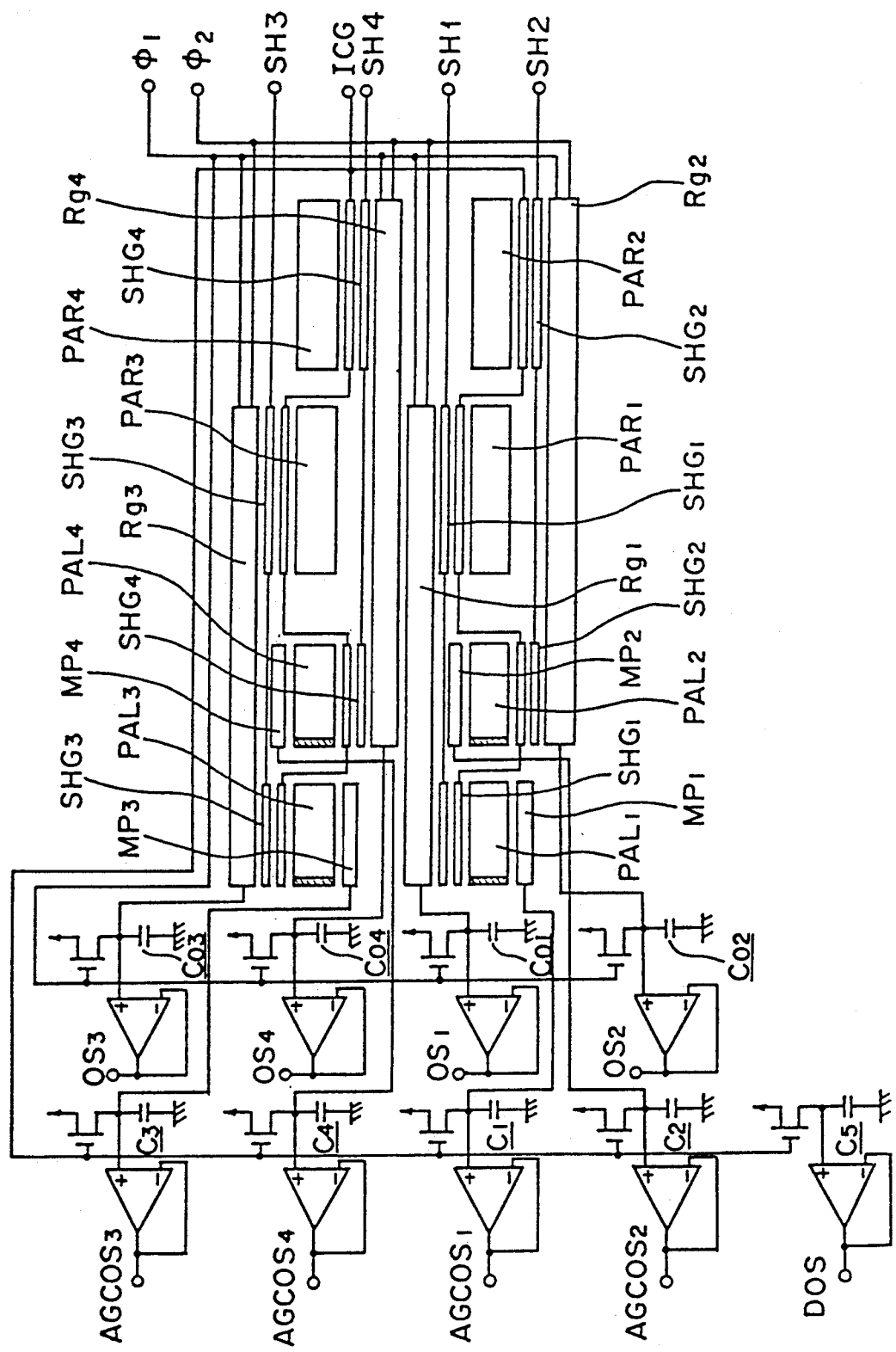

Referring to FIGS. 32a and 32b, two examples of ment are shown. FIG. 32a shows an example in which CCD output registers are arranged in series (this arrangement is fully described in detail for example in U.S. patent application Ser. No. 005,413, assigned to the same assignee as the present application), while FIG. 32b shows an example in which CCD output registers are arranged in parallel, each CCD being formed by one-chip.

The construction common to the examples of FIGS. 32a and 32b will first be described. An image in the first to fourth blocks is divided to be formed on the standard area photodiode arrays PAL1-PAL4 as standard area images, and on the reference area photodiode arrays PAR1-PAR4 as reference area images. It is to be noted here that each of the photodiode arrays includes an accumulation part corresponding to the diode array. Th.e standard area photodiode array has k picture elements, while the reference area photodiode array has m picture elements (k<m). Adjacent to each of the standard area photodiode arrays PAL1-PAL4, there are disposed respective photodiodes MP1-MP4 for monitoring the brightness of the object to be photographed so as to control the integration time of the CCD. The photocurrent generated in the photodiodes MP1-MP4 discharges the electric charge of respective capacitors C1-C4, which has been charged approximately up to the level of the source current in response to an integration clear gate pulse ICG, at a rate proportional to the amount of the incident light. The voltages across the capacitors are taken out, through buffers having a high impedance input and a low impedance output, and outputted as monitor outputs AGCOS1-4.

The integration clear gate pulse ICG is applied to a MOS gate provided between the accumulation part (photodiode array) and the power source. While the integration clear gate pulse ICG is in a HIGH level, the accumulation part is charged approximately to the level of the source voltage, so that the accumulation is cleared. Thereafter, when the integration clear gate pulse ICG is dropped to a LOW level, the MOS gate is brought into an opened state, thereby discharging the electric charge from the accumulation part, which has been charged to the level of the source voltage, by the photocurrent corresponding to the image brightness distribution generated in the photodiode array. Thus, the information of the brightness distribution will be accumulated in the picture element array.

The MOS gate is provided between the charge accumulation part and the register in each CCD block of the standard area and the reference area. The MOS gates are closed when they are applied with HIGH level SH pulses SH1-SH4, respectively, and the electric charges, accumulated after the application of the integration clear gate pulse ICG to the accumulating part, are transferred to the respective registers.

A DOS circuit is provided for compensating the outputs of monitor outputs AGCOS1-AGCOS4. The DOS circuit is formed by a capacitor C5 and a buffer having the same characteristic as the capacitor and the buffer of the monitor output part, with its input terminals being opened. The charged voltage approximately to the source voltage in response to the integration clear gate pulse ICG is maintained by the DOS circuit even after the disappearance of the integration clear gate pulse ICG.

The difference between the example shown in FIGS. 32a and that shown in FIG. 32b will be explained.

Examples shown in FIGS. 32a and 32b differ from each other in the arrangement of the CCD registers and the succeeding output stages of the CCD registers. In FIG. 32a, a CCD register Rg is arranged in series with respect to each zone, with an output buffer being provided at the end of the CCD register Rg. The CCD register Rg sequentially produce outputs in the order of the standard area in the first zone, the standard area in the second zone, the reference area in the first zone, the reference area in the second zone, the reference area in the fourth zone, the reference area in the third zone, the standard area in the fourth zone and the standard area in the third zone in synchronization with the negative edge of a transfer clock $\phi 1$.

On the other hand, the CCD image sensor shown in FIG. 32b is arranged in parallel structure such that each zone has a different register, and at the end of each register, an output buffer is connected. Thus, there are four buffers in total. Outputs of the standard area and the reference area in the first to fourth zones are sequentially outputted from the first to fourth buffer outputs respectively, in synchronous relation with the negative edge of the transfer clock $\phi 1$.

Moreover, in the CCD image sensor, since control is carried out in the integration time which is different in the four zones, in rhe case of FIG. 32a, a picture elements indicated by hatched lines is shielded by an aluminum mask, and such a mask is provided at an output end of each of the standard area and the reference area in each zone, so as to correct outputs from the picture elements carrying error signals caused by the dark output level which is greatly changed by the temperatures and the integration time. In the case of FIG. 32b, the adjusting picture elements for adjusting the dark output level are provided at an output end portion of only standard area in each zone, and are used to adjust the output levels of both the standard area and the reference area of each zone.

Next, the AF interface AFIF and the CCD image sensor will be described.

Figure 33:
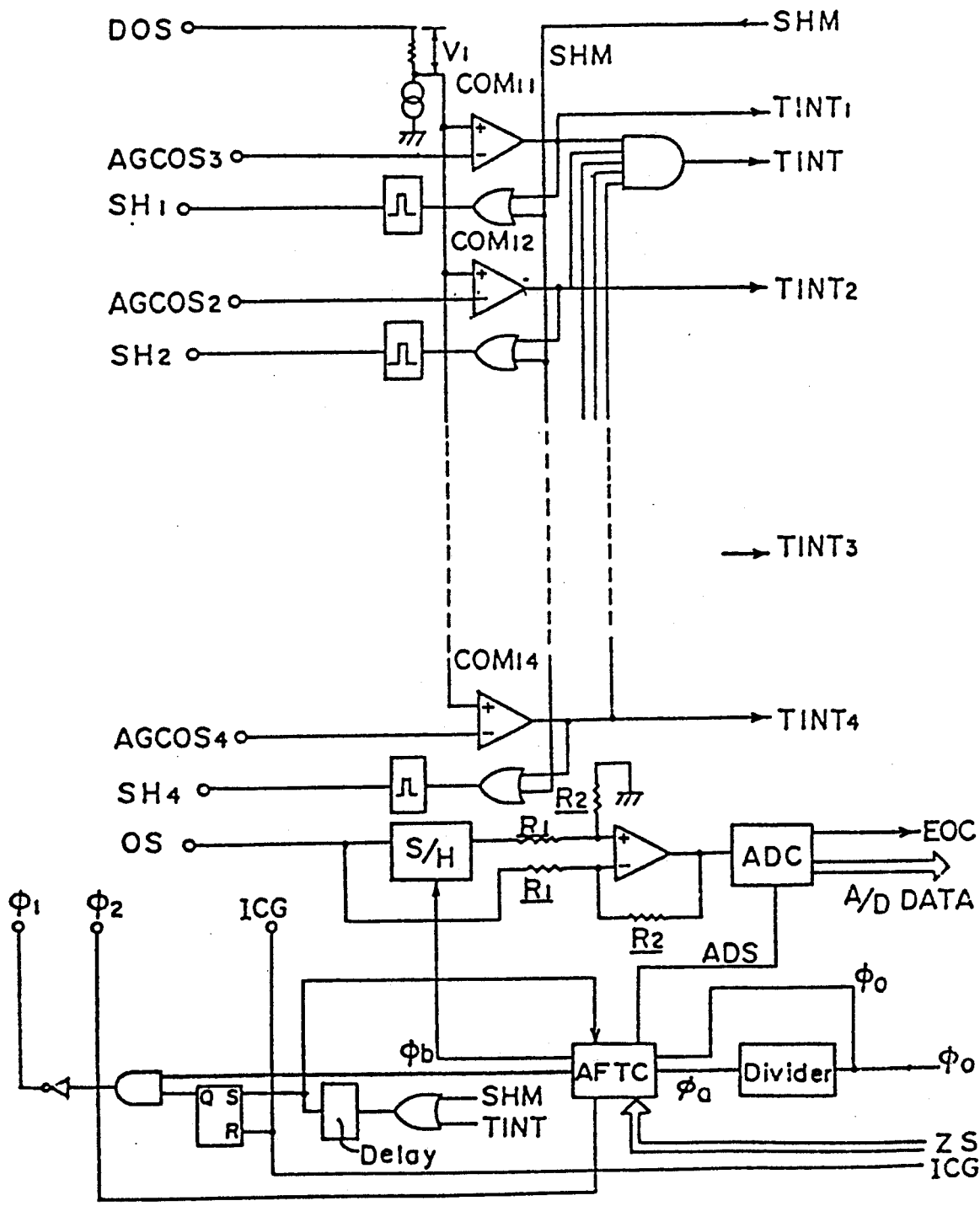

A method for driving the CCD image sensor shown in FIG. 32a having series-connected type CCD register, will be described below in connection with FIG. 33. In FIG. 33, the left-hand side thereof shows a connection part with the CCD image sensor, while the right-hand side thereof shows a connection part with the AF micro-computer AFP. The first CCD integration, after the start of the AF operation, requires outputs from all zones. The integration at this stage is started by the application of the integration clear gate pulse ICG from the AF micro-computer AFP. By the application of the integration clear gate pulse, all the picture element accumulation parts and the monitor outputs of the CCD are initialized. After the pulse disappears, both the accumulation parts and the monitor outputs start the accumulation of photoelectric currents.

An AF timing control circuit AFTC, which receives original clock $\phi O$ from the AF micro-computer AFP and a divided clock $\phi a$ prepared by dividing the original clock $\phi 0$, selects the clock $\phi a$ having a frequency suitable for the A/D conversion as a transfer clock, upon application of a command signal, i.e., the AF zone selection signal AFZS from the AF micro-computer AFP, for selecting every zone. The integration clear gate pulse ICG is inputted to a reset input of an R/S flip-flop. Therefore, the R/S flip-flop is reset, so that the transfer clocks $\phi 1$ and $\phi 2$ to be applied to the CCD are maintained, respectively, at a HIGH level and a LOW level. Under this condition, the accumulation in the picture elements proceeds, and at the same time, the accumulation in the monitor is carried out similarly. Thus, a monitor output, which is dropped by a constant level Vl below the compensation output, starts to be produced. The value Vl is previously set so that the electric charges accumulated in the picture element accumulation part are at an average output level suitable for the A/D conversion and focus detection calculation effected at a later stage.

Figure 34:
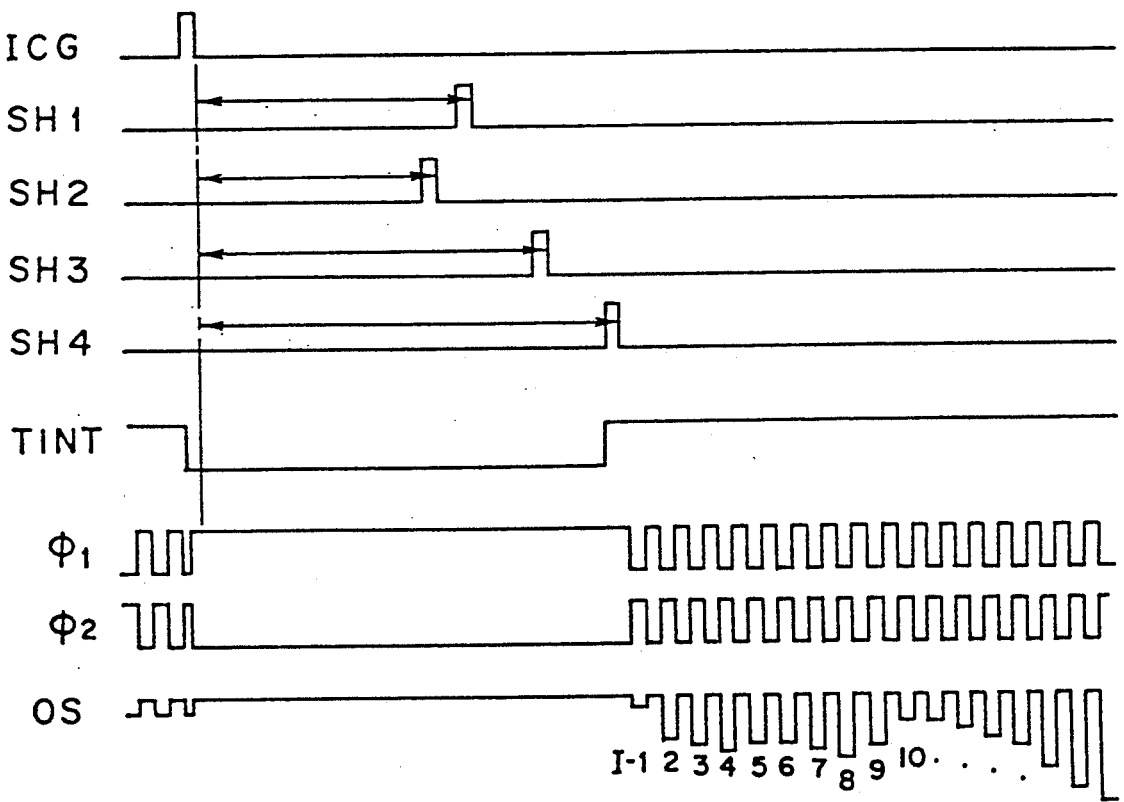
FIG. 34 is a timing chart showing an operation of the circuit of FIG. 33.

Sequentially from the zone receiving higher brightness of the object, each of comparators COM1-1–COM14 produces a HIGH level signal when the input signal to the inverting input exceeds the level Vl. The HIGH level signal is applied through an OR gate to a one-shot pulse generator, which thereupon produces a shift pulse SHi (i=1,2,3,4). Each of the shift pulses SH1–SH4 is applied to the CCD image sensor for shifting the electric charges in the picture element accumulation part to respective transferring register. However, since the transfer clock is not supplied to the register, the electric charges corresponding to the potentials in the picture elements are held in the register. In the above-described manner, when all of the comparators COM11–COM14 produce HIGH level signals, i.e., when the output TINT of an AND gate becomes HIGH, the register in each zone is stored with an appropriate average level signal. When the output TINT of the AND gate produces a HIGH level signal, such a HIGH level signal is used as a signal informing the AF micro-computer of the completion of the integration in all zones of the CCD image sensor. Also, the TINT output, after being applied through the OR gate and the delay circuit to R/S flip-flop, is used as a start signal for starting the application of the transfer clock. A waveform of the outputs is illustrated in FIG. 34. Thereafter, each picture element output is generated from the OS terminal in synchronization with the negative edge of clock $\phi 1$. The AF timing control circuit AFTC generates a sampling signal $\phi b$ by counting $\phi 2$ at respective timing when the picture element for adjusting dark output is generated, with supplying an AD start signal ADS to the AD converter ADC.

Thus, the dark output adjustment of the output of the CCD appropriate for the respective integration time is sequentially carried out in the order from the standard area in the first zone, the second zone standard area, the first zone reference area, the second zone reference area, the fourth zone reference area, the third zone reference area, the fourth zone standard area and the third zone reference area, and thereafter the outputs are A/D converted. Then, in synchronism with an A/D conversion completion signal EOC, A/D converted signals are inputted to the AF micro-computer AFP.

The integration drive for the selected zone as effected in step #127 of FIG. 25 will be described with reference to the circuit of FIG. 33.

Figure 35:
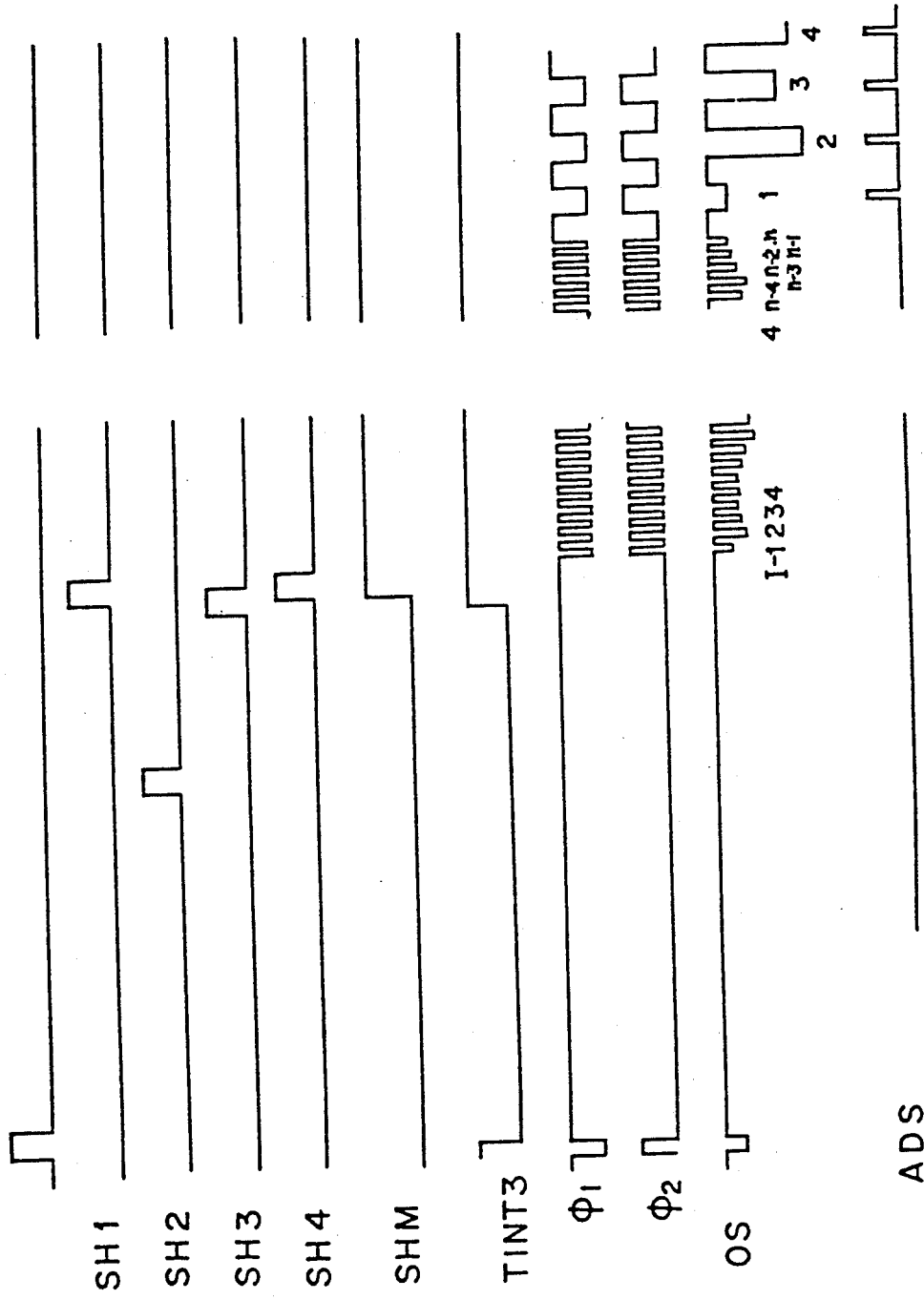
FIG. 35 is a timing chart showing an integration procedure carried for a selected zone at step #27 of FIG. 25.

When the zone signal SZS is sent to the AF timing control circuit AFTC, a number of transfer clocks required before the signal generation from the zone are set in a counter provided in the circuit AFTC. After the application of the integration clear gate pulse ICG, the AF micro-computer AFP selects an output from outputs TINT1–TINT4 of the monitoring comparators COM11–COM14 in the block desired to be outputted. Simultaneously with the generation of a HIGH level signal from the comparator, a manual shift signal SHM is generated to cancel the stop of the transfer clocks $\phi 1$ and $\phi 2$. The AF timing control circuit AFTC whose counter has been set counts the clock $\phi a$, so that the original clock $\phi 0$ is supplied to the CCD until the counter counts a number equal to the set number. A clock for the A/D conversion is supplied to the CCD only when the selected zone produces output. Also, AF micro-computer AFP is supplied with the data only related to the selected zone in synchronous relation with the AFD conversion completion signal EOC. Then the counter is set again. When the other zone produces output, transfer is performed at a high speed. A similar operation is carried out when the remaining picture elements in the attended zone are processed. Thus, in the manner as described above, the waste time such as during the damping time and the integration time of the data can be reduced, thereby enabling a fast AF operation. The timing chart of the above-described operation is illustrated in FIG. 35.

Finally, a method for driving the CCD image sensor having CCD registers connected in parallel relation as shown in FIG. 32b, will be explained in connection with FIG. 36.

Figure 36:
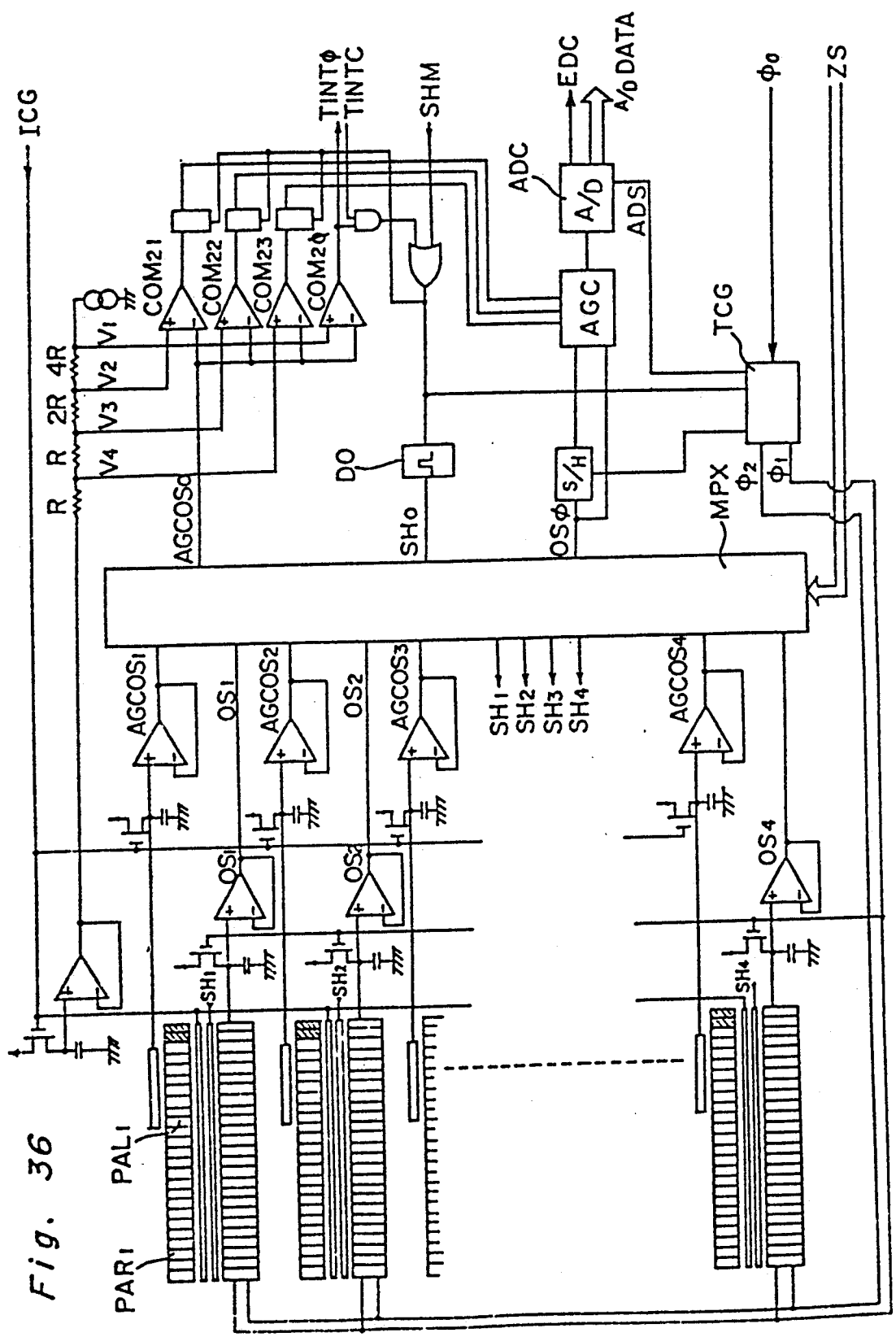
FIG. 36 is a circuit diagram showing an example of a driving circuit driving the CCD of FIG. 32b.
Figure 37:
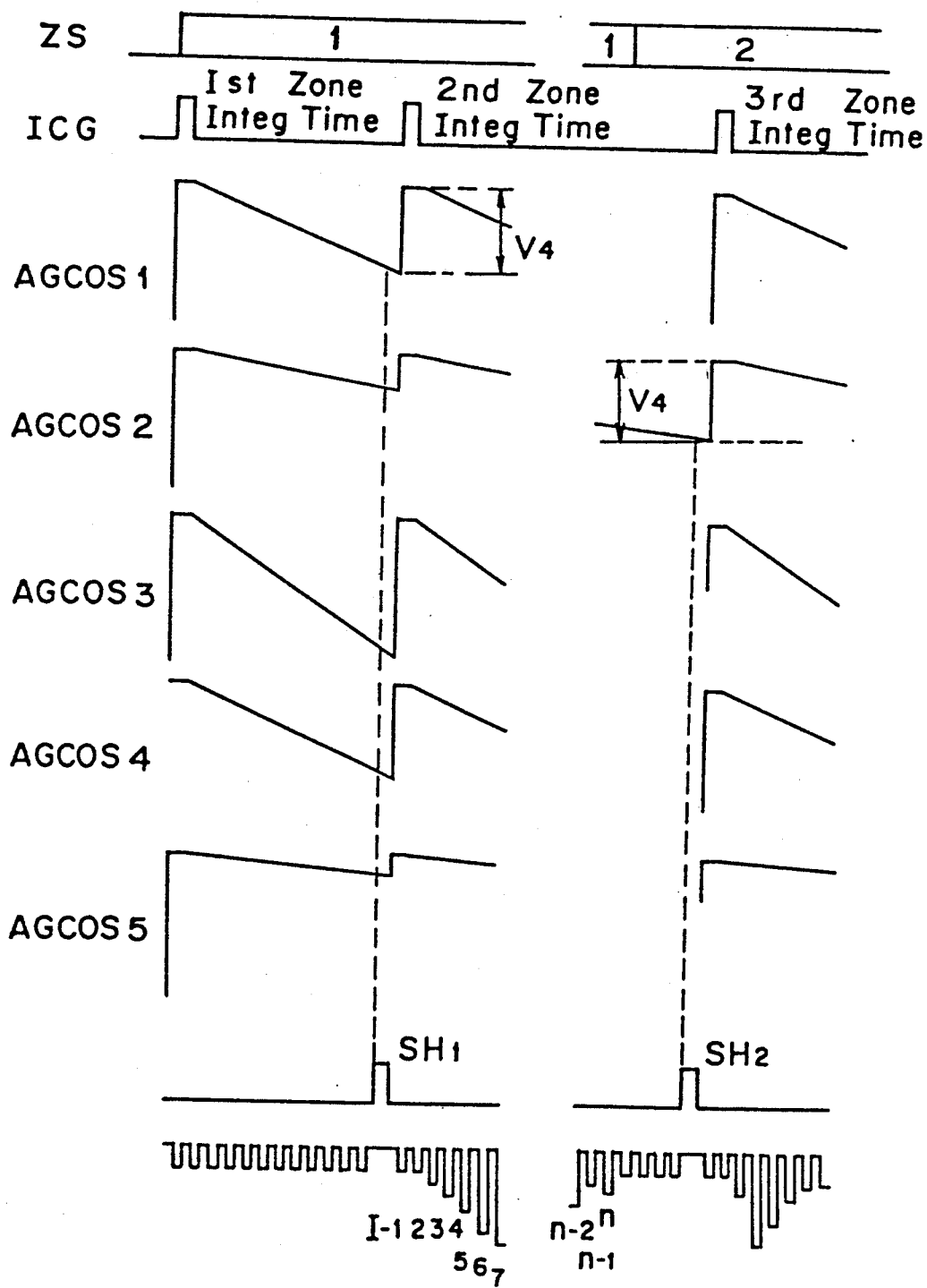
FIG. 37 is a timing chart showing an operation of the circuit of FIG. 36.

In FIG. 36, at the left-hand side thereof the CCD image sensor is shown; at the right-hand side thereof from the multiplexer MPX an AF interface AFIF is shown, and the terminal arrays at the right-hand side thereof are connected to AF micro-computer AFP.

According to the CCD image sensor of FIG. 36, it is possible to reduce the operating time by a special dividing method for effecting the first drive of every zone in the CCD after the start of the AF operation, as described below. The AF micro-computer AFP produces the integration clear gate pulse ICG so as to remove the electric charge accumulated in each of the picture element accumulation parts and the monitors. At this time, by the zone signal ZS indicating the first zone, an input signal AGCOS1 is generated from an output terminal AGCOS0 of the multiplexer MPX, and an input signal SH0 is generated from an output terminal SH1, and an input signal OSI is generated from an output terminal OS0.

The signal AGCOS1 is monitored by the comparator COM20 through the multiplexer so as to monitor the accumulation of the electric charge of the CCD image sensor for the first zone. As the accumulation of the electric charge in the monitoring part and each picture element part of the first zone is advanced, and the signal AGCOS1 reaches the level V1 suitable for a later analog processing circuit and a later focus detection calculation, comparator COM20 produces a signal which causes the generation of the shift pulse SH0. The shift pulse SH0 is provided through the multiplexer MPX, to the CCD image sensor of the first zone as the shift pulse SH1. When the predetermined maximum integration time has passed without reaching of the signal AGCOS1 to the level V1, the manual shift pulse SHM is applied from the AF micro-computer AFP to multiplexer MPX as the shift pulse SH0. Thereupon, multiplexer MPX supplies the shift pulse SH1 to the CCD image sensor of the first zone.

As a result of the supply of the shift pulse SHI, the CCD image sensor of the first zone terminates the operation for accumulation of the electric charge, and accordingly, the electric charges accumulated in the picture element accumulation part are shifted, through the shift gate, to the CCD shift register Rg1 of the first zone.

At this time, an input signal applied to a delay and one-shot circuit DO for generating the shift pulse SH0 is also applied to the transfer clock generating circuit TCG, which generates two transfer clocks $\phi 1$ and $\phi 2$, the pulse phase is so arranged that the shift pulse SH1 is supplied to the CCD image sensor of the first zone while the transfer clock $\phi 1$ is in a HIGH level. In synchronization with the negative edge of the transfer clock $\phi 1$, the photo-electric output signal OS1 of an image as accumulated in the first zone of the CCD image sensor is sequentially outputted one after another through the output terminal OS0 of the multiplexer MPX.

Immediately after the generation of the shift pulse SH0, the AF micro-computer AFP supplies the second integration clear gate pulse ICG to the CCD image sensor. The second integration clear gate pulse is an integration start signal to the CCD image sensor of the second zone, by which the accumulation operation of the electric charge in the monitor part and the picture element part of the second zone and the discharging operation of the accumulated electric charge are continuously conducted immediately after the completion of the accumulation operation of the electric charge in the first zone.

Thereafter, among the photoelectric output signals OS1 in the first zone, the output of the picture element for adjusting dark output is stored in a sample and hold circuit S/H in accordance with the control of the AF micro-computer AFP. Thereafter, each picture element output signal is subtracted by the stored output signal of the picture element for adjusting dark output, and the obtained difference is inputted as the image information.

In this case, when the accumulation of the electric charge in the CCD image sensor has been forcibly terminated by the manual shift pulse SHM from the AF micro-computer AFP, an automatic gain adjusting circuit AGC automatically adjusts the gain in accordance with the average accumulation level of the output in the monitor part by the use of the outputs of comparators COM20–COM22. In other words, outputs both from the photoelectric output OS0 and from the sample and hold circuit S/H are inputted to the automatic gain adjusting circuit AGC, and the difference therebetween is suitably amplified and outputted. The output of the automatic gain adjusting circuit AGC is inputted to the A/D converting circuit ADC and the converted digital signal is inputted to the AF micro-computer AFP as the image information. After the image information of the first zone is inputted to the AF micro-computer AFP in the above-described manner, the condition is detected of the accumulation of the electric charge of the CCD image sensor in the second zone which has beeh started previously. To this end AF micro-computer AFP provides a LOW level signal of the signal TINTC so as to prohibit the manual shift pulse SHM to be used as the shift pulse SH0, and also the zone signal ZS is switched from the first zone to the second zone. As a result, the input signal AGCOS2 is outputted from the output terminal AGCOS0 of the multiplexer MPX, and the input signal SH0 is outputted from the output terminal SH2, and also, the input signal OS2 is outputted from the output terminal OS0.

Then, the AF micro-computer AFP confirms the signal TINT0. If the signal TINT0 is HIGH, the CCD image sensor in the second zone is already charged to a level greater than a certain level, so that the integration clear gate pulse ICG is supplied to the CCD image sensor again to start the accumulation of the electric charge in the CCD image sensor of the second zone again. On the contrary, when the signal TINT0 is LOW, the accumulation of the electric charges in the CCD image sensor of the second zone is not completed while the image information is being taken into the AF micro-computer AFP of the CCD image sensor of the first zone. Therefore, the AF micro-computer AFP changes the TINTC to be HIGH again, waiting for the signal TINT0 to become HIGH. When the signal TINT0 is charged to a HIGH level, or in the case where a predetermined maximum charge accumulation time has elapsed, the shift pulse SH0 is generated and the accumulation of the electric charge in the CCD image sensor of the second zone is completed. Here, the predetermined maximum charge accumulation time is equal to a sum of the time required to receive the image information of the CCD image sensor of the first zone by AF micro-computer AFP and the time needed for the signal TINT0 to become a HIGH level signal. In a similar manner, the charge accumulation of the CCD image sensor and the image information being received from the CCD image sensor are carried out for all zones in a certain order such as: the starting of the charge accumulation of the CCD image sensor in the third zone; the image information being received from the CCD image sensor in the second zone; detection of the condition of charge accumulation in the CCD image sensor in the third zone; and so on.

In the case where a long charge accumulation time is required such as when the object to be photographed has a low brightness, the CCD driving time is shorted by a time represented by a formula (image information receiving time)×{(number of zones)−1}.

However, in the case where the object to be photographed is not low in brightness and accordingly a long charge accumulation time is not necessary, the CCD driving time will not be shortened.

In the circuit construction shown in FIG. 32b, a buffer part and a shift gate part may be provided between
the gates SHG1-SHG4 and the registers Rg1-Rg4, respectively. When such an arrangement is employed, the first shifting operation of the accumulated charge from the accumulation part to the buffer is conducted upon completion of the charge accumulation, even when the object has a high brightness. In the case where the integration completion signal TINT0 has been already generated at the time of the above detection of the charge accumulation condition, the electric charge may be shifted for the second time from the buffer part to the registers Rg1-Rg4, thereby shortening the CCD driving time.

Also, in the circuit construction shown in FIG. 32a, the buffer part and the shift gate part similar to those provided in the circuit of FIG. 32b may be added. When this arrangement is employed, the complicated circuit operation, such as to stop the generation of the transfer clock $\phi 1$ during the charge accumulation operation can be simplified, and at the same time, noise signals caused by such a complicated operation can be suppressed.

Furthermore, although the camera of the above-described embodiment is the so-called AF priority type in which the shutter release is permitted when the lens is brought into the in-focus condition, the present invention is not restricted to this, but may be applied to a camera of a shutter release priority type in which the shutter is released by the shutter-release operation which is done irrespective of the fact whether or not the camera is in the in-focus condition.

Moreover, it is not necessarily required that the focus detection sensitive zone corresponding to the AF zone exactly coincides with the light measuring sensitive zone for controlling the exposure. For example, one sensitive zone for measuring light can cover a wider range including one focus detection sensitive zone. Alternatively, one light measuring sensitive zone excluding the center of the photographing range may be arranged to cover a plurality of the focus detection sensitive zones. In the latter case, it may be so constructed that any one of the plurality of the focus detection sensitive zones can be covered by one light measuring sensitive zone. Further, in order to monitor the condition of the charge accumulation of the respective CCD image sensors, the monitor output may be used as a light measuring signal. Also, the monitor output for monitoring the condition of the charge accumulation of the CCD image sensor of the selected focus detection sensitive zone may be utilized as the information of the light measuring sensitive zone selected in correspondence to the above focus detection sensitive zone.

Furthermore, although the focus adjustment according to the embodiment described above is arranged to give the highest priority to the AF zone in which an object located closest to the camera is contained, instead, it may be so arranged that the lens is automatically focused to an intermediate point between an object located closest to the camera and an object located farthest from the camera, or to an object located farthest from the camera. Furthermore, it may be possible to selectively change the priority of the zones. In this case, it may be so decided at the designing occasion of the camera as to whether the switching of the zone is necessary, on the basis of statistical data of the general photographic situations, such that the most suitable zone for general photographing is selected.

According to the present invention, the focusing condition of the picture-taking lens is detected in multi-zones or multi-points within the photographing frame. Of the plurality of zones or points, the camera automatically selects a particular zone or point, e.g., the zone or point in the photographing frame containing an object located closest to the camera. The camera further selects, from a plurality of light measuring zones, a particular light measuring zone which is located at a place coinciding to the selected focus zone, or at a place covering the selected focus zone so as to use the obtained data for displaying or controlling the exposure. Accordingly, even when the target object is not located at the center of the photographing frame, the exposure can be controlled and display on the basis of the light measuring data with respect to the target object, with no special operation, such as an AE lock operation. Consequently, even when the target object is moving and it is difficult to catch the object at the center of the photographing frame, the exposure data display or the exposure control based on the spot light measuring data with respect to the target object can be conducted with higher possibilities. Moreover, since the exposure is determined by the value of the spot light measuring, the calculated exposure data is less influenced by the brightness in the environment.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

We claim:

1. An automatic focus detection system for detecting a focusing condition of an objective lens, comprising:
   an optical means;
   an image sensor means for receiving light from an object to be photographed by the objective lens through the optical means to output analog signals;
   an A/D converting means for converting the analog signals to digital signals;
   a first calculating means for performing a first calculation with the digital signals of a first number of at least one bit to obtain a first defocus amount of the objective lens;
   a second calculating means for performing a second calculation with the digital signals of a second number of bits to obtain a second defocus amount of the objective lens, the second number being larger than the first number, and
   a selecting means for selecting either of the first defocus amount and the second defocus amount on the basis of a predetermined condition.

2. An automatic focus detection system as claimed in claim 1, wherein the first number of bits is one and the second number of bits is eight.

3. An automatic focus detection system as claimed in claim 1, wherein the first calculating means includes means for selecting the digital signals of the first number from the digital signals of a plurality of bits converted by the A/D converting means, and means for performing a first calculation with the selected digital signals of the first number.

4. An automatic focus detection system as claimed in claim 1, wherein the A/D converting means includes two independent A/D converting circuits, one of which converts the analog signals into the digital signals of the first number, and another of which converts the analog signals into the digital signals of the second number.

5. An automatic focus detection system as claimed in claim 1, wherein the selecting means selects the first defocus amount as a result of a present focus detection and selects the second defocus amount as a result of a subsequent focus detection.

6. An automatic focus detection system as claimed in claim 1, wherein the selecting means includes means for selecting the first defocus amount as a resultant defocus amount until the first defocus amount reaches a predetermined value, and for selecting the second defocus amount as the resultant defocus amount after the first defocus amount has reached the predetermined value.

7. An automatic focus detection system as claimed in claim 1, wherein the selecting means includes means for selecting the first defocus amount when the focus detection operation is carrying out while driving the objective lens to search a focus detection enabling area.

8. An automatic focus detection system as claimed in claim 1, further comprising means for outputting an aperture signal indicative of an aperture value to be controlled in the photographing operation, and wherein the selecting means includes means for selecting the first defocus amount in the condition where the aperture signal indicates that the aperture value is larger than a predetermined aperture value.

9. An automatic focus detection system as claimed in claim 1, further comprising a shutter release button to be operated for starting an exposure operation, and a switching means for switching a one-frame photographing mode in which only one photograph can be taken during the operation of the shutter release button, and a continuous photographing mode in which a plurality of photographs can be taken serially during the operation of the shutter release button, and wherein the selecting means includes means for selecting the first defocus amount when the continuous photographing mode is switched.

10. An automatic focus detection system as claimed in claim 1, further comprising a moving object detecting means for detecting whether or not an object to be photographed is moving, and a focus adjusting means for adjusting the focusing condition of the objective lens to track the moving object when the moving object detecting means detects that the object is moving.

11. An automatic focus detection system for detecting a focusing condition of an objective lens, comprising:
    an optical means;
    an image sensor means of an integration type which outputs an analog signal corresponding to an image of a target object to be photographed by the objective lens through the optical means;
    an integration time setting means for setting the integration time of said image sensor means;
    a clock signal generating means for generating a clock signal having a predetermined frequency;
    a signal outputting means for outputting the analog signal outputted by the image sensor means in synchronization with the clock signal;
    a first A/D converting means for converting the analog signal into a first digital signal of a first number of at least one bit;
    a second A/D converting means for converting the analog signal into a second digital signal of a second number of bits, the second number of bits being larger than the first number of bits;
    a selecting means for selecting either of the first digital signal and the second digital signal for being applied for the calculation of the defocus amount of the objective lens, and
    a control means for shortening the integration time set by the integration time setting means in the case where the first digital signal is selected, as compared with the integration time set in the case where the second digital signal is selected.

12. An automatic focus detection system as claimed in claim 11, wherein the first number of bits is one and the second number of bits is eight.

13. An automatic focus detection system for detecting a focusing condition of an objective lens, comprising:
    an optical means;
    an image sensor means of an integration type which outputs an analog signal corresponding to an image of a target object to be photographed by the objective lens through the optical means;
    a clock signal generating means for generating a clock signal having a predetermined frequency;
    a signal outputting means for outputting the analog signal outputted by the image sensor means in synchronization with the clock signal;
    a first A/D converting means for converting the analog signal into a first digital signal of a first number of at least one bit;
    a second A/D converting means for converting the analog signal into a second digital signal of a second number, the second number being larger than the first number;
    a selecting means for selecting either of the first digital signal and the secon digital signal for being applied for the calculation of the defocus amount of the objective lens, and a control means for raising the frequency of the clock signal generated by the clock signal generating means in the case where the first digital signal is selected, as compared with the frequency of the clock signal generated in the case where the second digital signal is selected.

14. An automatic focus detection system for detecting a focusing conditoin of an objective lens, comprising:
an optical means;
an image sensor means which outputs analog signals corresponding to an image of a target object through the optical means;
an A/D converting means for converting the analog signals into digital signals;
a first processing means for performing a first process with the digital signals of a first number of at least one bit;
a second processing means for performing a second process with the digital signals of a second number of bits, the second number being larger than the first number, and
a selecting means for selectively making either of the first processing means and the second processing means operable on the basis of a predetermined sequence of the focus detecting operation.

15. An automatic focus detctioon system as claimed in claim 14, whereinthe first processing means includes means for selecting the digital signal of the first number from the digital signasl of the second and greater number converted by the A/D converting means, and means for performing the first process with the selected digital signal of the first number.

16. An automatic focus detection system as claimed in claim 14, wherein the A/D converting means includes two independent A/D converting circuits, one of which converts the analog signals into the digital signal of the first number, and another of which converts the analog signals into the digital signals of the second and greater number.

17. An automatic focus detection system as claimed in claim 14, wherein the first number of bits is one and the second number of bits is eight.

18. A processing device used in a camera, comprising:
an image sensor means for outputting analog signals corresponding to an image of a target object;
an A/D converting means for converting the analog signals into digital signals;
a first procesing means for performing a first process with the digital signals of a first number of at least one bit;
a second processing means for performing a second process with the ditial signals of a second number of bits, the second number being larger than the first number, and
a selecting means for selectively making either of the first and second processing means operable on the basis of a predetermined sequence of the camera.

* * * * *